(12) United States Patent
Amano

(10) Patent No.: US 8,116,010 B2
(45) Date of Patent: Feb. 14, 2012

(54) PROJECTION VARIABLE FOCUS LENS AND PROJECTION DISPLAY DEVICE

(75) Inventor: Masaru Amano, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/824,961

(22) Filed: Jun. 28, 2010

(65) Prior Publication Data
US 2011/0007401 A1    Jan. 13, 2011

(30) Foreign Application Priority Data

Jul. 9, 2009    (JP) ............................... P2009-162502

(51) Int. Cl.
  *G02B 15/14*    (2006.01)
  *G02B 3/00*    (2006.01)
(52) U.S. Cl. .................. 359/649; 359/686; 359/682
(58) Field of Classification Search .................. 359/649, 359/680–682, 686–690
See application file for complete search history.

(56) References Cited

U.S. PATENT DOCUMENTS

| | | | |
|---|---|---|---|
| 5,313,330 A | 5/1994 | Betensky | |
| 6,735,020 B2 * | 5/2004 | Sekita | 359/682 |
| 7,042,652 B2 * | 5/2006 | Nose et al. | 359/689 |
| 7,855,840 B2 * | 12/2010 | Minefuji | 359/682 |
| 2004/0257644 A1 | 12/2004 | Nishida | |
| 2008/0055738 A1 * | 3/2008 | Chang | 359/689 |
| 2009/0161230 A1 * | 6/2009 | Ito | 359/689 |
| 2010/0134899 A1 * | 6/2010 | Kim | 359/682 |

FOREIGN PATENT DOCUMENTS

| | | |
|---|---|---|
| JP | 3513514 B2 | 1/2004 |
| JP | 4206708 B2 | 3/2004 |
| JP | 4206769 B2 | 9/2004 |
| JP | 2007-206331 A | 8/2007 |
| JP | 4114515 B2 | 4/2008 |

* cited by examiner

*Primary Examiner* — Darryl J Collins
(74) *Attorney, Agent, or Firm* — Birch, Stewart, Kolasch & Birch, LLP

(57) ABSTRACT

A projection variable focus lens includes seven lenses. The seven lenses include first to seventh lenses in order from a magnification side. The first and second lenses are provided closest to the magnification side and have a negative composite refractive power. The third lens has a positive refractive power. The fifth lens has a negative refractive power. The sixth lens has a positive refractive power. The seventh lens has a positive refractive power. A reduction side of a lens system is telecentric. The seven lenses are classified into three or more lens groups. Three or less lens groups among the three or more lens groups are moved to change a focal length. When the focal length varies from a wide angle end to a telephoto end, at least the third lens is moved from the reduction side to the magnification side along an optical axis.

7 Claims, 33 Drawing Sheets

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

EXAMPLE 11

EXAMPLE 12

EXAMPLE 13

EXAMPLE 14

EXAMPLE 15

EXAMPLE 16

EXAMPLE 7

EXAMPLE 11

EXAMPLE 13

PROJECTION VARIABLE FOCUS LENS AND PROJECTION DISPLAY DEVICE

CROSS-REFERENCE TO RELATED APPLICATIONS

This application is based upon and claims the benefit of priority from the Japanese Patent Application No. 2009-162502 filed on 9 Jul. 2009; the entire contents of which are incorporated herein by reference.

BACKGROUND OF THE INVENTION

1. Field of the Invention

The present invention relates to a variable focus lens that includes seven lenses and is provided in, for example, a projection display device, and a projection display device including the variable focus lens, and more particularly, to a small projection variable focus lens and a projection display device that enlarge and project light having image information from a light valve of, for example, a transmissive or reflective liquid crystal display device or a DMD (digital micro-mirror device) display device onto a screen.

2. Description of the Related Art

In recent years, projection display devices using light valves, such as liquid crystal display devices or DMD display devices, have come into widespread use. In particular, a projection display device has been widely used which uses three light valves corresponding to illumination light components of three primary colors, such as R, G, and B, to modulate the illumination light components, and combines the light components modulated by the three light valves using, for example, a color composition prism, and displays an image on a screen through a projection lens.

In many cases, the projection display device uses as a projection lens a variable focus lens (zoom lens) capable of changing the size of the image projected onto the screen. A telecentric variable focus lens including four lens groups or five lens groups is generally used as the projection variable focus lens. When a high performance or a high zoom ratio is required, a variable focus lens including six lens groups is also used.

In general, the variable focus lens includes a large number of lenses in order to achieve high aberration characteristics, ensure telecentricity, and prevent a reduction in contrast or the occurrence of color unevenness. However, when the number of lenses increases, manufacturing costs also increase. Therefore, it is necessary to construct a variable focus lens capable of achieving the objects with the minimum number of lenses.

In order to meet the requirements, Japanese Patent Nos. 4114515 and 3513514 (corresponding to U.S. Pat. No. 5,313, 330) disclose projection variable focus lenses each including seven lenses.

However, in the projection zoom lens including seven lenses disclosed in Japanese Patent No. 4114515, four lens groups are moved when power varies. Therefore, a moving mechanism including, for example, a cam becomes complicated, and the weight of the projection zoom lens or the difficulty of manufacture increases, which results in an increase in manufacturing costs.

The projection zoom lens including seven lenses disclosed in Japanese Patent No. 3513514 has an F number of 6 and it is difficult to meet a demand for a fast lens system.

SUMMARY OF THE INVENTION

One embodiment of the invention provides an inexpensive projection variable focus lens that includes seven lenses, that is small number of lenses, and three or less lens groups moved when power varies, has telecentricity, is fast, and is capable of effectively reducing all aberrations and a projection display device including the projection variable focus lens.

According to an aspect of the invention, a projection variable focus lens includes seven lenses. The seven lens include first to seventh lenses in order from a magnification side. The first and second lenses are provided closest to the magnification side and have a negative composite refractive power. The third lens has a positive refractive power. The fifth lens has a negative refractive power. The sixth lens has a positive refractive power. The seventh lens has a positive refractive power. The first to seventh lenses are provided in this order from the magnification side. A reduction side of a lens system is telecentric. The seven lenses are classified into three or more lens groups. Three or less lens groups among the three or more lens groups are moved to change a focal length. When the focal length varies from a wide angle end to a telephoto end, the third lens is moved from the reduction side to the magnification side along an optical axis.

The projection variable focus lens according to the above-mentioned aspect may satisfy the following conditional expression 1:

$-2.2 < f12/fw < -0.5$     [Conditional expression 1]

(where fw indicates the focal length of the entire system at the wide angle end, and f12 indicates a composite focal length of the first lens and the second lens).

The projection variable focus lens according to the above-mentioned aspect may satisfy the following conditional expression 2:

$1.0 < f3/fw < 3.5$     [Conditional expression 2]

(where fw indicates the focal length of the entire system at the wide angle end, and f3 indicates the focal length of the third lens).

At least one surface of each surface of the first lens and the second lens may be an aspheric surface.

The seven lenses may include a fourth lens from the magnification side that has a positive refractive power and includes a convex surface facing the reduction side.

The first lens or the second lens may be made of a plastic material.

The projection variable focus lens according to the above-mentioned aspect may satisfy the following conditional expression 3:

$|fP/fNP| \geq 3.0$     [Conditional expression 3]

(where fP indicates a focal length of one of the first and second lenses, which is made of the plastic material, and fNP indicates a focal length of the other lens which is made of a non-plastic material).

The first lens may be a composite aspheric lens in which a resin layer is provided on one surface of a glass lens and one surface of the resin layer opposite to the glass lens is an aspheric surface.

According to another aspect of the invention, a projection display device includes a light source, a light valve, an illumination optical unit, and the projection variable focus lens according to the above-mentioned aspect. The illumination optical unit guides light emitted from the light source to the light valve. The light valve modulates the light emitted from the light source, and the modulated light is projected onto a screen by the projection variable focus lens.

The meaning of the 'variable focus lens' includes a varifocal lens and a zoom lens. The varifocal lens performs a focusing operation to adjust defocusing when the conjugation length is changed due to power variation, unlike the zoom lens.

The 'magnification side' means an object side (screen side). In the case of reduced projection, for convenience, the screen side is also referred to as the magnification side. The 'reduction side' means an original image display area side (light valve side). In the case of reduced projection, for convenience, the light valve side is also referred to as the reduction side.

In the projection variable focus lens according to the above-mentioned aspect of the invention, the first and second lenses arranged closest to the magnification side have the negative composite refractive power, and the lens group with the negative refractive power is disposed at the head. Therefore, it is possible to ensure a wide angle of view and a large back focal length with a relatively simple structure.

When power varies, the positive third lens is moved from the reduction side to the magnification side along the optical axis. In this way, the third lens serves as a power varying group as well as an aberration correcting group, and it is possible to prevent a variation in aberration (particularly, astigmatism or field curvature) in the entire power variable range. In addition, it is possible to form a high-performance projection variable focus lens with the small number of lenses.

That is, since the first and second lenses have the negative composite refractive power, both an on-axis light beam and an off-axis light beam are incident on the third lens at a large height. When the third lens is a positive lens, it is possible to largely correct aberration of the off-axis light beam, such as astigmatism. However, in the case of a variable focus lens, the large aberration correction acts as a defect and a large variation in aberration (particularly, astigmatism) occurs due to the movement of the lenses when power varies. However, in the projection variable focus lens according to the above-mentioned aspect of the invention, in order to prevent the variation in aberration when power varies, the third lens is moved from the reduction side to the magnification side when power varies from the wide angle end to the telephoto end. In addition, when power varies, the height of the off-axis light beam incident on the third lens is maintained to be constant. Therefore, it is possible to obtain the effect of correcting off-axis aberration, such as astigmatism, at all times. At the same time, it is possible to reduce the amount of astigmatism while ensuring the brightness.

The projection display device according to said another aspect of the invention uses the projection variable focus lens according to the above-mentioned aspect of the invention. Therefore, the projection display device has low manufacturing costs and a light weight and can effectively correct all aberrations including astigmatism while ensuring the brightness.

DESCRIPTION OF THE PREFERRED EMBODIMENTS

Hereinafter, exemplary embodiments of the invention will be described with reference to the accompanying drawings. A projection variable focus lens according to an embodiment of the invention shown in FIG. 1 (a projection variable focus lens according to Example 1 is shown as a representative example) includes seven lenses. Two lenses, that is, a first lens L1 and a second lens L2 that are arranged closest to a magnification side have a negative composite refractive power. A third lens L3 from the magnification side has a positive refractive power, and a fifth lens L5 from the magnification side has a negative refractive power. A sixth lens L6 from the magnification side has a positive refractive power, and a seventh lens L7 from the magnification side has a positive refractive power. In addition, a reduction side of a lens system is telecentric.

The seven lenses are classified into three or more lens groups (three lens groups in Examples 1 to 10, four lens groups in Examples 11 to 14, and five lens groups in Examples 15 and 16). When the focal length varies (including power variation; hereinafter, simply referred to as 'when power varies'), three or less lens groups (two lens groups in Examples 1 to 8 and 11 to 14 and three lens groups in Examples 9, 10, 15, and 16) among the lens groups are moved to change the focal length. When the focal length is changed from a wide angle end to a telephoto end, at least the third lens L3 is moved from the reduction side to the magnification side along an optical axis Z.

Figure 1:
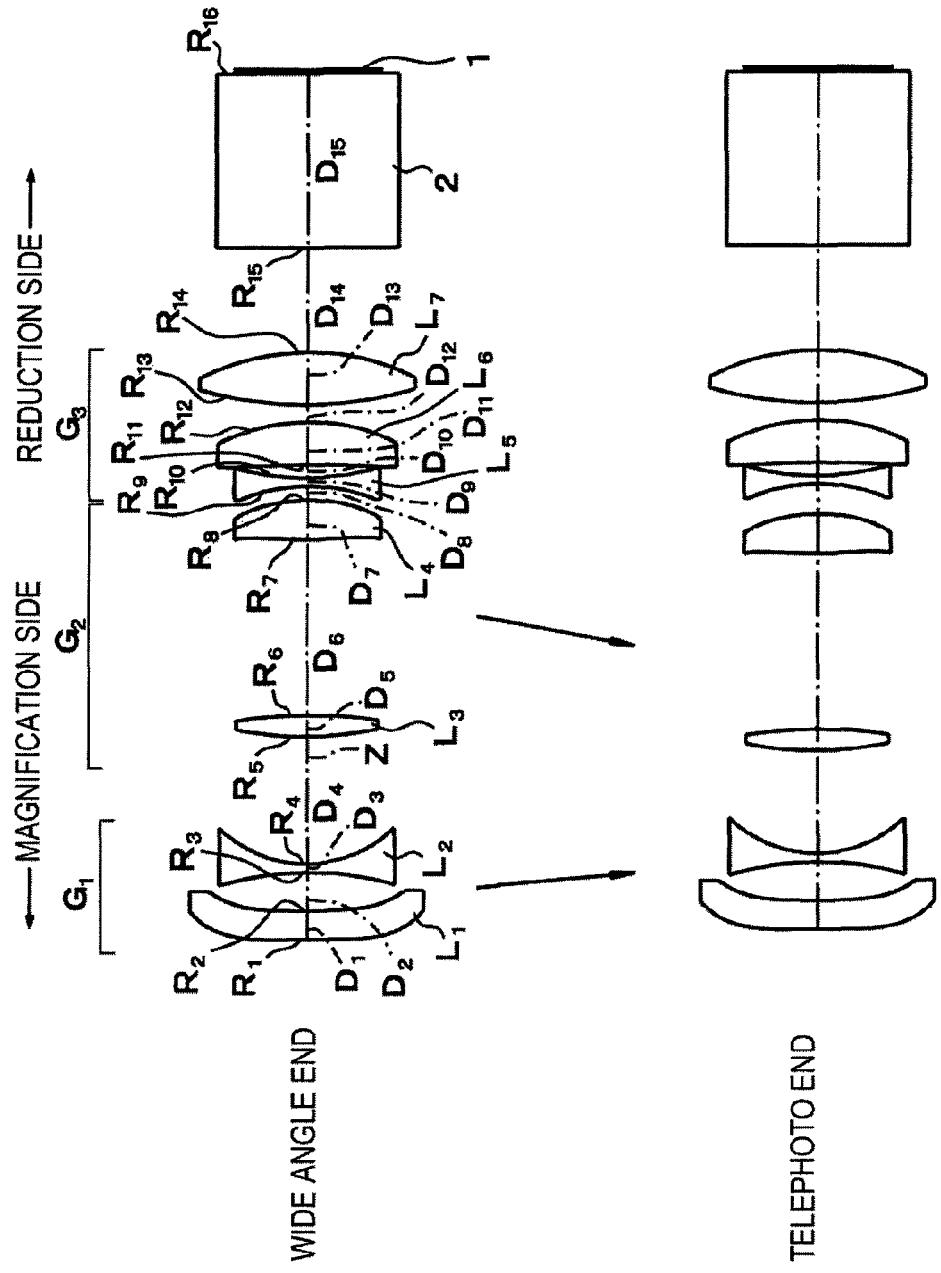
FIG. 1 is a diagram illustrating the structure of a projection variable focus lens according to Example 1 of the invention.

For example, as shown in FIG. 1, a glass block 2, which is mainly a color composition prism, and image display surfaces 1 of three or more light valves, such as liquid crystal display panels, are provided in the rear stage of the lens system. However, in a so-called single panel type using one light valve, the color composite prism is not needed.

Although not shown in FIG. 1, for example, a mask 3 may be arranged in a second lens group G2 or at other positions.

In the specification, the 'mask' has a function of shielding some of light beams below or above an off-axis light beam. The light-shielding operation makes it possible to maintain the balance between the light beams above or below the off-axis light beam and prevent the occurrence of color unevenness.

The mask may be an aperture diaphragm that limits the light beams above and below the off-axis light beam and regulates the brightness.

During focusing, for example, one lens group (the first lens group in Examples 1 to 6, 9, 10, 15, and 16 and the third lens group in Examples 7, 8, and 11 to 14) is moved along the optical axis Z.

As such, in the projection variable focus lens according to this embodiment, the first lens L1 closest to the magnification side and the second lens L2 from the magnification side have a negative composite refractive power. Therefore, it is possible to easily ensure a wide angle of view and a large back focal length.

In this embodiment, it is preferable that one of the first lens L1 and the second lens L2 be an aspheric plastic lens with a low refractive power (the first lens L1 in Examples 1 to 3, Example 5, and Examples 7 to 16 and the second lens L2 in Example 4) and the other lens be a glass lens with a negative refractive power (the second lens L2 in Examples 1 to 3, Example 5, and Examples 7 to 16 and the first lens L1 in Example 4). In this case, the aspheric plastic lens has an aberration correcting function and the glass lens has a power variation function. In this way, it is possible to construct a lens system that has a good aberration correcting function and is little affected by thermal variation. In addition, since one lens is made of a plastic material, it is possible to improve workability and reduce manufacturing costs.

In this embodiment, as another aspect (see the following Example 6), the first lens L1 may be a composite aspheric lens in which a resin layer is provided on one surface of the glass lens and one surface of the resin layer opposite to the glass lens is an aspheric surface. In this structure, it is also possible to construct a lens system that has a good aberration correcting function and is little affected by thermal variation.

When power varies, the positive third lens L3 is moved from the reduction side to the magnification side along the optical axis. In this way, the third lens L3 can serve as a power varying group as well as an aberration correcting group, and it is possible to prevent a variation in aberration, particularly, astigmatism or field curvature in the entire power variable range. Therefore, it is possible to form a high-performance projection variable focus lens with a small number of lenses.

That is, as power varies from the wide angle end to the telephoto end, the third lens L3 is moved from the reduction side to the magnification side. When power varies, the height of the off-axis light beam incident on the third lens L3 is maintained to be constant. Therefore, it is possible to obtain the effect of correcting an off-axis aberration, such as astigmatism, at all times. At the same time, it is possible to reduce astigmatism while maintaining the brightness.

In addition, the fifth lens L5 is a negative lens, the sixth lens L6 is a positive lens, and the seventh lens L7 is a positive lens. According to this structure, it is possible to improve the telecentricity of the lens system on the reduction side.

The lens system includes seven lenses having the above-mentioned structure. As such, a zoom lens or a so-called varifocal lens may be formed by a relatively small number of lenses. Therefore, the zoom lens or the varifocal lens has a simple structure. In this case, it is possible to remove restrictions in the cooperative movement of the lens groups when power varies. Therefore, it is possible to significantly reduce a variation in aberration when power varies.

The concept of the 'variable focus lens' includes a so-called varifocal lens and a zoom lens. The 'varifocal lens' requires a focusing operation corresponding to defocusing when the conjugation length varies during power variation. In the structure in which two lens groups are moved when power varies, two moving groups are independently moved. Therefore, a complicated lens driving mechanism, such as a cam mechanism for cooperatively moving the moving lens groups, is not needed.

The conjugation length of the 'zoom lens' is adjusted to be constant when power varies and a little amount of deviation of the conjugation length is adjusted by the focus lens, as compared to the 'varifocal lens'. However, in the zoom lens, when power varies, two or more moving groups are moved by, for example, a cam mechanism for zooming according to a predetermined rule. Therefore, in general, the disadvantages of the zoom lens are a large size, a heavy weight, and a high cost.

It is preferable that the projection variable focus lens according to this embodiment satisfy at least one of the following Conditional expressions 1 and 2:

$-2.2 < f12/fw < -0.5$; and [Conditional expression 1]

$1.0 < f3/fw < 3.5$ [Conditional expression 2]

(where fw indicates the focal length of the entire system at the wide angle end, f12 indicates a composite focal length of the first lens and the second lens, and f3 indicates the focal length of the third lens).

Next, the technical meaning of the above-mentioned Conditional expressions 1 and 2 will be described.

First, Conditional expression 1 defines the range of the ratio between the composite focal length f1t of the first lens L1 and the second lens L2 and the focal length fw of the entire system at the wide angle end. In addition, Conditional expression 1 defines a range capable of effectively correcting aberrations and obtaining an appropriate back focal length.

That is, if the ratio is less than the lower limit of Conditional expression 1, the composite negative refractive power of the first lens L1 and the second lens L2 is too weak, and the back focal length of the lens is small. Therefore, it is difficult to insert a color composition optical system, such as a color composition prism. On the other hand, if the ratio is more than the upper limit, the composite negative refractive power of the first lens L1 and the second lens L2 is too strong and it is difficult to effectively correct off-axis aberrations, such as comatic aberration and field curvature. In addition, the back focal length of the lens increases, which results in an increase in the size of a lens system.

It is preferable that the projection variable focus lens according to this embodiment satisfy the following Conditional expression 1' in order to more effectively obtain the effects of Conditional expression 1:

$$-2.0 < f12/fw < -0.8. \quad \text{[Conditional expression 1']}$$

Conditional expression 2 defines the range of the ratio between the focal length f3 of the third lens L3 and the focal length fw of the entire system at the wide angle end and also defines the range of the power of the third lens L3.

That is, if the ratio is less than the lower limit of Conditional expression 2, the power of the third lens L3 is too strong and it is difficult to correct aberrations. On the other hand, if the ratio is more than the upper limit, the amount of movement of the third lens L3 is too large when power varies, and the overall length of the lens system increases.

It is preferable that the projection variable focus lens according to this embodiment satisfy the following Conditional expression 2' in order to more effectively obtain the effects of Conditional expression 2:

$$1.4 < f3/fw < 3.0. \quad \text{[Conditional expression 2']}$$

As described above, when one of the first lens L1 and the second lens L2 is an aspheric plastic lens with a low refractive power and the other lens is a glass lens with a negative refractive power, it is preferable that the first and second lenses satisfy the following Conditional expression 3:

$$|fP/fNP| 3.0 \quad \text{[Conditional expression 3]}$$

(where fP indicates a focal length of one of the first and second lenses L1, L2 which is made of a plastic material, and fNP indicates a focal length of the other lens which is made of a non-plastic material).

Conditional expression 3 defines the range of power for minimizing the influence of temperature variation. When the absolute value is less than the lower limit of Conditional expression 3, the influence of the temperature variation is too large.

It is preferable that the fourth lens L4 be a positive lens having a convex surface facing the reduction side. When the fourth lens L4 is a positive lens having the above-mentioned shape, it is possible to reduce on-axis aberration, such as spherical aberration.

In the projection variable focus lens according to each of the following examples, at least one surface of each of the first lens L1 and the second lens L2 is an aspheric surface. In this way, it is possible to effectively correct distortion. The shape of the aspheric surface is represented by the following aspheric expression:

$$Z = \frac{Y^2/R}{1 + \sqrt{1 - K \times Y^2/R^2}} + \sum_{i=3}^{16} A_i Y^i \quad \text{[Expression 1]}$$

(where Z indicates the length of a perpendicular line that drops from a point on an aspheric surface at a distance Y from the optical axis to a tangent plane to the top of the aspheric surface (a plane vertical to the optical axis), Y indicates the distance from the optical axis, R indicates the curvature radius of an aspheric surface near the optical axis, K indicates eccentricity, and $A_i$ indicates an aspheric coefficient (i=3 to 16)).

Figure 33:
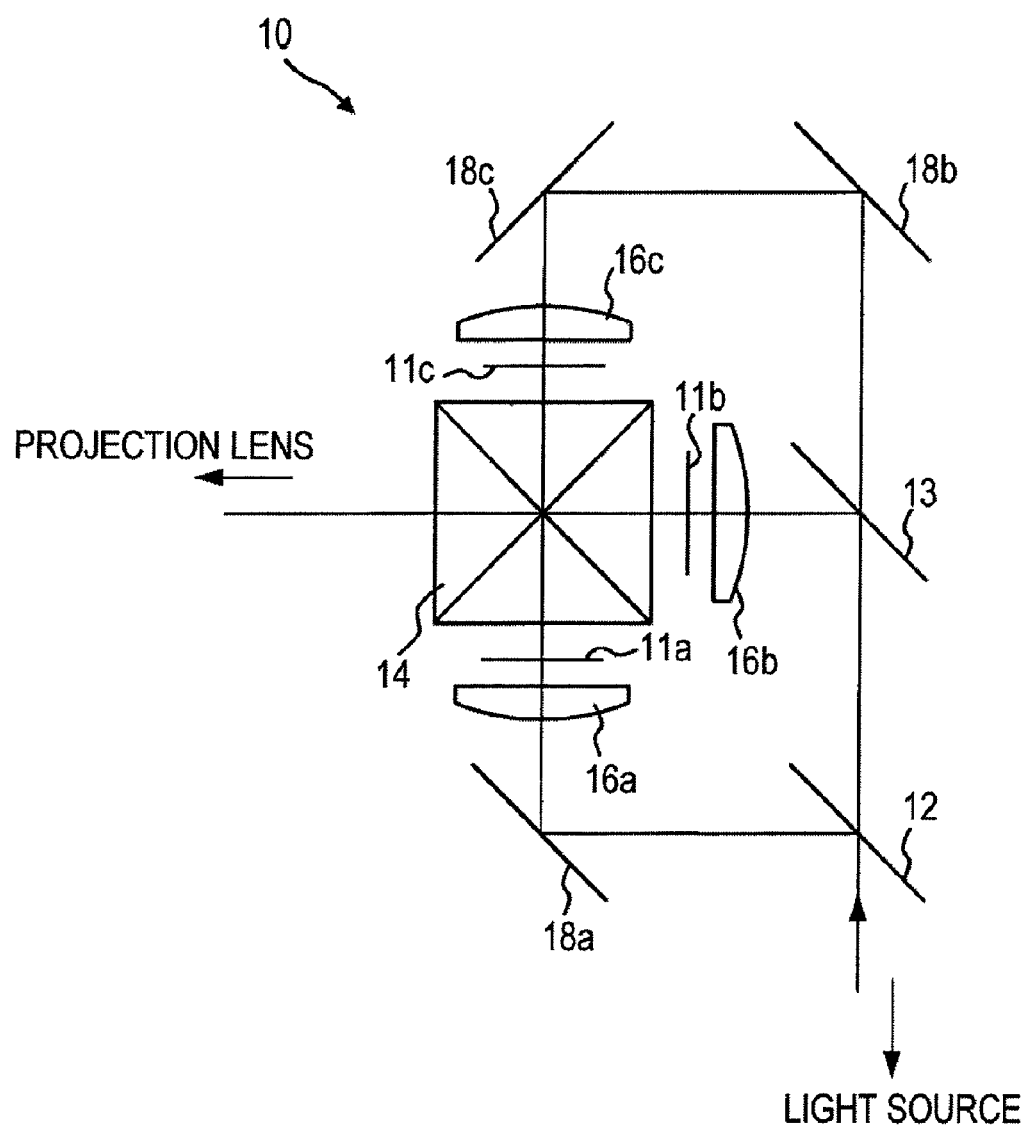
FIG. 33 is a diagram illustrating the structure of a main part of a projection display device according to an embodiment of the invention.

An example of a projection display device provided with the above-mentioned projection variable focus lens will be described with reference to FIG. 33. The projection display device shown in FIG. 33 includes transmissive liquid crystal panels 11a to 11c as light valves and uses the projection variable focus lens 10 according to the above-described embodiment as a projection variable focus lens. An integrator (not shown), such as a fly-eye lens, is provided between a light source and a dichroic mirror 12. White light emitted from the light source is incident on the liquid crystal panels 11a to 11c corresponding to three color light beams (G light, B light, and R light) through an illumination optical unit and then modulated. The modulated light components are composed by a cross dichroic prism 14, and the composed light is projected onto a screen (not shown) by the projection variable focus lens 10. This device includes the dichroic mirrors 12 and 13 for color separation, the cross dichroic prism 14 for color composition, condenser lenses 16a to 16c, and total reflecting mirrors 18a to 18c. In this embodiment, the projection display device uses the projection variable focus lens according to this embodiment. Therefore, the projection display device can have a high magnifying power, a small size, a light weight, and a low manufacturing cost. In addition, the projection display device can maintain a high optical performance.

The use of the projection variable focus lens according to this embodiment of the invention is not limited to the projection display device using a transmissive liquid crystal display panel, but the projection variable focus lens according to this embodiment may be used for a display device using a reflective liquid crystal display panel or another light modulating unit such as a DMD.

EXAMPLES

Next, the projection variable focus lens according to the invention will be described with reference to detailed examples.

First Example Group

A first example group includes projection variable focus lenses according to the following Examples 1 to 6. Each of the projection variable focus lenses includes a first lens group G1 including a first lens L1 and a second lens L2, a second lens group G2 including a third lens L3 and a fourth lens L4, and a third lens group G3 including fifth to seventh lenses L5 to L7. When power varies, the first lens group G1 and the second lens group G2 are independently moved.

Example 1

The projection variable focus lens according to Example 1 has the structure shown in FIG. 1.

That is, the projection variable focus lens includes the first to seventh lenses L1 to L7 of the first to third lens groups G1 to G3 arranged in this order from the magnification side. The first lens group G1 includes the first lens L1 which has a low negative power and includes aspheric surfaces at both sides and the second lens L2, which is a biconcave lens. The second lens group G2 includes the third lens L3, which is a biconvex lens, and the fourth lens L4, which is a biconvex lens (on the axis) having aspheric surfaces at both sides. The third lens group G3 includes the fifth lens L5, which is a biconcave lens, the sixth lens L6, which is a positive meniscus lens having a convex surface facing the reduction side, and the seventh lens L7, which is a biconvex lens.

When power varies from the wide angle end to the telephoto end, the first lens group G1 is moved to the reduction side along the optical axis Z and the second lens group G2 is moved to the magnification side along the optical axis Z.

Focusing is performed by moving the first lens group G1 in the direction of the optical axis Z (varifocal lens type).

In Table 1, an upper part shows the curvature radius R of each lens surface according to Example 1 (the focal length of the entire lens system at the wide angle end is normalized to 1.00, which is the same with the following tables), the thickness of the center of each lens and an air space D between the lenses (which are normalized, similar to the curvature radius R, which is the same with the following tables), and the refractive index Nd and the Abbe number vd of each lens with respect to the d-line. In Table 1 and Tables 2 to 16, which will be described below, numbers corresponding to R, D, Nd, and vd are sequentially increased from the magnification side.

In Table 1, a middle part shows a variable spacing 1 (the gap between the first lens group G1 and the second lens group G2: movement 1 (which is the same with the following tables)) and a variable spacing 2 (the gap between the second lens group G2 and the third lens group G3: movement 2 (which is the same with the following tables)) at the wide angle end (wide), a middle position (middle), and the telephoto end (tele). In Table 1, a lower part shows the values of constants K and A3 to A16 corresponding to the aspheric surfaces.

TABLE 1

| | Focal length F = 1.00~1.06~1.10 | | | |
|---|---|---|---|---|
| Surface | R | D | Nd | vd |
| 1 * | −8.106 | 0.209 | 1.4910 | 57.6 |
| 2 * | 30.760 | 0.278 | | |
| 3 | −2.202 | 0.063 | 1.4875 | 70.2 |
| 4 | 0.888 | (Movement 1) | | |
| 5 | 2.572 | 0.156 | 1.7725 | 49.6 |
| 6 | −3.370 | 1.283 | | |
| 7 * | 4.540 | 0.288 | 1.5686 | 58.6 |
| 8 * | −1.185 | (Movement 2) | | |
| 9 | −1.236 | 0.060 | 1.7283 | 28.5 |
| 10 | 1.775 | 0.096 | | |
| 11 | −7.455 | 0.314 | 1.4875 | 70.2 |
| 12 | −1.394 | 0.128 | | |
| 13 | 2.743 | 0.384 | 1.5891 | 61.1 |
| 14 | −1.663 | 0.754 | | |
| 15 | ∞ | 1.271 | 1.5163 | 64.1 |
| 16 | ∞ | | | |

| Movement spacing | Wide angle end | Middle position | Telephoto end |
|---|---|---|---|
| Movement 1 | 0.930 | 0.819 | 0.752 |
| Movement 2 | 0.103 | 0.174 | 0.221 |

| | | Aspheric coefficient | | |
|---|---|---|---|---|
| Surface number | K | $A_3$ | $A_4$ | $A_5$ | $A_6$ |
| 1 | −89.88597 | −1.98440E−01 | 1.66950E+00 | −2.03244E+00 | 7.88764E−01 |
| | $A_7$ | $A_8$ | $A_9$ | $A_{10}$ | $A_{11}$ |
| | 8.20585E−02 | 1.25710E+00 | −9.57031E−01 | 7.69363E−01 | −5.15647E+00 |
| | $A_{12}$ | $A_{13}$ | $A_{14}$ | $A_{15}$ | $A_{16}$ |
| | 3.24531E+00 | 1.45512E+01 | −3.88462E+01 | 4.50215E+01 | −1.99780E+01 |
| | K | $A_3$ | $A_4$ | $A_5$ | $A_6$ |
| 2 | −90.00000 | −1.48683E−01 | 1.24236E+00 | 6.15708E−01 | −6.08819E+00 |
| | $A_7$ | $A_8$ | $A_9$ | $A_{10}$ | $A_{11}$ |
| | 6.43267E+00 | 4.01466E+00 | −2.82505E+00 | −7.44150E+00 | 5.22005E+00 |
| | $A_{12}$ | $A_{13}$ | $A_{14}$ | $A_{15}$ | $A_{16}$ |
| | −3.17946E+01 | 3.49642E+01 | −1.69255E+01 | 1.41498E+02 | −1.50036E+02 |

TABLE 1-continued

|   | K | $A_4$ | $A_6$ | $A_8$ | $A_{10}$ |
|---|---|---|---|---|---|
| 7 | 1.00000 | −1.10652E−01 | −8.86733E−01 | 3.19345E+00 | −1.43777E+01 |

|   | K | $A_4$ | $A_6$ | $A_8$ | $A_{10}$ |
|---|---|---|---|---|---|
| 8 | 1.00000 | 1.28963E−02 | −5.92912E−01 | 1.20064E+00 | −7.41409E+00 |

* Aspheric surface

In addition, Table 17 shows numerical values corresponding to the conditional expressions according to Example 1.

Figure 17:
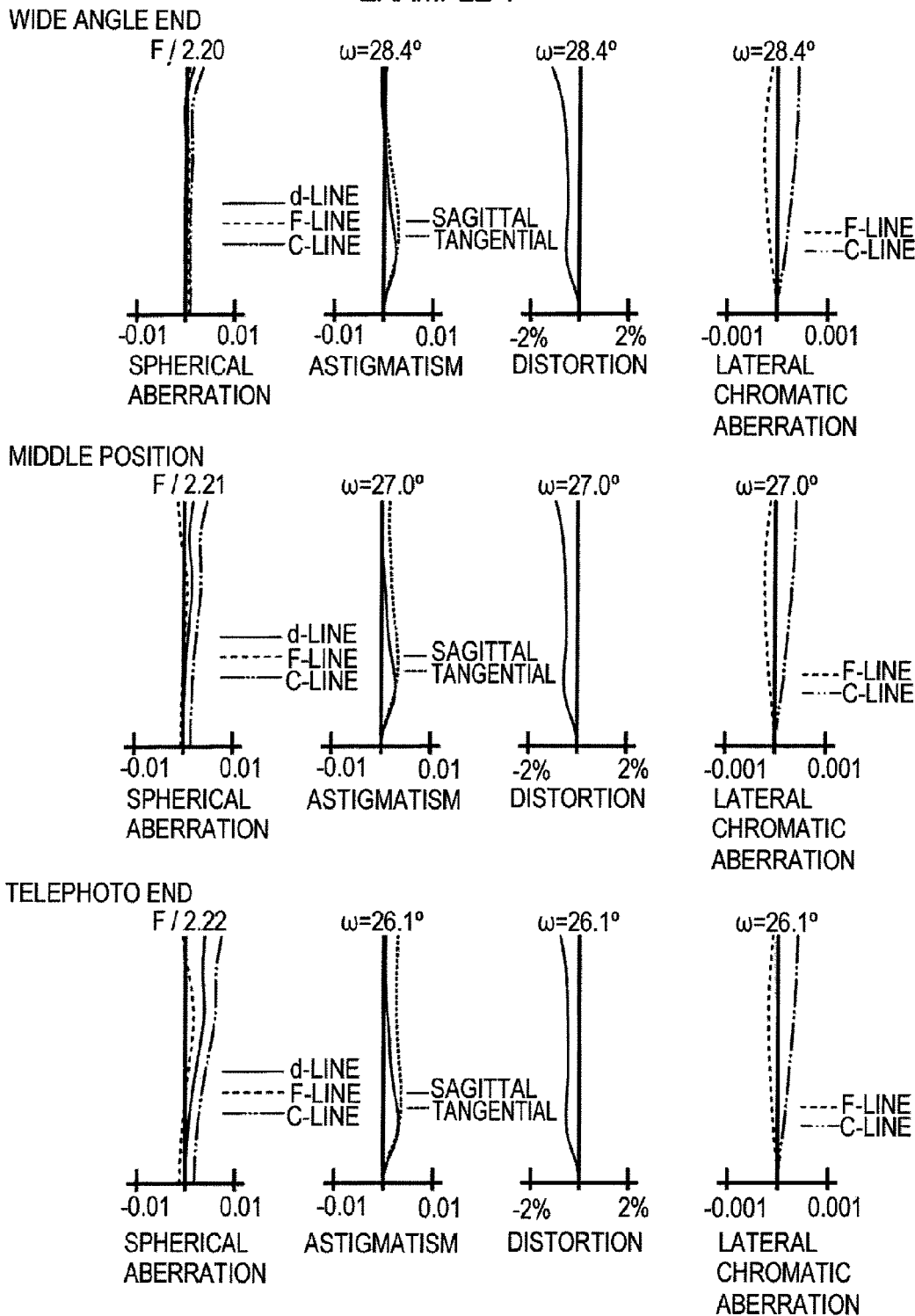
FIG. 17 is a diagram illustrating all aberrations of the projection variable focus lens according to Example 1.

FIG. 17 is an aberration diagram illustrating all aberrations (spherical aberration, astigmatism, distortion, and lateral chromatic aberration) of the projection variable focus lens according to Example 1 at the wide angle end (wide), the middle position (middle), and the telephoto end (tele). FIG. 17 and FIGS. 18 to 32 show the spherical aberration of the lens with respect to the d-line, the F-line, and C-line, the astigmatism of the lens with respect to a sagittal image surface and a tangential image surface, and the lateral chromatic aberration of the lens with respect to the F-line and the C-line.

As can be seen from FIG. 17, the projection variable focus lens according to Example 1 has an angle of view 2ω of 56.8 degrees, which is a wide angle, and an F number of 2.20, which is a large value, at the wide angle end. Therefore, all aberrations are effectively corrected.

In addition, as shown in Table 17, the projection variable focus lens according to Example 1 satisfies all of Conditional expressions 1 to 3, and Conditional expressions 1' and 2'.

Example 2

Figure 2:
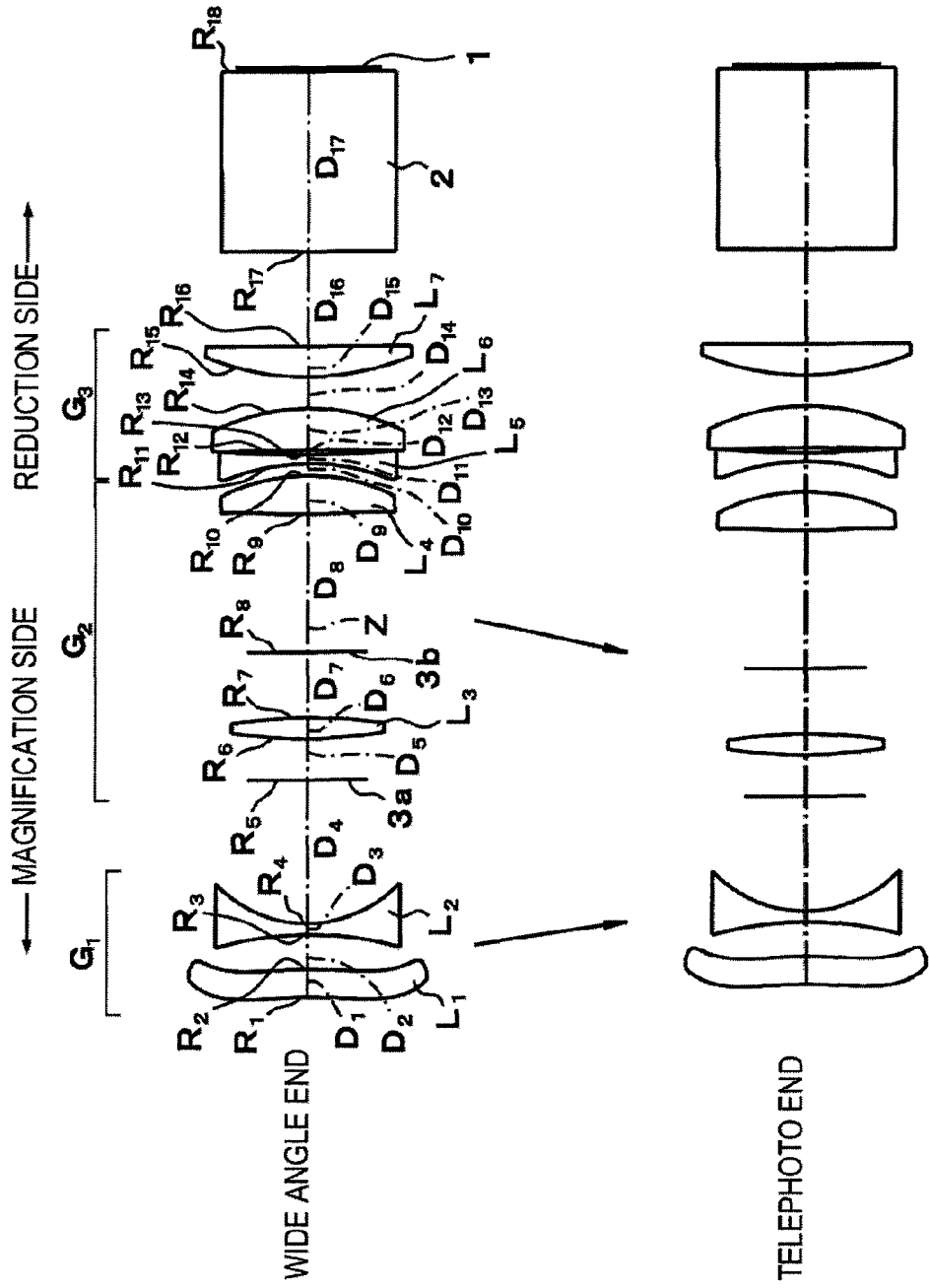
FIG. 2 is a diagram illustrating the structure of a projection variable focus lens according to Example 2 of the invention.

The projection variable focus lens according to Example 2 has the structure shown in FIG. 2.

That is, the projection variable focus lens has substantially the same structure as that according to Example 1 except that the first lens L1 has a low positive power and includes aspheric surfaces at both sides, two masks 3a and 3b (aperture diaphragms may be used instead of the masks: which is the same with the following examples) are provided in the second lens group G2, and the seventh lens L7 is a planoconvex lens having a convex surface facing the magnification side.

Similar to Example 1, when power varies from the wide angle end to the telephoto end, the first lens group G1 is moved to the reduction side along the optical axis Z and the second lens group G2 is moved to the magnification side along the optical axis Z.

Focusing is performed by moving the first lens group G1 in the direction of the optical axis Z (varifocal lens type).

In Table 2, an upper part shows the curvature radius R of each lens surface according to Example 2, the thickness of the center of each lens and the air space D between the lenses, and the refractive index Nd and the Abbe number Γd of each lens with respect to the d-line.

In Table 2, a middle part shows the variable spacing 1 and the variable spacing 2 at the wide angle end (wide), the middle position (middle), and the telephoto end (tele). In Table 2, a lower part shows the values of the constants K and A3 to A16 corresponding to the aspheric surfaces.

TABLE 2

Focal length F = 1.00~1.06~1.10

| Surface | R | D | Nd | νd |
|---|---|---|---|---|
| 1 * | −2.479 | 0.209 | 1.4910 | 57.6 |
| 2 * | −2.528 | 0.258 | | |
| 3 | −2.495 | 0.084 | 1.5163 | 64.1 |
| 4 | 0.919 | (Movement 1) | | |
| 5 (Mask) | ∞ | 0.315 | | |
| 6 | 3.673 | 0.158 | 1.7725 | 49.6 |
| 7 | −3.574 | 0.486 | | |
| 8 (Mask) | ∞ | 1.054 | | |
| 9 * | 8.941 | 0.290 | 1.5686 | 58.6 |
| 10 * | −1.391 | (Movement 2) | | |
| 11 | −1.568 | 0.067 | 1.8052 | 25.4 |
| 12 | 8.606 | 0.037 | | |
| 13 | −18.733 | 0.315 | 1.4875 | 70.2 |
| 14 | −1.533 | 0.237 | | |
| 15 | 1.960 | 0.234 | 1.5891 | 61.1 |
| 16 | ∞ | 0.705 | | |
| 17 | ∞ | 1.363 | 1.5163 | 64.1 |
| 18 | ∞ | | | |

| Movement spacing | Wide angle end | Middle position | Telephoto end |
|---|---|---|---|
| Movement 1 | 1.081 | 0.945 | 0.862 |
| Movement 2 | 0.092 | 0.176 | 0.232 |

Aspheric coefficient

| Surface number | K | $A_3$ | $A_4$ | $A_5$ | $A_6$ |
|---|---|---|---|---|---|
| 1 | 6.17900 | −3.22821E−01 | 2.32736E+00 | −3.02198E+00 | 1.04087E+00 |

TABLE 2-continued

| | $A_7$ | $A_8$ | $A_9$ | $A_{10}$ | $A_{11}$ |
|---|---|---|---|---|---|
| | 8.89654E−01 | 1.18609E+00 | −1.68820E+00 | 2.25705E−01 | −4.56955E+00 |
| | $A_{12}$ | $A_{13}$ | $A_{14}$ | $A_{15}$ | $A_{16}$ |
| | 4.40029E+00 | 1.48691E+01 | −3.91562E+01 | 3.94074E+01 | −1.50538E+01 |
| | K | $A_3$ | $A_4$ | $A_5$ | $A_6$ |
| 2 | 5.27549 | −2.98407E−01 | 2.04736E+00 | −1.16079E+00 | −4.70990E+00 |
| | $A_7$ | $A_8$ | $A_9$ | $A_{10}$ | $A_{11}$ |
| | 7.31615E+00 | 3.06011E+00 | −5.53551E+00 | −8.57346E+00 | 1.06323E+01 |
| | $A_{12}$ | $A_{13}$ | $A_{14}$ | $A_{15}$ | $A_{16}$ |
| | −1.78951E+01 | 3.93643E+01 | −4.94291E+01 | 6.45666E+01 | −4.22588E+01 |
| | K | $A_4$ | $A_6$ | $A_8$ | $A_{10}$ |
| 9 | 1.00000 | −2.72295E−02 | −9.71849E−02 | 1.77450E−01 | −9.29171E−01 |
| | K | $A_4$ | $A_6$ | $A_8$ | $A_{10}$ |
| 10 | 1.00000 | 4.12943E−02 | −4.95121E−02 | 7.98072E−02 | −7.11639E−01 |

\* Aspheric surface

In addition, Table 17 shows numerical values corresponding to the conditional expressions according to Example 2.

Figure 18:
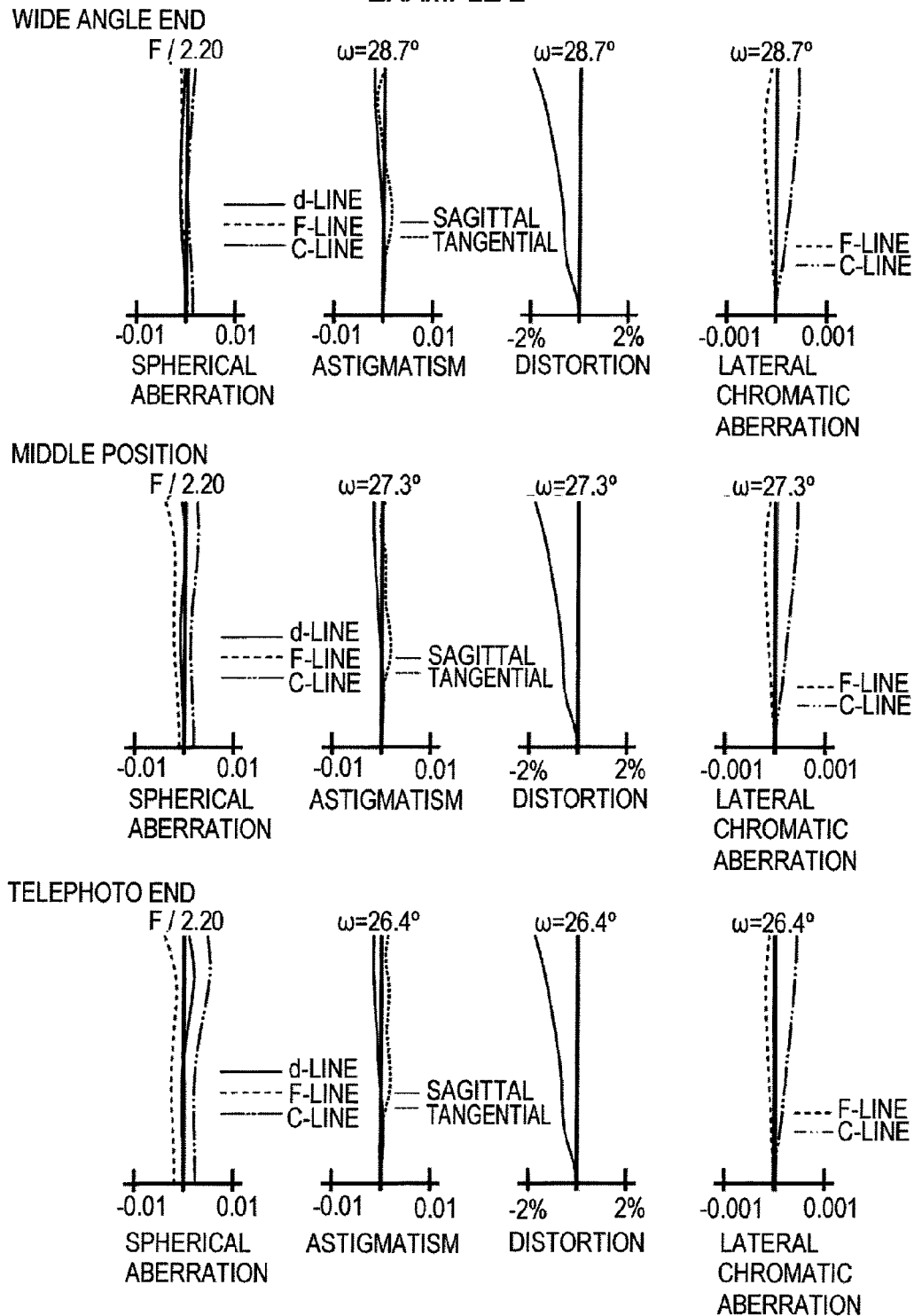
FIG. 18 is a diagram illustrating all aberrations of the projection variable focus lens according to Example 2.

FIG. 18 is an aberration diagram illustrating all aberrations (spherical aberration, astigmatism, distortion, and lateral chromatic aberration) of the projection variable focus lens according to Example 2 at the wide angle end (wide), the middle position (middle), and the telephoto end (tele).

As can be seen from FIG. 18, the projection variable focus lens according to Example 2 has an angle of view 2ω of 57.4 degrees, which is a wide angle, and an F number of 2.20, which is a large value, at the wide angle end. Therefore, all aberrations are effectively corrected.

In addition, as shown in Table 17, the projection variable focus lens according to Example 2 satisfies all of Conditional expressions 1 to 3, and Conditional expressions 1' and 2'.

Example 3

Figure 3:
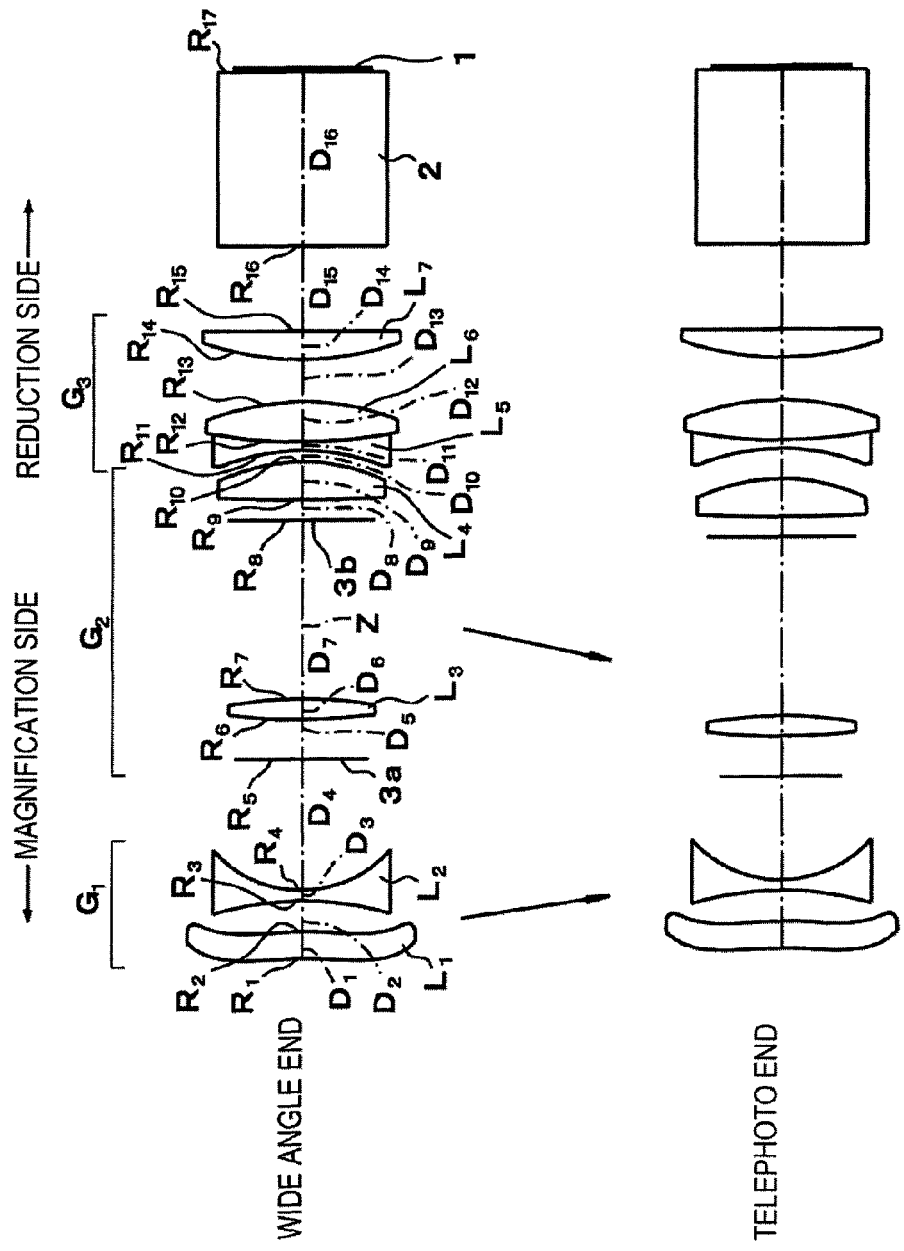
FIG. 3 is a diagram illustrating the structure of a projection variable focus lens according to Example 3 of the invention.

The projection variable focus lens according to Example 3 has the structure shown in FIG. 3.

That is, the projection variable focus lens has substantially the same structure as that according to Example 2 except that the sixth lens L6, which is a biconvex lens, is bonded to the fifth lens L5 to form a cemented lens and the seventh lens L7 is a positive meniscus lens having a convex surface facing the magnification side.

Similar to Example 2, when power varies from the wide angle end to the telephoto end, the first lens group G1 is moved to the reduction side along the optical axis Z and the second lens group G2 is moved to the magnification side along the optical axis Z.

Focusing is performed by moving the first lens group G1 in the direction of the optical axis Z (varifocal lens type).

In Table 3, an upper part shows the curvature radius R of each lens surface according to Example 3, the thickness of the center of each lens and the air space D between the lenses, and the refractive index Nd and the Abbe number vd of each lens with respect to the d-line.

In Table 3, a middle part shows the variable spacing 1 and the variable spacing 2 at the wide angle end (wide), the middle position (middle), and the telephoto end (tele). In Table 3, a lower part shows the values of the constants K and A3 to A16 corresponding to the aspheric surfaces.

TABLE 3

| Focal length F = 1.00~1.06~1.10 | | | | |
|---|---|---|---|---|
| Surface | R | D | Nd | vd |
| 1 \* | −2.824 | 0.210 | 1.4910 | 57.6 |
| 2 \* | −2.794 | 0.239 | | |
| 3 | −2.385 | 0.084 | 1.4875 | 70.2 |
| 4 | 0.896 | (Movement 1) | | |
| 5 (Mask) | ∞ | 0.315 | | |
| 6 | 4.834 | 0.159 | 1.7725 | 49.6 |
| 7 | −3.249 | 1.399 | | |
| 8 (Mask) | ∞ | 0.157 | | |
| 9 \* | 11.304 | 0.299 | .1.5686 | 58.6 |
| 10 \* | −1.387 | (Movement 2) | | |
| 11 | −1.651 | 0.066 | 1.7552 | 27.5 |
| 12 | 3.689 | 0.315 | 1.5638 | 60.7 |
| 13 | −1.975 | 0.334 | | |
| 14 | 2.238 | 0.221 | 1.6031 | 60.6 |

TABLE 3-continued

| 15 | 380.754 | 0.666 | | |
|---|---|---|---|---|
| 16 | ∞ | 1.363 | 1.5163 | 64.1 |
| 17 | ∞ | | | |

| Movement spacing | Wide angle end | Middle position | Telephoto end |
|---|---|---|---|
| Movement 1 | 1.020 | 0.885 | 0.804 |
| Movement 2 | 0.088 | 0.178 | 0.237 |

Aspheric coefficient

| Surface number | K | $A_3$ | $A_4$ | $A_5$ | $A_6$ |
|---|---|---|---|---|---|
| 1 | 8.89661E+00 | −2.97029E−01 | 2.09319E+00 | −2.58938E+00 | 8.69E−01 |
| | $A_7$ | $A_8$ | $A_9$ | $A_{10}$ | $A_{11}$ |
| | 6.17035E−01 | 1.14251E+00 | −1.49546E+00 | 5.06644E−01 | −4.39767E+00 |
| | $A_{12}$ | $A_{13}$ | $A_{14}$ | $A_{15}$ | $A_{16}$ |
| | 4.32737E+00 | 1.45235E+01 | −3.96647E+01 | 3.92619E+01 | −1.42811E+01 |
| | K | $A_3$ | $A_4$ | $A_5$ | $A_6$ |
| 2 | 7.14787E+00 | −2.78596E−01 | 1.84297E+00 | −8.03066E−01 | −4.70E+00 |
| | $A_7$ | $A_8$ | $A_9$ | $A_{10}$ | $A_{11}$ |
| | 6.83226E+00 | 2.72510E+00 | −5.23200E+00 | −7.68876E+00 | 1.15277E+01 |
| | $A_{12}$ | $A_{13}$ | $A_{14}$ | $A_{15}$ | $A_{16}$ |
| | −1.79045E+01 | 3.78223E+01 | −5.23687E+01 | 6.28225E+01 | −3.65180E+01 |
| | K | $A_4$ | $A_6$ | $A_8$ | $A_{10}$ |
| 9 | 1.00000 | −2.72820E−03 | −6.87469E−03 | −1.68442E−02 | −1.27585E−01 |
| | K | $A_4$ | $A_6$ | $A_8$ | $A_{10}$ |
| 10 | 1.00000 | 5.19166E−02 | 3.06908E−02 | −6.21477E−02 | −8.03048E−02 |

* Aspheric surface

In addition, Table 17 shows numerical values corresponding to the conditional expressions according to Example 3.

Figure 19:
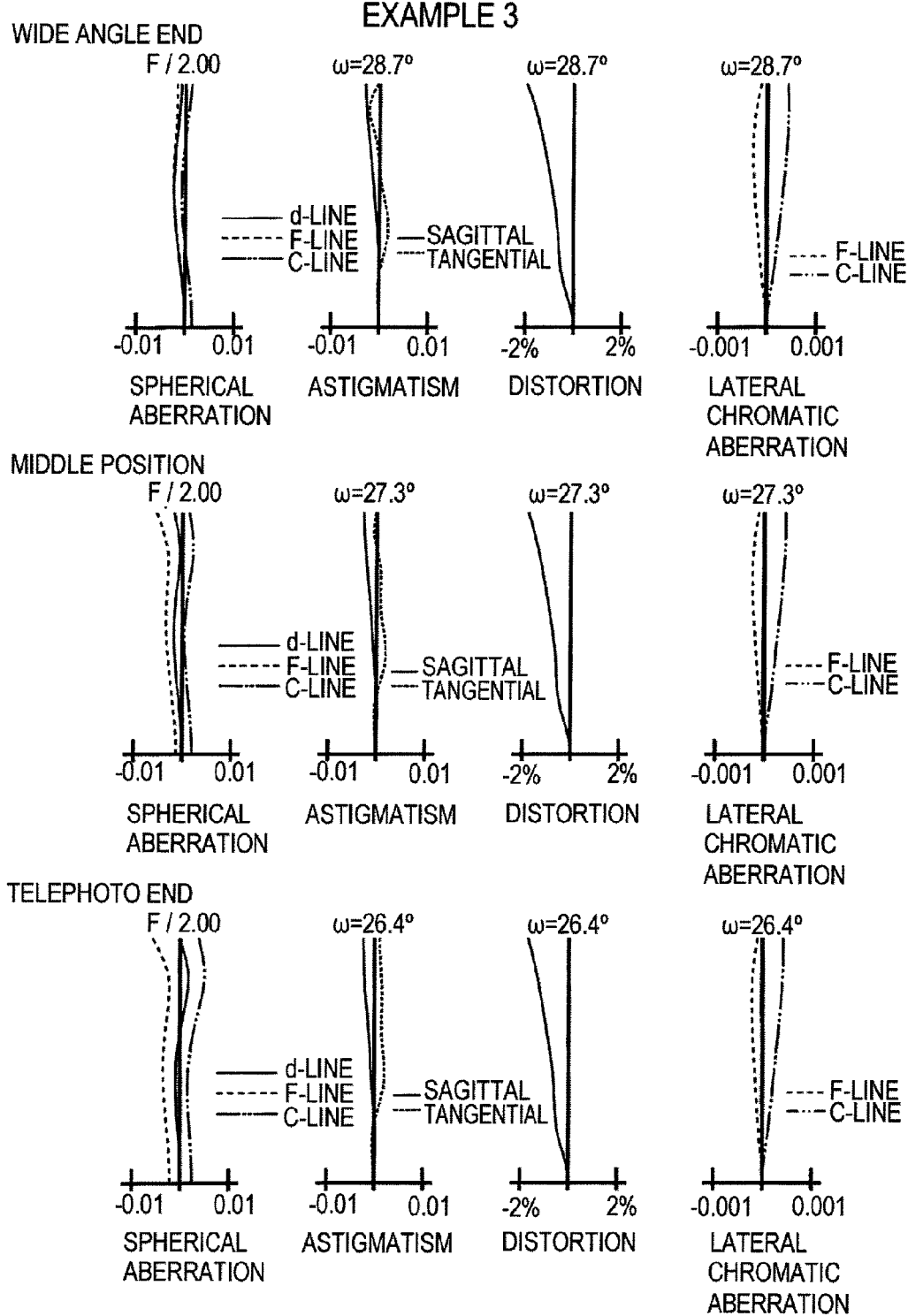
FIG. 19 is a diagram illustrating all aberrations of the projection variable focus lens according to Example 3.

FIG. 19 is an aberration diagram illustrating all aberrations (spherical aberration, astigmatism, distortion, and lateral chromatic aberration) of the projection variable focus lens according to Example 3 at the wide angle end (wide), the middle position (middle), and the telephoto end (tele).

As can be seen from FIG. 19, the projection variable focus lens according to Example 3 has an angle of view 2ω of 57.4 degrees, which is a wide angle, and an F number of 2.00, which is a large value, at the wide angle end. Therefore, all aberrations are effectively corrected.

In addition, as shown in Table 17, the projection variable focus lens according to Example 3 satisfies all of Conditional expressions 1 to 3 and Conditional expressions 1' and 2'.

Example 4

Figure 4:
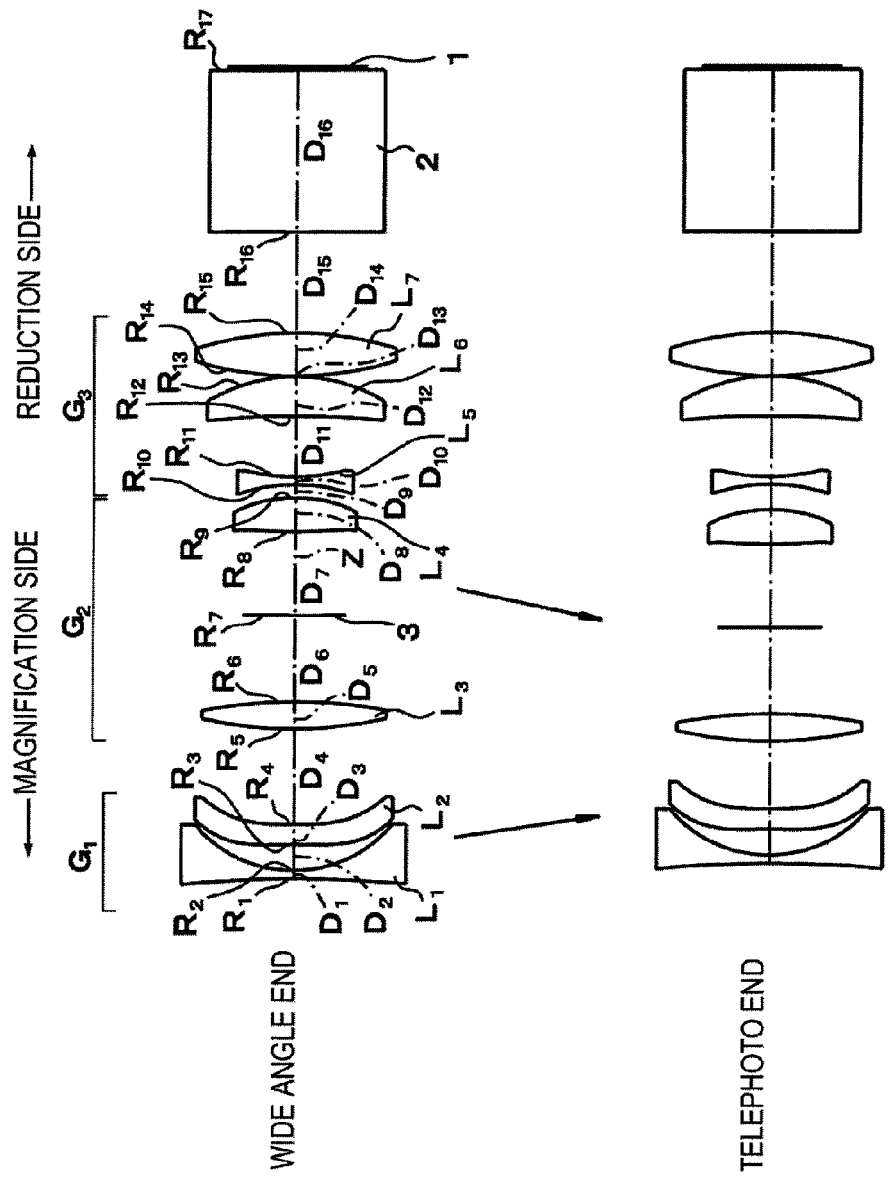
FIG. 4 is a diagram illustrating the structure of a projection variable focus lens according to Example 4 of the invention.

The projection variable focus lens according to Example 4 has the structure shown in FIG. 4.

That is, the projection variable focus lens has substantially the same structure as that according to Example 1 except that the first lens L1 is a biconcave lens, the second lens L2 is an aspheric lens which includes aspheric surfaces at both sides and a low refractive power, and one mask 3 is arranged in the second lens group G2.

Similar to Example 1, when power varies from the wide angle end to the telephoto end, the first lens group G1 is moved to the reduction side along the optical axis and the second lens group G2 is moved to the magnification side along the optical axis Z.

Focusing is performed by moving the first lens group G1 in the direction of the optical axis Z (varifocal lens type).

In Table 4, an upper part shows the curvature radius R of each lens surface according to Example 4, the thickness of the center of each lens and the air space D between the lenses, and the refractive index Nd and the Abbe number vd of each lens with respect to the d-line.

In Table 4, a middle part shows the variable spacing 1 and the variable spacing 2 at the wide angle end (wide), the middle position (middle), and the telephoto end (tele). In Table 4, a lower part shows the values of the constants K and A3 to A16 corresponding to the aspheric surfaces.

TABLE 4

| Focal length F = 1.00~1.06~1.10 | | | | |
|---|---|---|---|---|
| Surface | R | D | Nd | νd |
| 1 | −9.112 | 0.065 | 1.4875 | 70.2 |
| 2 | 0.977 | 0.203 | | |
| 3* | −7.308 | 0.157 | 1.4910 | 57.6 |
| 4* | 4.723 | (Movement 1) | | |
| 5 | 3.085 | 0.213 | 1.8340 | 37.2 |
| 6 | −3.786 | 0.680 | | |
| 7 (Mask) | ∞ | 0.655 | | |
| 8* | 3.115 | 0.269 | 1.5686 | 58.6 |
| 9* | −1.146 | (Movement 2) | | |
| 10 | −1.331 | 0.060 | 1.8052 | 25.4 |
| 11 | 1.491 | 0.479 | | |
| 12 | −7.412 | 0.314 | 1.5891 | 61.1 |
| 13 | −1.288 | 0.005 | | |
| 14 | 2.579 | 0.338 | 1.5891 | 61.1 |
| 15 | −2.514 | 0.785 | | |
| 16 | ∞ | 1.271 | 1.5163 | 64.1 |
| 17 | ∞ | | | |

| Movement spacing | Wide angle end | Middle position | Telephoto end |
|---|---|---|---|
| Movement 1 | 0.750 | 0.616 | 0.534 |
| Movement 2 | 0.105 | 0.163 | 0.202 |

| Aspheric coefficient | | | | |
|---|---|---|---|---|
| Surface number | K | $A_3$ | $A_4$ | $A_5$ | $A_6$ |
| 3 | 89.97791 | −2.09806E−01 | 2.37494E+00 | −2.53E+00 | 3.13E−01 |
| | $A_7$ | $A_8$ | $A_9$ | $A_{10}$ | $A_{11}$ |
| | 3.00233E−01 | 2.08020E+00 | −2.60599E−01 | 3.92813E−01 | −6.87878E+00 |
| | $A_{12}$ | $A_{13}$ | $A_{14}$ | $A_{15}$ | $A_{16}$ |
| | 1.05687E+00 | 1.42571E+01 | −3.42406E+01 | 5.13254E+01 | −2.75356E+01 |
| | K | $A_3$ | $A_4$ | $A_5$ | $A_6$ |
| 4 | −37.35042 | −1.29365E−01 | 1.57405E+00 | 6.46E−01 | −6.46E+00 |
| | $A_7$ | $A_8$ | $A_9$ | $A_{10}$ | $A_{11}$ |
| | 5.95628E+00 | 3.77463E+00 | −2.36875E+00 | −5.77412E+00 | 7.70609E+00 |
| | $A_{12}$ | $A_{13}$ | $A_{14}$ | $A_{15}$ | $A_{16}$ |
| | −3.05282E+01 | 2.92867E+01 | −3.26734E+01 | 1.23894E+02 | −1.04232E+02 |
| | K | $A_4$ | $A_6$ | $A_8$ | $A_{10}$ |
| 8 | 1.00000 | −1.55721E−01 | −1.14746E+00 | 4.76642E+00 | −3.74955E+01 |
| | K | $A_4$ | $A_6$ | $A_8$ | $A_{10}$ |
| 9 | 1.00000 | −4.41173E−02 | −4.59140E−01 | −1.65310E+00 | −1.19278E+01 |

*Aspheric surface

In addition, Table 17 shows numerical values corresponding to the conditional expressions according to Example 4.

Figure 20:
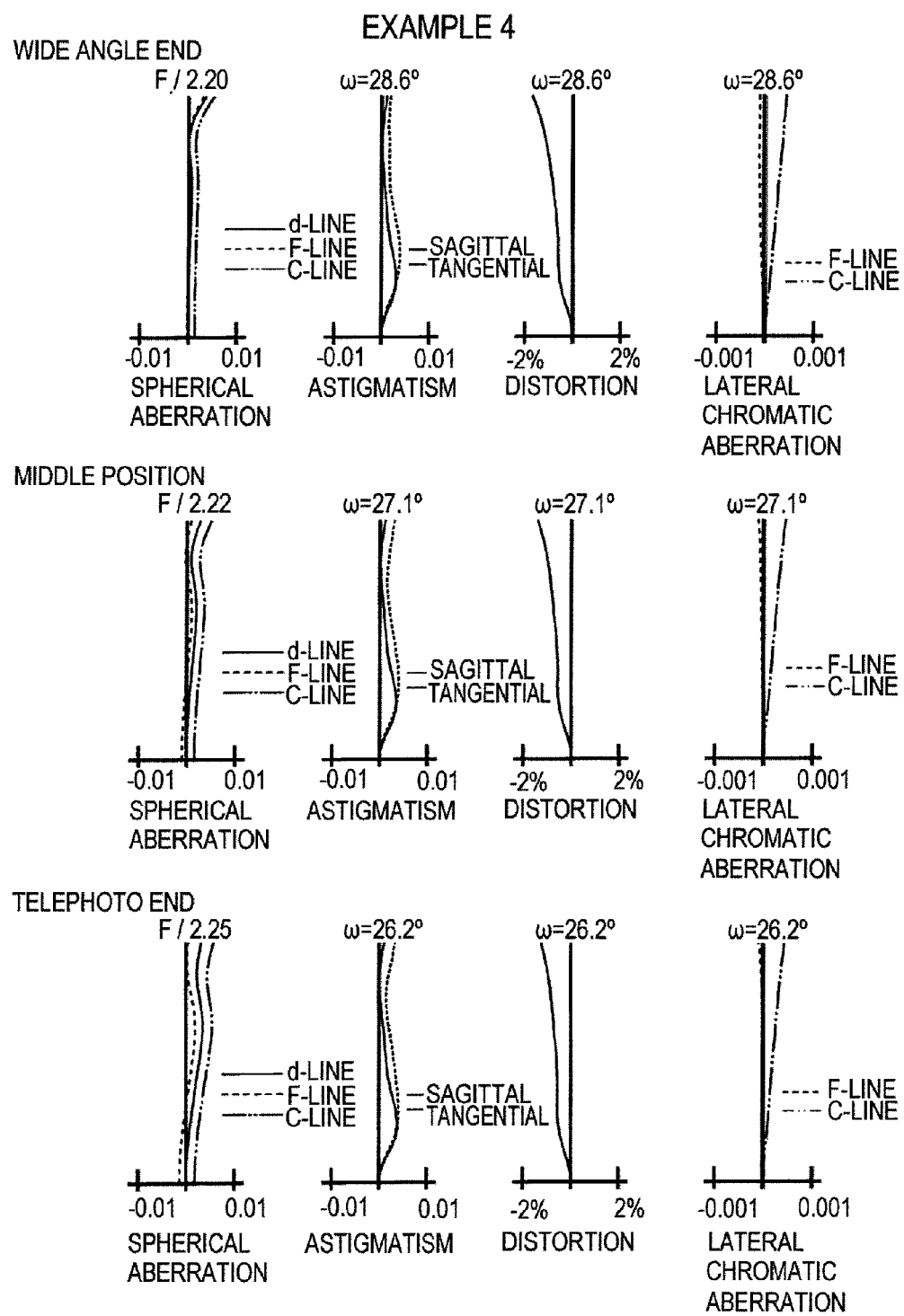
FIG. 20 is a diagram illustrating all aberrations of the projection variable focus lens according to Example 4.

FIG. 20 is an aberration diagram illustrating all aberrations (spherical aberration, astigmatism, distortion, and lateral chromatic aberration) of the projection variable focus lens according to Example 4 at the wide angle end (wide), the middle position (middle), and the telephoto end (tele).

As can be seen from FIG. 20, the projection variable focus lens according to Example 4 has an angle of view 2ω of 57.2 degrees, which is a wide angle, and an F number of 2.20, which is a large value, at the wide angle end. Therefore, all aberrations are effectively corrected.

In addition, as shown in Table 17, the projection variable focus lens according to Example 4 satisfies all of Conditional expressions 1 to 3 and Conditional expressions 1' and 2'.

Example 5

Figure 5:
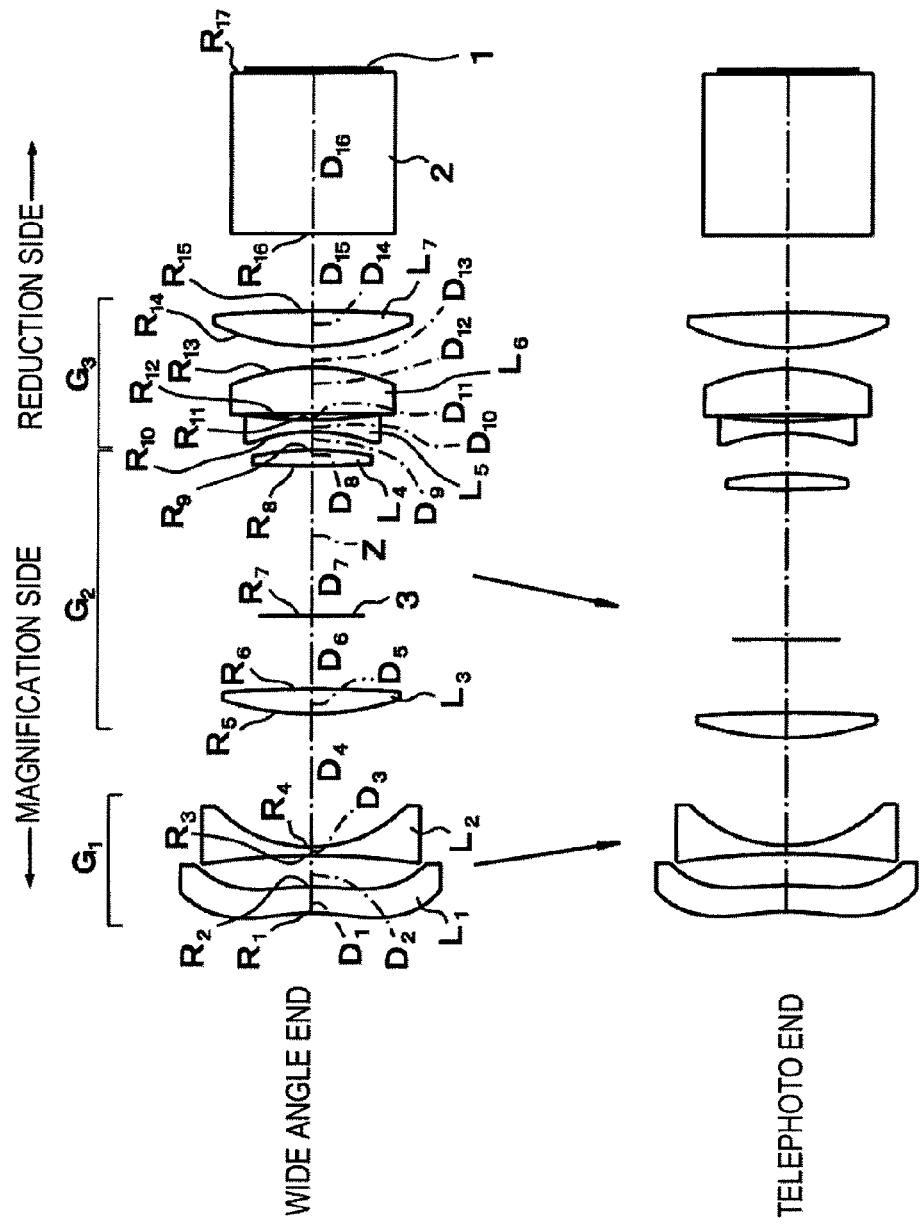
FIG. 5 is a diagram illustrating the structure of a projection variable focus lens according to Example 5 of the invention.

The projection variable focus lens according to Example 5 has the structure shown in FIG. 5.

That is, the projection variable focus lens has substantially the same structure as that according to Example 1 except that the fourth lens L4 is a spherical biconvex lens and one mask 3 is arranged in the second lens group G2.

Similar to Example 1, when power varies from the wide angle end to the telephoto end, the first lens group G1 is moved to the reduction side along the optical axis Z and the second lens group G2 is moved to the magnification side along the optical axis Z.

Focusing is performed by moving the first lens group G1 in the direction of the optical axis Z (varifocal lens type).

In Table 5, an upper part shows the curvature radius R of each lens surface according to Example 5, the thickness of the center of each lens and the air space D between the lenses, and the refractive index Nd and the Abbe number vd of each lens with respect to the d-line.

In Table 5, a middle part shows the variable spacing 1 and the variable spacing 2 at the wide angle end (wide), the middle position (middle), and the telephoto end (tele). In Table 5, a lower part shows the values of the constants K and A3 to A16 corresponding to the aspheric surfaces.

Figure 21:
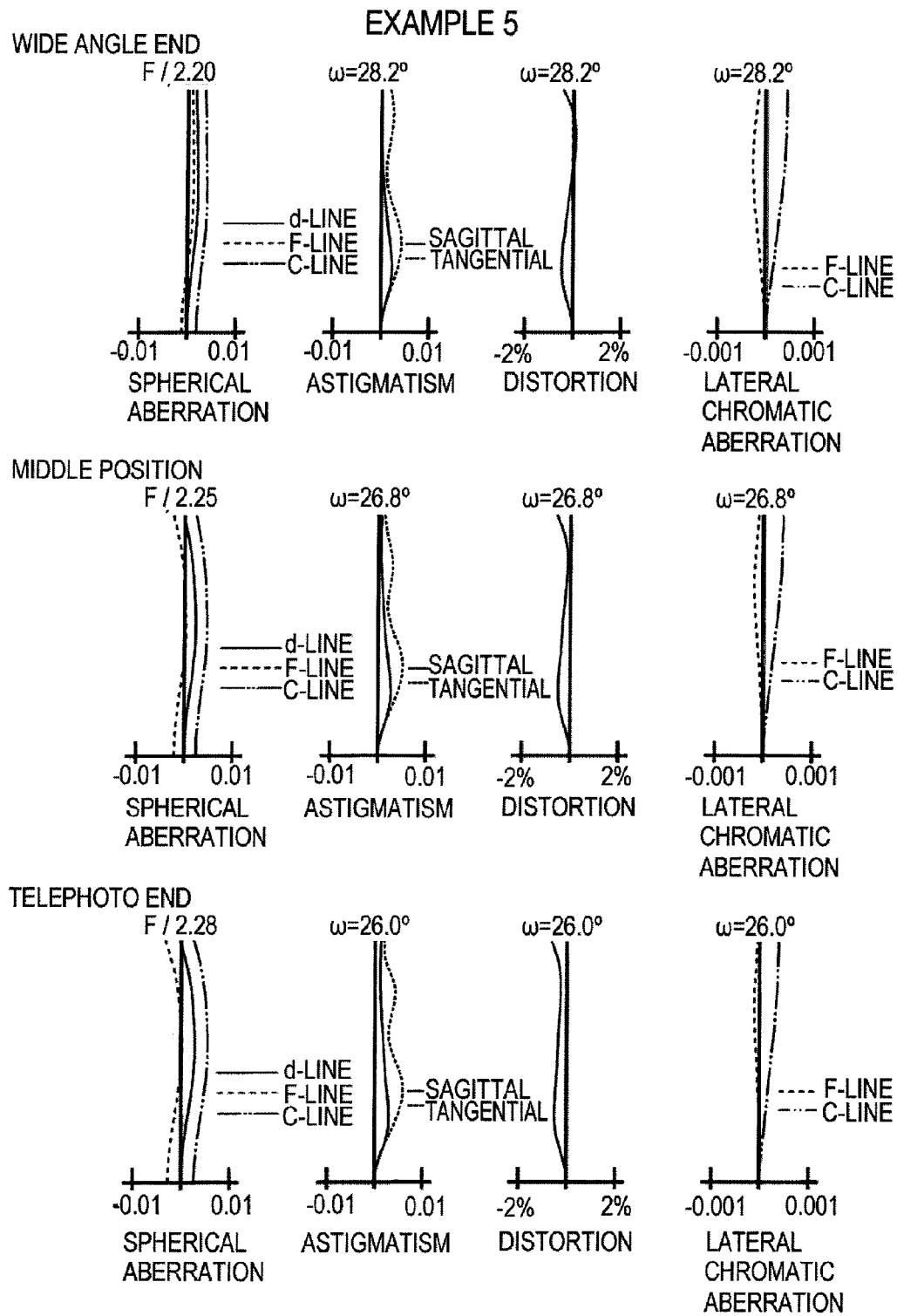
FIG. 21 is a diagram illustrating all aberrations of the projection variable focus lens according to Example 5.

FIG. 21 is an aberration diagram illustrating all aberrations (spherical aberration, astigmatism, distortion, and lateral chromatic aberration) of the projection variable focus lens according to Example 5 at the wide angle end (wide), the middle position (middle), and the telephoto end (tele).

As can be seen from FIG. 21, the projection variable focus lens according to Example 5 has an angle of view $2\omega$ of 56.4 degrees, which is a wide angle, and an F number of 2.20, which is a large value, at the wide angle end. Therefore, all aberrations are effectively corrected.

In addition, as shown in Table 17, the projection variable focus lens according to Example 5 satisfies all of Conditional expressions 1 to 3 and Conditional expressions 1' and 2'.

Example 6

Figure 6:
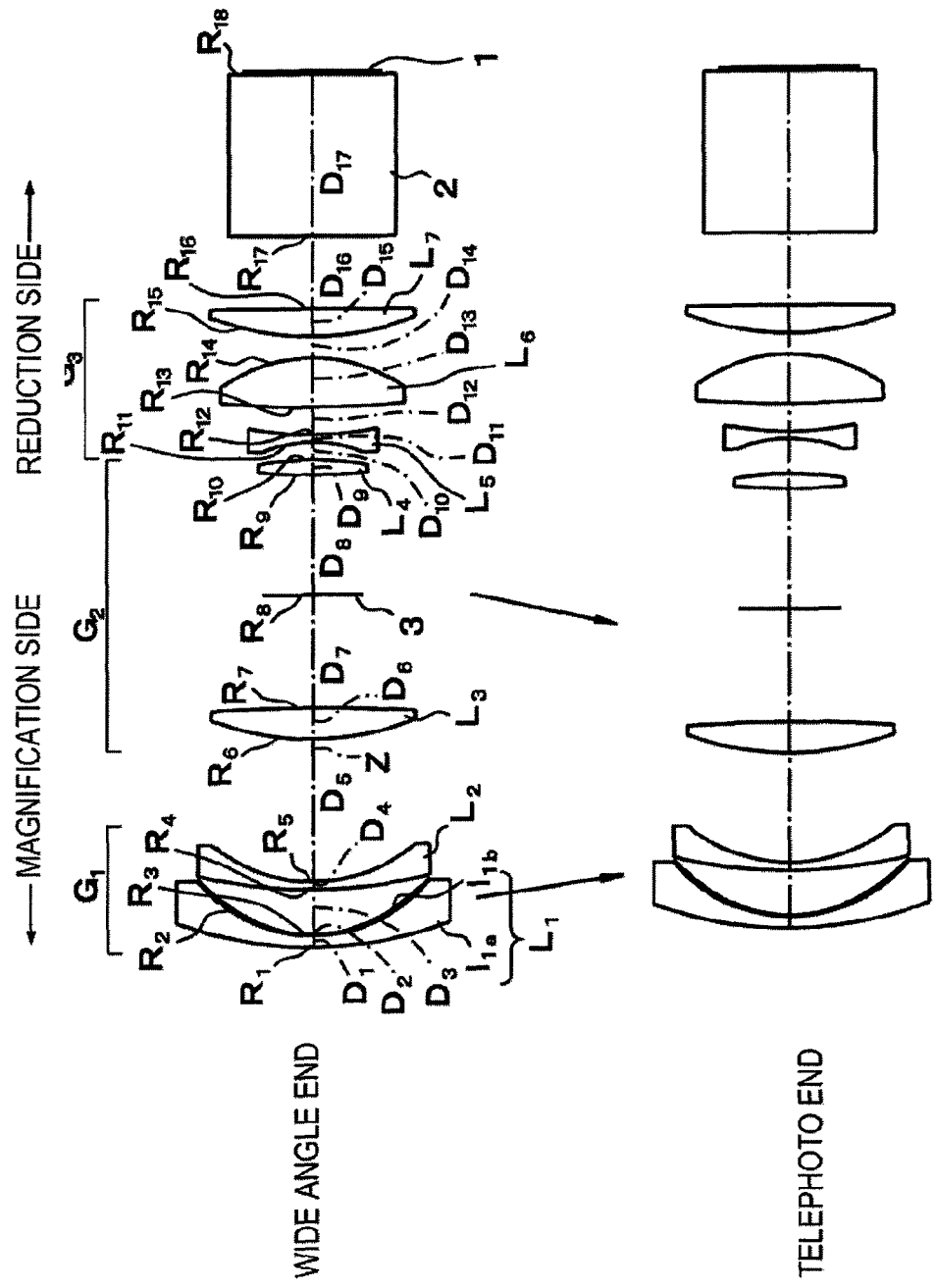
FIG. 6 is a diagram illustrating the structure of a projection variable focus lens according to Example 6 of the invention.

The projection variable focus lens according to Example 6 has the structure shown in FIG. 6.

TABLE 5

Focal length F = 1.00~1.06~1.10

| Surface | R | D | Nd | vd |
|---|---|---|---|---|
| 1* | −1.460 | 0.204 | 1.4910 | 57.6 |
| 2* | −2.029 | 0.246 | | |
| 3 | −5.485 | 0.065 | 1.4875 | 70.2 |
| 4 | 0.995 | (Movement 1) | | |
| 5 | 2.110 | 0.199 | 1.7725 | 49.6 |
| 6 | −8.757 | 0.574 | | |
| 7 (Mask) | ∞ | 1.180 | | |
| 8 | 6.695 | 0.128 | 1.7130 | 53.9 |
| 9 | −2.237 | (Movement 2) | | |
| 10 | −1.301 | 0.094 | 1.8052 | 25.4 |
| 11 | 3.167 | 0.049 | | |
| 12 | −19.568 | 0.366 | 1.7130 | 53.9 |
| 13 | −1.486 | 0.167 | | |
| 14 | 1.728 | 0.277 | 1.7130 | 53.9 |
| 15 | −8.690 | 0.599 | | |
| 16 | ∞ | 1.269 | 1.5163 | 64.1 |
| 17 | ∞ | | | |

| Movement spacing | Wide angle end | Middle position | Telephoto end |
|---|---|---|---|
| Movement 1 | 1.047 | 0.923 | 0.848 |
| Movement 2 | 0.145 | 0.249 | 0.319 |

Aspheric coefficient

| Surface number | K | $A_3$ | $A_4$ | $A_5$ | $A_6$ |
|---|---|---|---|---|---|
| 1 | −12.34700 | −1.37712E−01 | 1.28161E+00 | −1.27349E+00 | 3.05350E−01 |

| | $A_7$ | $A_8$ | $A_9$ | $A_{10}$ | $A_{11}$ |
|---|---|---|---|---|---|
| | 1.42085E−02 | 5.37595E−01 | −2.55331E−01 | 2.84700E−01 | −1.33861E+00 |

| | $A_{12}$ | $A_{13}$ | $A_{14}$ | $A_{15}$ | $A_{16}$ |
|---|---|---|---|---|---|
| | 6.82328E−01 | 2.79358E+00 | −6.88018E+00 | 6.83997E+00 | −2.48574E+00 |

| | K | $A_3$ | $A_4$ | $A_5$ | $A_6$ |
|---|---|---|---|---|---|
| 2 | 0.66647 | −8.49687E−02 | 1.31848E+00 | 2.82931E−01 | −3.53510E+00 |

| | $A_7$ | $A_8$ | $A_9$ | $A_{10}$ | $A_{11}$ |
|---|---|---|---|---|---|
| | 2.60009E+00 | 1.72750E+00 | −3.49918E−01 | −1.48867E+00 | 1.65313E+00 |

| | $A_{12}$ | $A_{13}$ | $A_{14}$ | $A_{15}$ | $A_{16}$ |
|---|---|---|---|---|---|
| | −7.91038E+00 | 5.23875E+00 | −5.09785E+00 | 2.09584E+01 | −1.51156E+01 |

*Aspheric surface

In addition, Table 17 shows numerical values corresponding to the conditional expressions according to Example 5.

That is, the projection variable focus lens has substantially the same structure as that according to Example 5 except that the first lens L1 is a composite aspheric lens (in which a resin film is provided on a reduction-side surface of a glass lens and the surface of the glass lens closest to the reduction side is an aspheric surface) having a negative meniscus shape in which a concave surface faces the reduction side, the second lens L2 is a negative meniscus lens having a convex surface facing the magnification side, and the sixth lens L6 is a biconvex lens.

Similar to Example 1, when power varies from the wide angle end to the telephoto end, the first lens group G1 is moved to the reduction side along the optical axis Z and the second lens group G2 is moved to the magnification side along the optical axis Z.

Focusing is performed by moving the first lens group G1 in the direction of the optical axis Z (varifocal lens type).

In Table 6, an upper part shows the curvature radius R of each lens surface according to Example 6, the thickness of the center of each lens and the air space D between the lenses, and the refractive index Nd and the Abbe number vd of each lens with respect to the d-line.

In Table 6, a middle part shows the variable spacing 1 and the variable spacing 2 at the wide angle end (wide), the middle position (middle), and the telephoto end (tele). In Table 6, a lower part shows the values of the constants K and A3 to A16 corresponding to the aspheric surfaces.

In addition, Table 17 shows numerical values corresponding to the conditional expressions according to Example 6.

Figure 22:
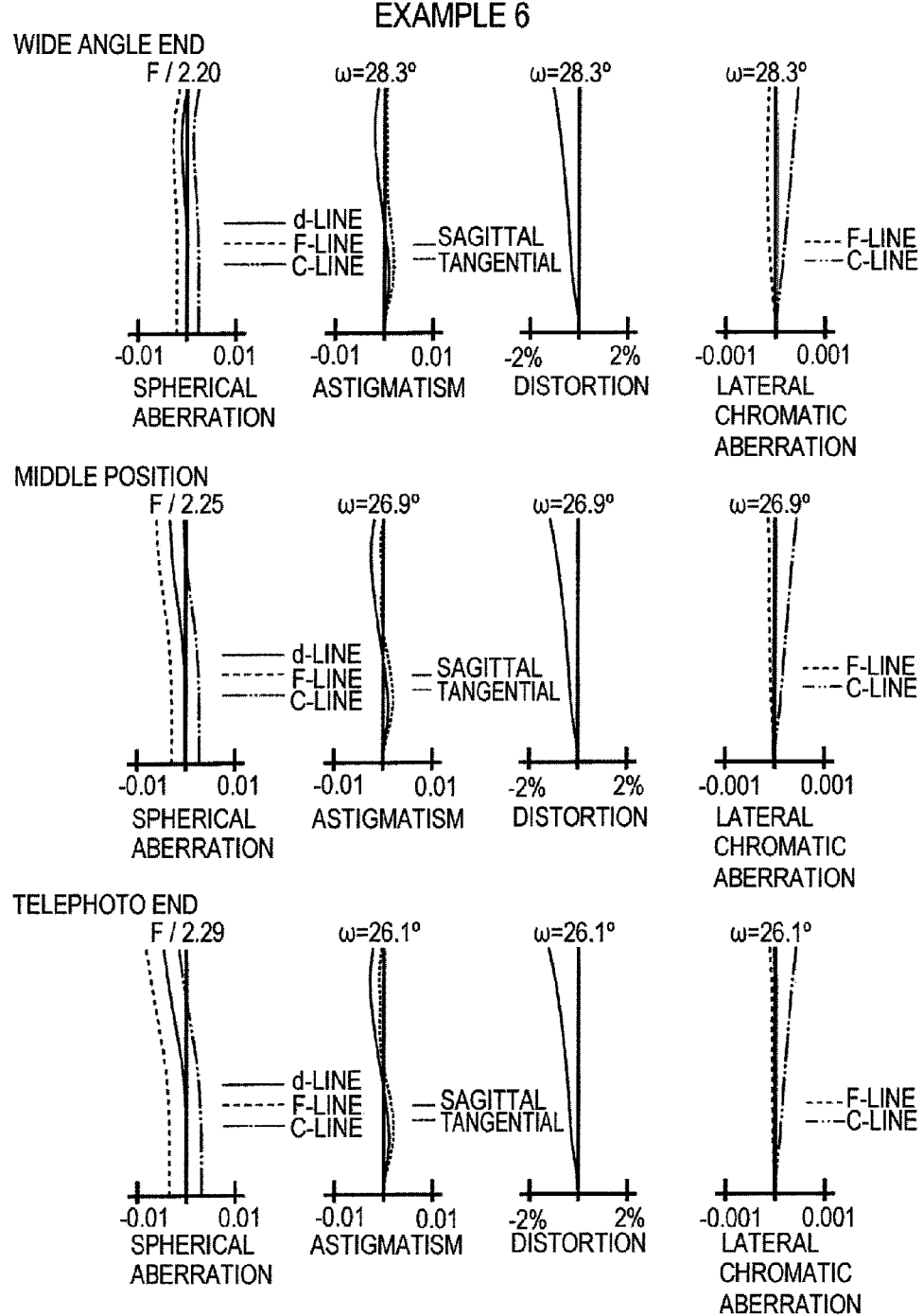
FIG. 22 is a diagram illustrating all aberrations of the projection variable focus lens according to Example 6.

FIG. 22 is an aberration diagram illustrating all aberrations (spherical aberration, astigmatism, distortion, and lateral chromatic aberration) of the projection variable focus lens according to Example 6 at the wide angle end (wide), the middle position (middle), and the telephoto end (tele).

As can be seen from FIG. 22, the projection variable focus lens according to Example 6 has an angle of view 2ω of 56.6 degrees, which is a wide angle, and an F number of 2.20, which is a large value, at the wide angle end. Therefore, all aberrations are effectively corrected.

In addition, as shown in Table 17, the projection variable focus lens according to Example 6 satisfies all of Conditional expressions 1 and 2 and Conditional expressions 1' and 2'.

Second Example Group

A second example group includes projection variable focus lenses according to the following Examples 7 and 8. Each of the projection variable focus lenses includes a first lens group G1 including a first lens L1 and a second lens L2, a second lens group G2 including a third lens L3 and a fourth lens L4, and a third lens group G3 including fifth to seventh lenses L5 to L7. When power varies, the second lens group G2 and the third lens group G3 are independently moved.

TABLE 6

Focal length F = 1.00~1.06~1.10

| Surface | R | D | Nd | vd |
|---|---|---|---|---|
| 1 | 2.921 | 0.090 | 1.4875 | 70.2 |
| 2 | 1.128 | 0.008 | 1.5277 | 41.9 |
| 3* | 0.980 | 0.350 | | |
| 4 | 3.579 | 0.064 | 1.4875 | 70.2 |
| 5 | 1.205 | (Movement 1) | | |
| 6 | 2.139 | 0.245 | 1.8040 | 46.6 |
| 7 | −12.525 | 0.886 | | |
| 8 (Mask) | ∞ | 0.941 | | |
| 9 | 4.933 | 0.118 | 1.7880 | 47.4 |
| 10 | −2.301 | (Movement 2) | | |
| 11 | −0.993 | 0.057 | 1.8052 | 25.4 |
| 12 | 2.471 | 0.216 | | |
| 13 | 7.834 | 0.390 | 1.7130 | 53.9 |
| 14 | −1.180 | 0.168 | | |
| 15 | 2.143 | 0.218 | 1.7130 | 53.9 |
| 16 | −61.078 | 0.554 | | |
| 17 | ∞ | 1.266 | 1.5163 | 64.1 |
| 18 | ∞ | | | |

| Movement spacing | Wide angle end | Middle position | Telephoto end |
|---|---|---|---|
| Movement 1 | 1.116 | 0.955 | 0.857 |
| Movement 2 | 0.139 | 0.222 | 0.277 |

Aspheric coefficient

| Surface number | K | $A_3$ | $A_4$ | $A_5$ | $A_6$ |
|---|---|---|---|---|---|
| 3 | 1.00000 | 1.34019E−02 | −1.41664E−01 | 1.77179E−01 | −2.52041E−01 |

| | $A_7$ | $A_8$ | $A_9$ | $A_{10}$ | $A_{11}$ |
|---|---|---|---|---|---|
| | −1.10171E−01 | 1.57399E−01 | 2.01277E−01 | −5.72984E−03 | −3.18941E−01 |

| | $A_{12}$ | $A_{13}$ | $A_{14}$ | $A_{15}$ | $A_{16}$ |
|---|---|---|---|---|---|
| | −4.31501E−01 | −1.11313E−01 | 6.10592E−01 | 1.04070E+00 | −1.19678E+00 |

*Aspheric surface

Example 7

Figure 7:
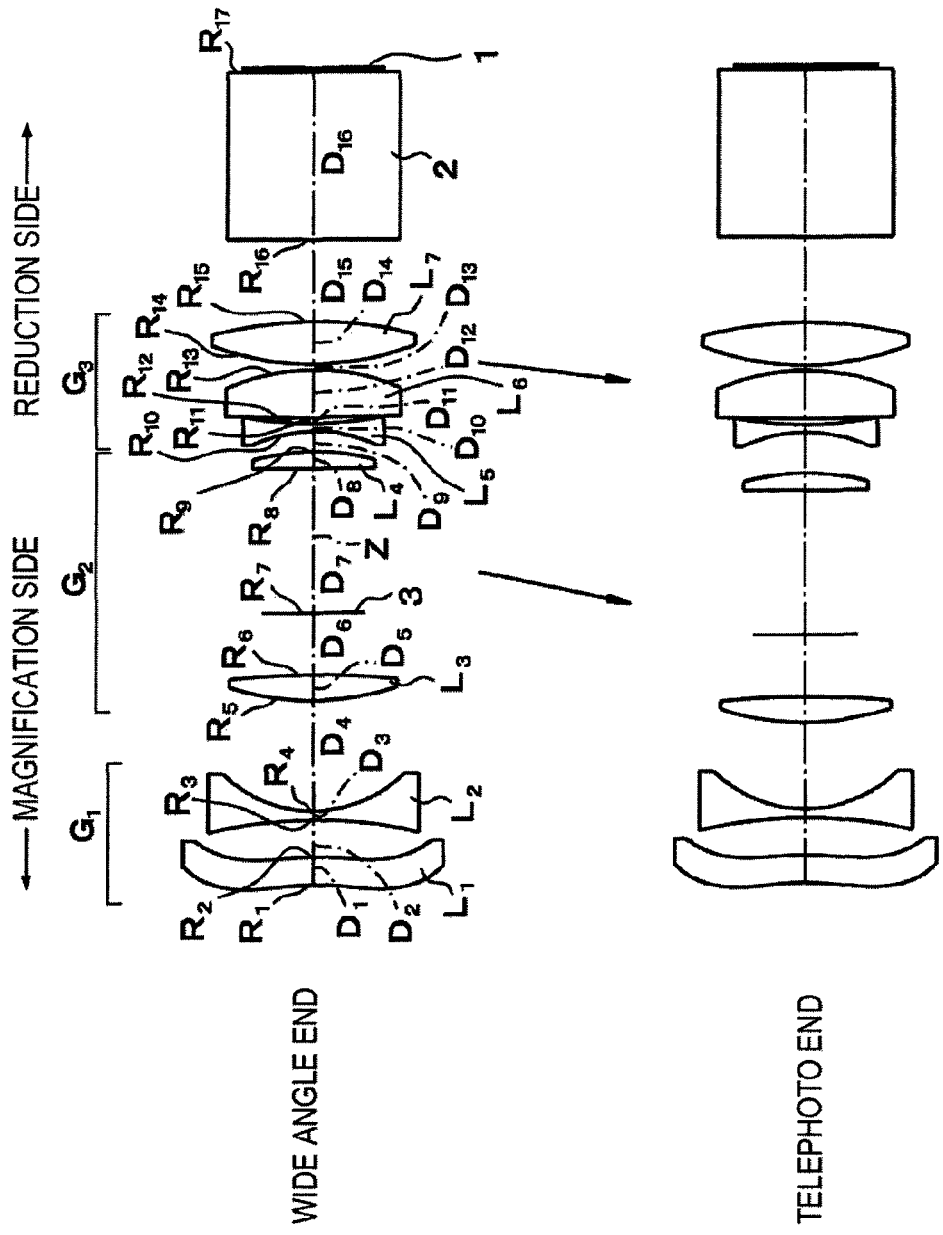
FIG. 7 is a diagram illustrating the structure of a projection variable focus lens according to Example 7 of the invention.

The projection variable focus lens according to Example 7 has the structure shown in FIG. 7.

That is, the projection variable focus lens includes the first to seventh lenses L1 to L7 of the first to third lens groups G1 to G3 arranged in this order from the magnification side. The first lens group G1 includes the first lens L1 which has a low refractive power and includes aspheric surfaces at both sides and the second lens L2 which is a biconcave lens. The second lens group G2 includes the third lens L3, which is a biconvex lens, the mask 3, and the fourth lens L4, which is a biconvex lens. The third lens group G3 includes the fifth lens L5, which is a biconcave lens, the sixth lens L6, which is a biconvex lens, and the seventh lens L7 which is a biconvex lens.

When power varies from the wide angle end to the telephoto end, the second lens group G2 is moved to the magnification side along the optical axis Z and the third lens group G3 is moved to the magnification side along the optical axis Z.

Focusing is performed by moving the third lens group G3 in the direction of the optical axis Z (varifocal lens type).

In Table 7, an upper part shows the curvature radius R of each lens surface according to Example 7, the thickness of the center of each lens and the air space D between the lenses, and the refractive index Nd and the Abbe number νd of each lens with respect to the d-line.

In Table 7, a middle part shows the variable spacing 1, the variable spacing 2, and a variable spacing 3 (the gap between the third lens group G3 and the glass block 2: movement 3 (which is the same with the following Tables 8 to 10)) at the wide angle end (wide), the middle position (middle), and the telephoto end (tele). In Table 7, a lower part shows the values of the constants K and A3 to A16 corresponding to the aspheric surfaces.

TABLE 7

| Focal length F = 1.00~1.06~1.10 | | | | |
|---|---|---|---|---|
| Surface | R | D | Nd | νd |
| 1* | −1.657 | 0.209 | 1.4910 | 57.6 |
| 2* | −2.064 | 0.283 | | |
| 3 | −3.295 | 0.065 | 1.4875 | 70.2 |
| 4 | 0.949 | (Movement 1) | | |
| 5 | 1.994 | 0.194 | 1.7725 | 49.6 |
| 6 | −6.484 | 0.470 | | |
| 7 (Mask) | ∞ | 1.098 | | |
| 8 | 153.134 | 0.132 | 1.7130 | 53.9 |
| 9 | −1.695 | (Movement 2) | | |
| 10 | −1.067 | 0.057 | 1.7618 | 26.5 |
| 11 | 2.631 | 0.048 | | |
| 12 | 24.026 | 0.366 | 1.7130 | 53.9 |
| 13 | −1.573 | 0.042 | | |
| 14 | 2.065 | 0.325 | 1.7130 | 53.9 |
| 15 | −2.924 | (Movement 3) | | |
| 16 | ∞ | 1.269 | 1.5163 | 64.1 |
| 17 | ∞ | | | |

| Movement spacing | Wide angle end | Middle position | Telephoto end |
|---|---|---|---|
| Movement 1 | 0.842 | 0.733 | 0.658 |
| Movement 2 | 0.156 | 0.256 | 0.313 |
| Movement 3 | 0.626 | 0.635 | 0.652 |

| Aspheric coefficient | | | | | |
|---|---|---|---|---|---|
| Surface number | K | $A_3$ | $A_4$ | $A_5$ | $A_6$ |
| 1 | −7.33893 | −1.21401E−01 | 1.31704E+00 | −1.28671E+00 | 1.79222E−01 |
| | $A_7$ | $A_8$ | $A_9$ | $A_{10}$ | $A_{11}$ |
| | 5.07884E−02 | 6.49625E−01 | −1.99321E−01 | 2.37982E−01 | −1.43432E+00 |
| | $A_{12}$ | $A_{13}$ | $A_{14}$ | $A_{15}$ | $A_{16}$ |
| | 6.02922E−01 | 2.80198E+00 | −6.70309E+00 | 6.93096E+00 | −2.63447E+00 |
| | K | $A_3$ | $A_4$ | $A_5$ | $A_6$ |
| 2 | 0.73301 | −8.12686E−02 | 1.14489E+00 | 2.37898E−01 | −3.05651E+00 |
| | $A_7$ | $A_8$ | $A_9$ | $A_{10}$ | $A_{11}$ |
| | 2.50393E+00 | 1.19340E+00 | −6.76701E−01 | −1.23450E+00 | 2.35031E+00 |
| | $A_{12}$ | $A_{13}$ | $A_{14}$ | $A_{15}$ | $A_{16}$ |
| | −7.22918E+00 | 5.14312E+00 | −6.13899E+00 | 1.95252E+01 | −1.35714E+01 |

*Aspheric surface

In addition, Table 17 shows numerical values corresponding to the conditional expressions according to Example 7.

Figure 23:
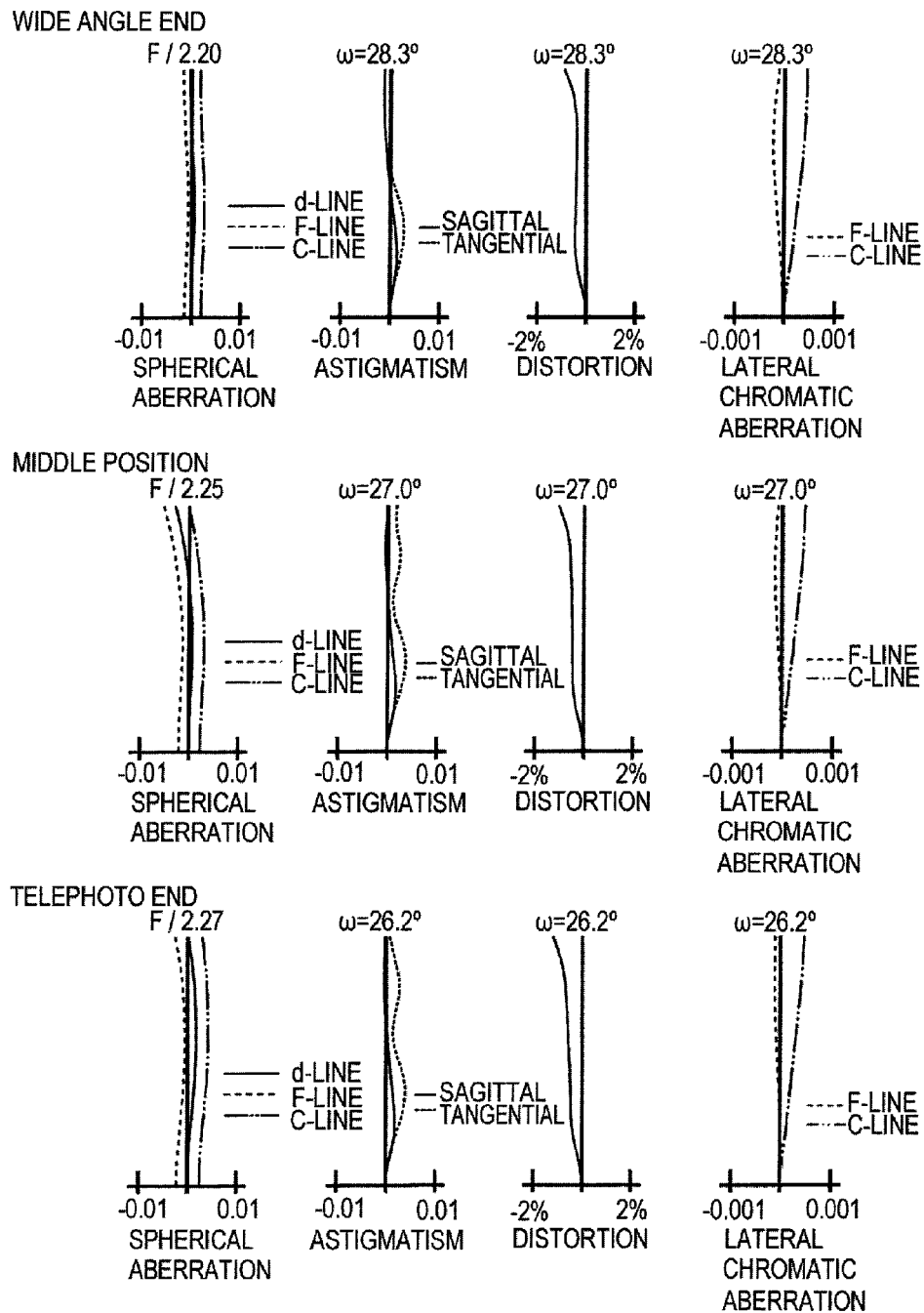
FIG. 23 is a diagram illustrating all aberrations of the projection variable focus lens according to Example 7.

FIG. 23 is an aberration diagram illustrating all aberrations (spherical aberration, astigmatism, distortion, and lateral chromatic aberration) of the projection variable focus lens according to Example 7 at the wide angle end (wide), the middle position (middle), and the telephoto end (tele).

As can be seen from FIG. 23, the projection variable focus lens according to Example 7 has an angle of view 2ω of 56.6 degrees, which is a wide angle, and an F number of 2.20, which is a large value, at the wide angle end. Therefore, all aberrations are effectively corrected.

In addition, as shown in Table 17, the projection variable focus lens according to Example 7 satisfies all of Conditional expressions 1 to 3 and Conditional expressions 1' and 2'.

Example 8

Figure 8:
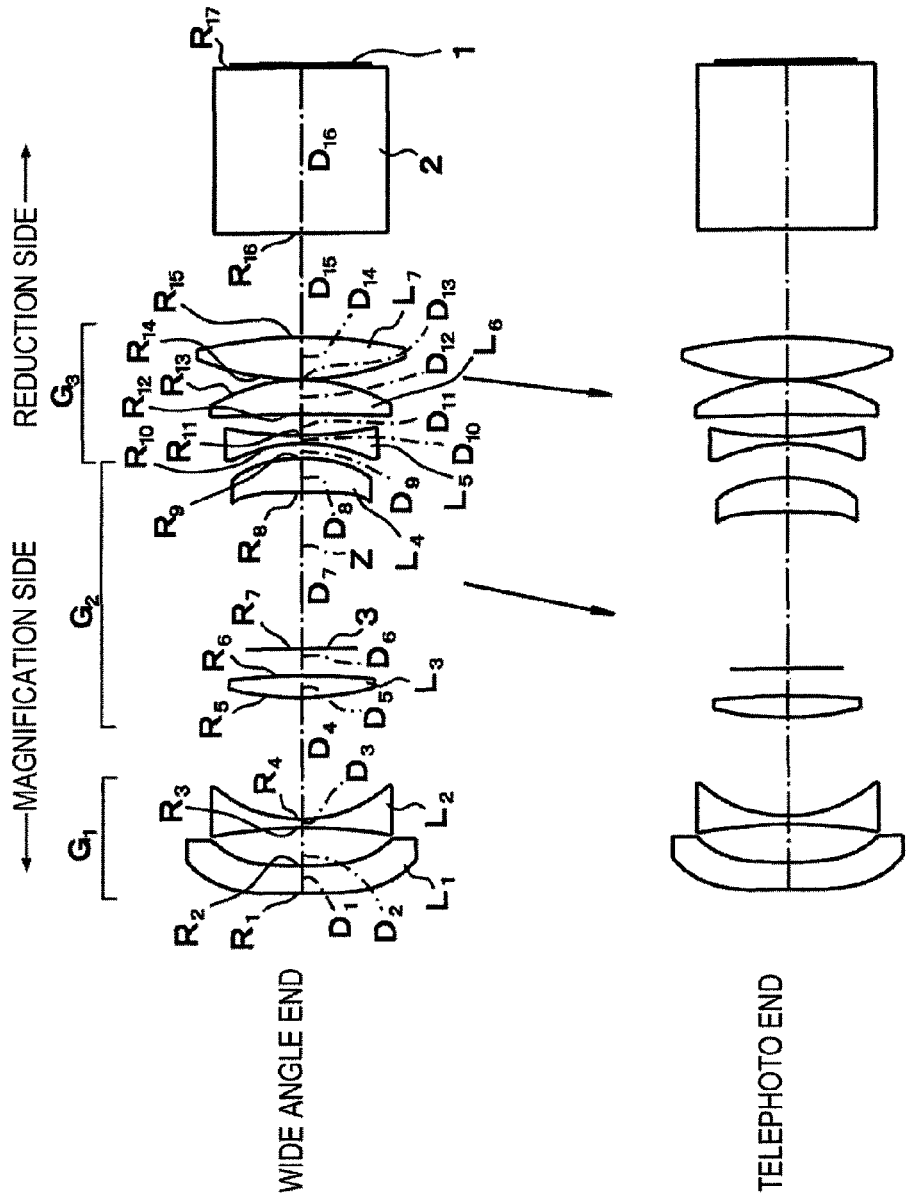
FIG. 8 is a diagram illustrating the structure of a projection variable focus lens according to Example 8 of the invention.

The projection variable focus lens according to Example 8 has the structure shown in FIG. 8.

That is, the projection variable focus lens has substantially the same structure as that according to Example 7 except that the fourth lens L4 is a positive meniscus lens (on the axis) having aspheric surfaces at both sides, one of which is a convex surface facing the reduction side, and the sixth lens L6 is a positive meniscus lens having a convex surface facing the reduction side.

When power varies from the wide angle end to the telephoto end, the second lens group G2 is moved to the magnification side along the optical axis Z and the third lens group G3 is moved to the magnification side along the optical axis Z.

Focusing is performed by moving the third lens group G3 in the direction of the optical axis Z (varifocal lens type).

In Table 8, an upper part shows the curvature radius R of each lens surface according to Example 8, the thickness of the center of each lens and the air space D between the lenses, and the refractive index Nd and the Abbe number νd of each lens with respect to the d-line.

In Table 8, a middle part shows the variable spacing 1, the variable spacing 2, and the variable spacing 3 at the wide angle end (wide), the middle position (middle), and the telephoto end (tele). In Table 8, a lower part shows the values of the constants K and A3 to A16 corresponding to the aspheric surfaces.

TABLE 8

Focal length F = 1.00~1.06~1.10

| Surface | R | D | Nd | νd |
|---|---|---|---|---|
| 1* | −20.915 | 0.209 | 1.4910 | 57.6 |
| 2* | 4.216 | 0.293 | | |
| 3 | −3.868 | 0.065 | 1.4875 | 70.2 |
| 4 | 0.976 | (Movement 1) | | |
| 5 | 2.092 | 0.168 | 1.7725 | 49.6 |
| 6 | −5.556 | 0.209 | | |
| 7 (Mask) | ∞ | 1.209 | | |
| 8* | −7.685 | 0.262 | 1.5686 | 58.6 |
| 9* | −1.148 | (Movement 2) | | |
| 10 | −1.191 | 0.060 | 1.7552 | 27.5 |
| 11 | 2.626 | 0.166 | | |
| 12 | −23.674 | 0.267 | 1.5891 | 61.1 |
| 13 | −1.298 | 0.005 | | |
| 14 | 1.948 | 0.325 | 1.6204 | 60.3 |
| 15 | −3.471 | (Movement 3) | | |
| 16 | ∞ | 1.270 | 1.5163 | 64.1 |
| 17 | ∞ | | | |

| Movement spacing | Wide angle end | Middle position | Telephoto end |
|---|---|---|---|
| Movement 1 | 0.935 | 0.829 | 0.755 |
| Movement 2 | 0.114 | 0.212 | 0.264 |
| Movement 3 | 0.806 | 0.814 | 0.837 |

Aspheric coefficient

| Surface number | K | $A_3$ | $A_4$ | $A_5$ | $A_6$ |
|---|---|---|---|---|---|
| 1 | −89.99797 | −1.80629E−01 | 1.69655E+00 | −2.20737E+00 | 1.11705E+00 |

| | $A_7$ | $A_8$ | $A_9$ | $A_{10}$ | $A_{11}$ |
|---|---|---|---|---|---|
| | 1.36356E−01 | 9.21774E−01 | −1.26542E+00 | 8.82081E−01 | −4.69278E+00 |

| | $A_{12}$ | $A_{13}$ | $A_{14}$ | $A_{15}$ | $A_{16}$ |
|---|---|---|---|---|---|
| | 3.76442E+00 | 1.45585E+01 | −4.03441E+01 | 4.42576E+01 | −1.84183E+01 |

| | K | $A_3$ | $A_4$ | $A_5$ | $A_6$ |
|---|---|---|---|---|---|
| 2 | −89.96561 | −1.22040E−01 | 1.33839E+00 | 9.62683E−01 | −6.91450E+00 |

| | $A_7$ | $A_8$ | $A_9$ | $A_{10}$ | $A_{11}$ |
|---|---|---|---|---|---|
| | 6.53054E+00 | 5.57412E+00 | −1.63486E+00 | −8.81709E+00 | 9.49415E−01 |

| | $A_{12}$ | $A_{13}$ | $A_{14}$ | $A_{15}$ | $A_{16}$ |
|---|---|---|---|---|---|
| | −3.65107E+01 | 3.68136E+01 | −4.06788E+00 | 1.60775E+02 | −1.78388E+02 |

TABLE 8-continued

| | K | $A_4$ | $A_6$ | $A_8$ | $A_{10}$ |
|---|---|---|---|---|---|
| 8 | 1.00000 | −2.67806E−01 | −1.59101E+00 | 5.60364E+00 | −2.67409E−01 |

| | K | $A_4$ | $A_6$ | $A_8$ | $A_{10}$ |
|---|---|---|---|---|---|
| 9 | 1.00000 | −1.61891E−01 | −1.01552E+00 | 2.12085E+00 | −1.08753E+01 |

*Aspheric surface

In addition, Table 17 shows numerical values corresponding to the conditional expressions according to Example 8.

Figure 24:
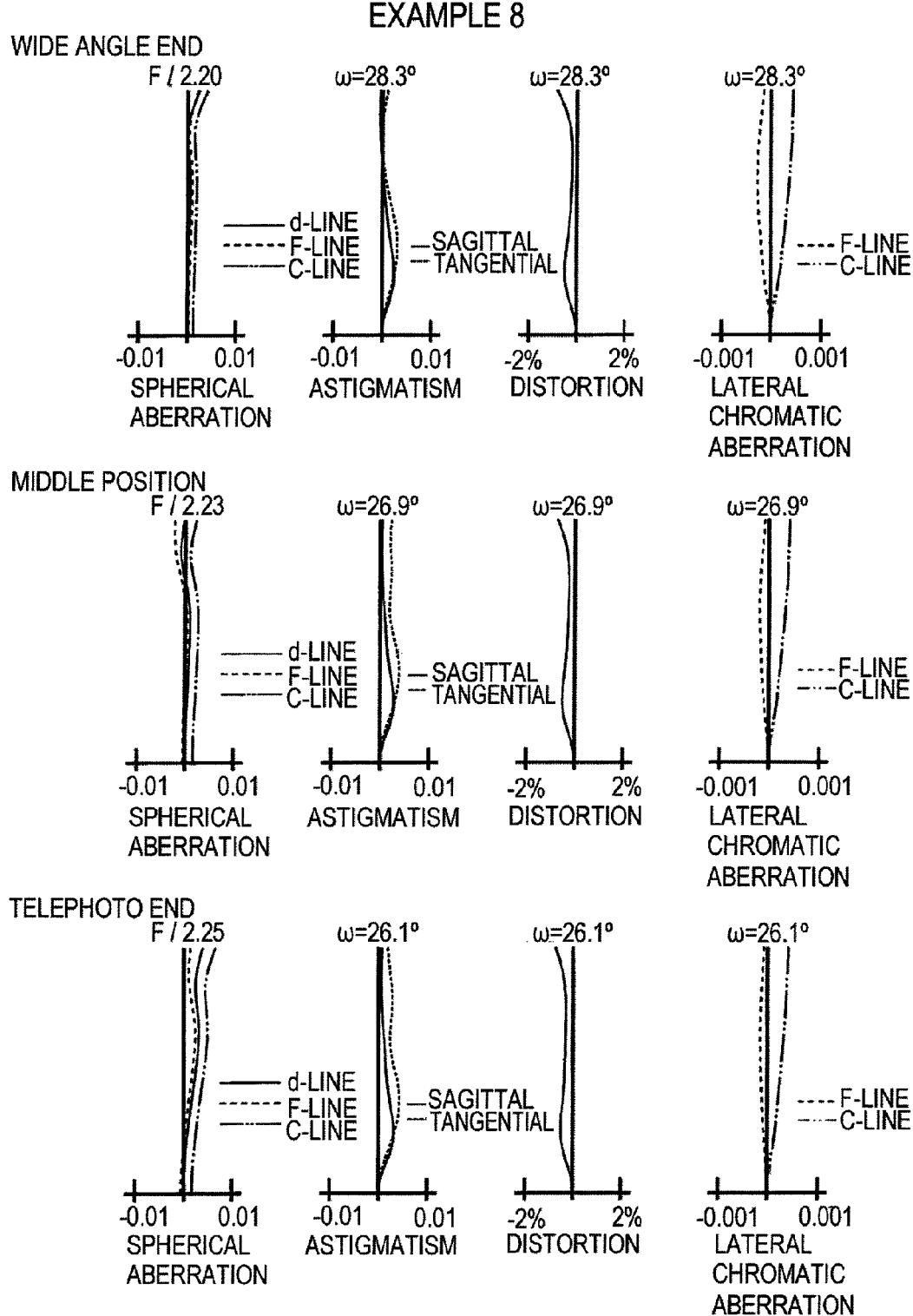
FIG. 24 is a diagram illustrating all aberrations of the projection variable focus lens according to Example 8.

FIG. 24 is an aberration diagram illustrating all aberrations (spherical aberration, astigmatism, distortion, and lateral chromatic aberration) of the projection variable focus lens according to Example 8 at the wide angle end (wide), the middle position (middle), and the telephoto end (tele).

As can be seen from FIG. 24, the projection variable focus lens according to Example 8 has an angle of view 2ω of 56.6 degrees, which is a wide angle, and an F number of 2.20, which is a large value, at the wide angle end. Therefore, all aberrations are effectively corrected.

In addition, as shown in Table 17, the projection variable focus lens according to Example 8 satisfies all of Conditional expressions 1 to 3 and Conditional expressions 1' and 2'.

Third Example Group

A third example group includes projection variable focus lenses according to the following Examples 9 and 10. Each of the projection variable focus lenses includes a first lens group G1 including a first lens L1 and a second lens L2, a second lens group G2 including a third lens L3 and a fourth lens L4, and a third lens group G3 including fifth to seventh lenses L5 to L7. When power varies, three lens groups, that is, the first lens group G1, the second lens group G2, and the third lens group G3 are independently moved.

Example 9

Figure 9:
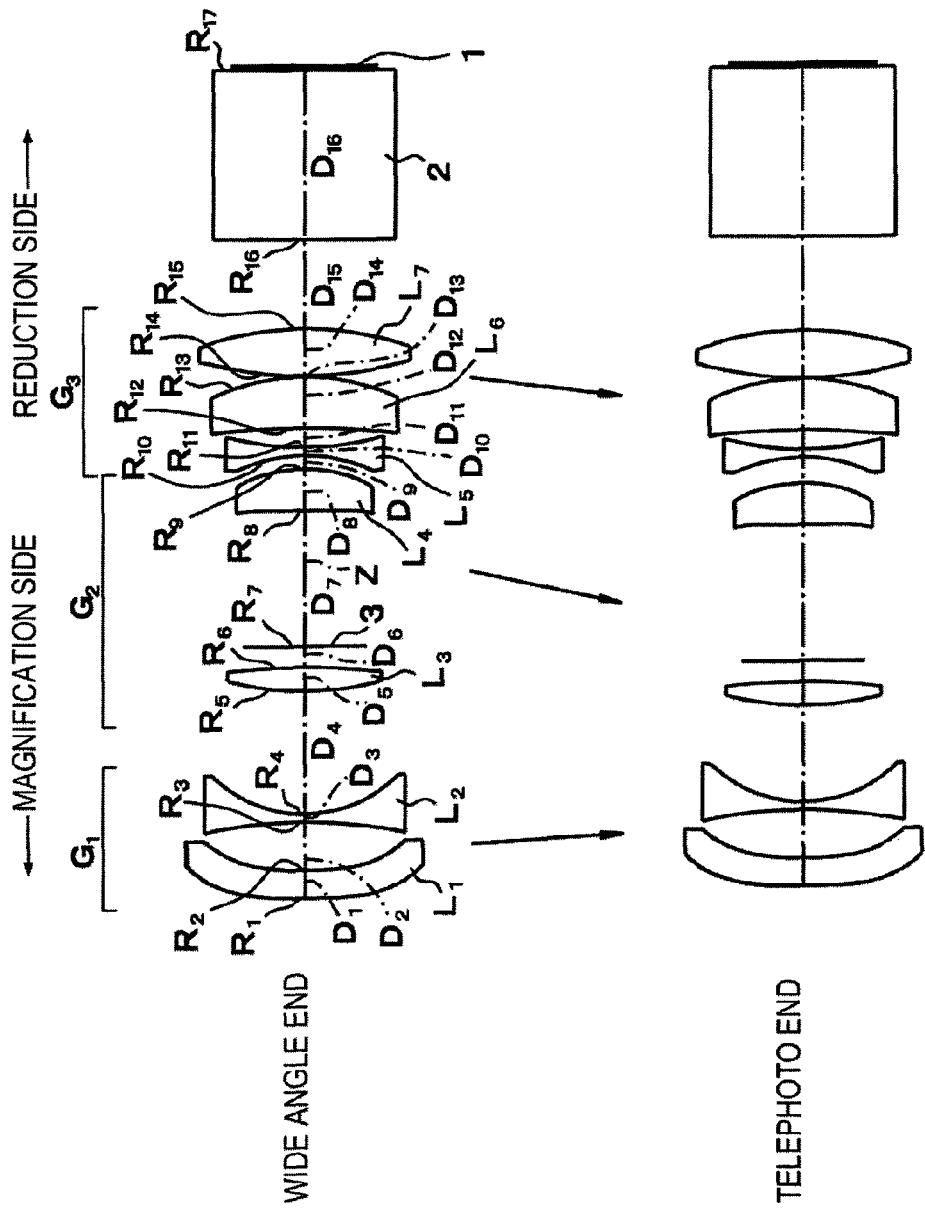
FIG. 9 is a diagram illustrating the structure of a projection variable focus lens according to Example 9 of the invention.

The projection variable focus lens according to Example 9 has the structure shown in FIG. 9.

That is, the projection variable focus lens includes the first to seventh lenses L1 to L7 of the first to third lens groups G1 to G3 arranged in this order from the magnification side. The first lens group G1 includes the first lens L1 which has a low refractive power and aspheric surfaces at both sides and the second lens L2, which is a biconcave lens. The second lens group G2 includes the third lens L3, which is a biconvex lens, the mask 3, and the fourth lens L4, which is a biconvex lens (on the axis) having aspheric surfaces at both sides. The third lens group G3 includes the fifth lens L5, which is a biconcave lens, the sixth lens L6, which is a positive meniscus lens having a convex surface facing the reduction side, and the seventh lens L7, which is a biconvex lens.

When power varies from the wide angle end to the telephoto end, the first lens group G1 is moved to the reduction side along the optical axis Z, the second lens group G2 is moved to the magnification side along the optical axis Z, and the third lens group G3 is moved to the magnification side along the optical axis Z.

Focusing is performed by moving the first lens group G1 in the direction of the optical axis Z (varifocal lens type).

In Table 9, an upper part shows the curvature radius R of each lens surface according to Example 9, the thickness of the center of each lens and the air space D between the lenses, and the refractive index Nd and the Abbe number νd of each lens with respect to the d-line.

In Table 9, a middle part shows the variable spacing 1, the variable spacing 2, and the variable spacing 3 at the wide angle end (wide), the middle position (middle), and the telephoto end (tele). In Table 9, a lower part shows the values of the constants K and A3 to A16 corresponding to the aspheric surfaces.

TABLE 9

Focal length F = 1.00~1.06~1.10

| Surface | R | D | Nd | νd |
|---|---|---|---|---|
| 1* | 8.299 | 0.209 | 1.4910 | 57.6 |
| 2* | 3.140 | 0.358 | | |
| 3 | −3.495 | 0.063 | 1.4875 | 70.2 |
| 4 | 0.943 | (Movement 1) | | |
| 5 | 2.144 | 0.179 | 1.8040 | 46.6 |
| 6 | −4.596 | 0.157 | | |
| 7 (Mask) | ∞ | 1.019 | | |
| 8* | 9.512 | 0.313 | 1.5686 | 58.6 |
| 9* | −1.124 | (Movement 2) | | |
| 10 | −1.119 | 0.060 | 1.8052 | 25.4 |
| 11 | 2.037 | 0.145 | | |
| 12 | −5.837 | 0.391 | 1.7130 | 53.9 |
| 13 | −1.509 | 0.005 | | |
| 14 | 2.670 | 0.356 | 1.7130 | 53.9 |
| 15 | −2.162 | (Movement 3) | | |
| 16 | ∞ | 1.268 | 1.5163 | 64.1 |
| 17 | ∞ | | | |

TABLE 9-continued

| Movement spacing | Wide angle end | Middle position | Telephoto end |
|---|---|---|---|
| Movement 1 | 0.923 | 0.799 | 0.723 |
| Movement 2 | 0.105 | 0.160 | 0.197 |
| Movement 3 | 0.668 | 0.690 | 0.705 |

Aspheric coefficient

| Surface number | K | $A_3$ | $A_4$ | $A_5$ | $A_6$ |
|---|---|---|---|---|---|
| 1 | −89.88598 | −1.78577E−01 | 1.29324E+00 | −1.43352E+00 | 6.80819E−01 |
|  | | $A_7$ | $A_8$ | $A_9$ | $A_{10}$ | $A_{11}$ |
|  |  | −4.00403E−01 | 1.07004E+00 | −6.73289E−01 | 1.41183E+00 | −4.73125E+00 |
|  | | $A_{12}$ | $A_{13}$ | $A_{14}$ | $A_{15}$ | $A_{16}$ |
|  |  | 3.22017E+00 | 1.38705E+01 | −4.15035E+01 | 4.53539E+01 | −1.76710E+01 |
|  | K | $A_3$ | $A_4$ | $A_5$ | $A_6$ |
| 2 | −89.99957 | −1.24648E−01 | 1.23654E+00 | 7.92092E−01 | −6.07632E+00 |
|  | | $A_7$ | $A_8$ | $A_9$ | $A_{10}$ | $A_{11}$ |
|  |  | 5.82185E+00 | 3.14279E+00 | −2.45136E+00 | −4.57060E+00 | 1.00262E+01 |
|  | | $A_{12}$ | $A_{13}$ | $A_{14}$ | $A_{15}$ | $A_{16}$ |
|  |  | −3.04151E+01 | 2.75160E+01 | −4.13654E+01 | 1.21484E+02 | −9.08613E+01 |
|  | K | $A_4$ | $A_6$ | $A_8$ | $A_{10}$ |
| 8 | 1.00000 | −2.18627E−01 | −1.22597E+00 | 3.89111E+00 | −2.16416E+01 |
|  | K | $A_4$ | $A_6$ | $A_8$ | $A_{10}$ |
| 9 | 1.00000 | −1.06853E−01 | −7.26384E−01 | 4.72293E−01 | −6.76597E+00 |

*Aspheric surface

In addition, Table 17 shows numerical values corresponding to the conditional expressions according to Example 9.

Figure 25:
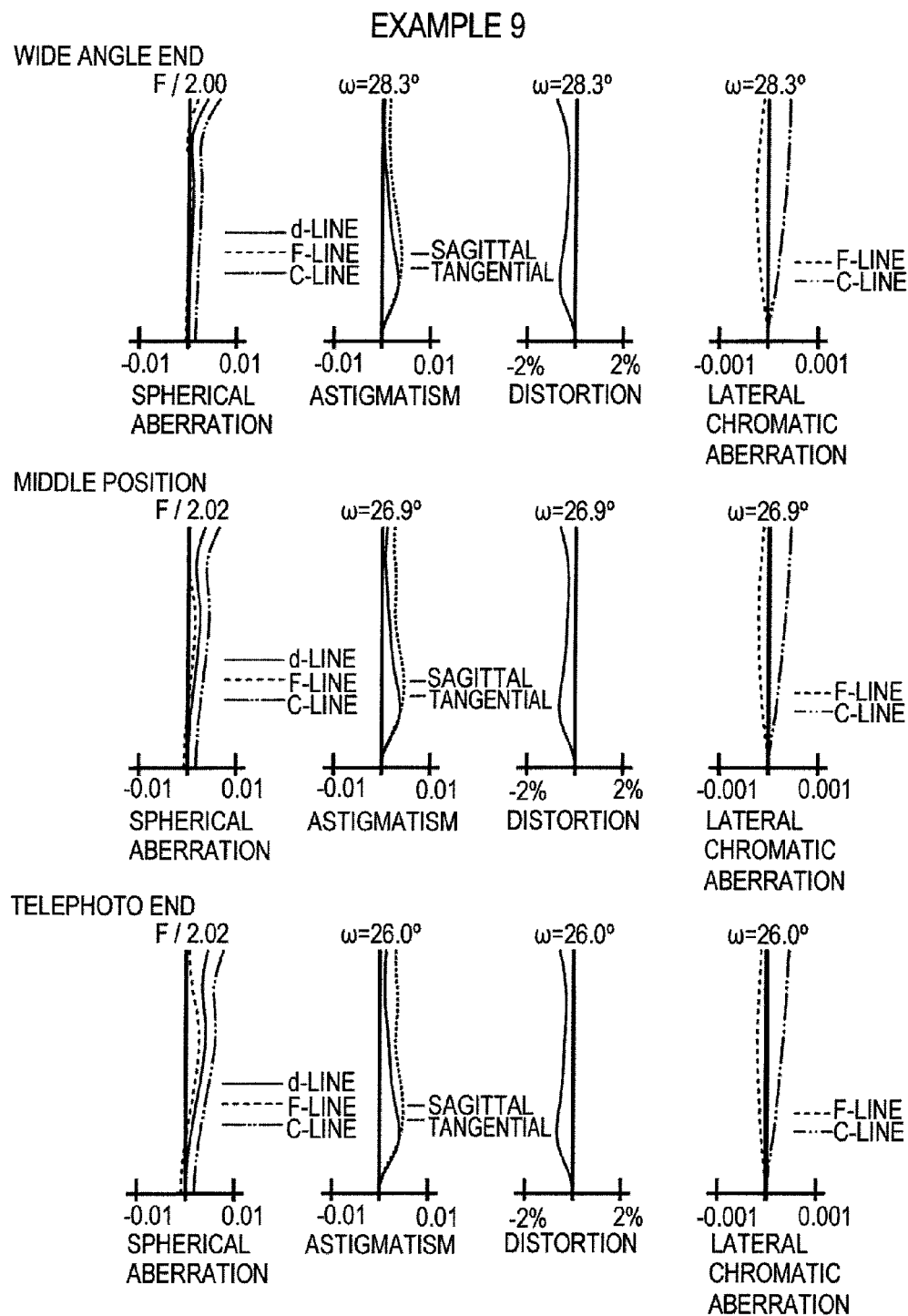
FIG. 25 is a diagram illustrating all aberrations of the projection variable focus lens according to Example 9.

FIG. 25 is an aberration diagram illustrating all aberrations (spherical aberration, astigmatism, distortion, and lateral chromatic aberration) of the projection variable focus lens according to Example 9 at the wide angle end (wide), the middle position (middle), and the telephoto end (tele).

As can be seen from FIG. 25, the projection variable focus lens according to Example 9 has an angle of view 2ω of 56.6 degrees, which is a wide angle, and an F number of 2.00, which is a large value, at the wide angle end. Therefore, all aberrations are effectively corrected.

In addition, as shown in Table 17, the projection variable focus lens according to Example 9 satisfies all of Conditional expressions 1 to 3 and Conditional expressions 1' and 2'.

Example 10

Figure 10:
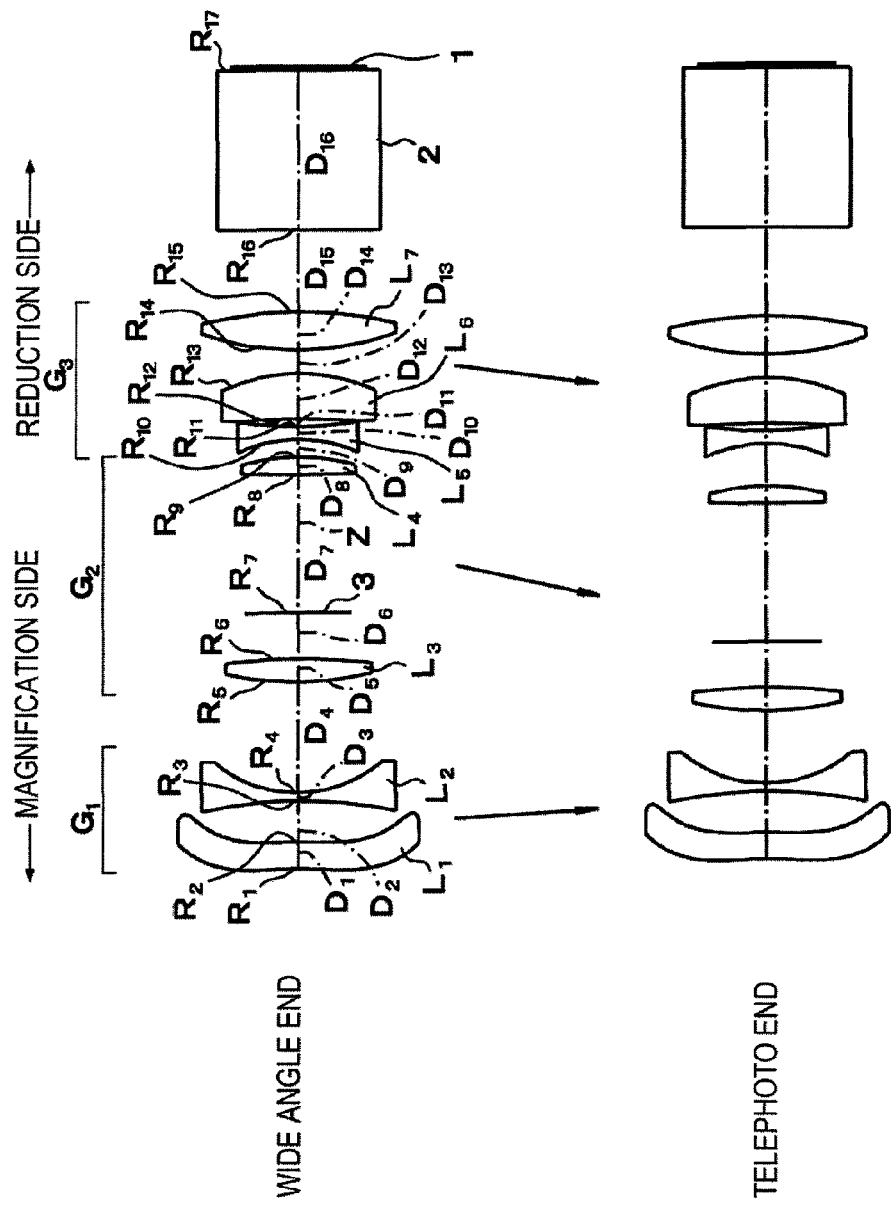
FIG. 10 is a diagram illustrating the structure of a projection variable focus lens according to Example 10 of the invention.

The projection variable focus lens according to Example 10 has the structure shown in FIG. 10.

That is, the projection variable focus lens has substantially the same structure as that according to Example 9 except that the fourth lens L4 is a spherical biconvex lens.

Similar to Example 9, when power varies from the wide angle end to the telephoto end, the first lens group G1 is moved to the reduction side along the optical axis Z, the second lens group G2 is moved to the magnification side along the optical axis Z, and the third lens group G3 is moved to the magnification side along the optical axis Z.

Focusing is performed by moving the first lens group G1 in the direction of the optical axis Z (varifocal lens type).

In Table 10, an upper part shows the curvature radius R of each lens surface according to Example 10, the thickness of the center of each lens and the air space D between the lenses, and the refractive index Nd and the Abbe number vd of each lens with respect to the d-line.

In Table 10, a middle part shows the variable spacing 1, the variable spacing 2, and the variable spacing 3 at the wide angle end (wide), the middle position (middle), and the telephoto end (tele). In Table 10, a lower part shows the values of the constants K and A3 to A16 corresponding to the aspheric surfaces.

TABLE 10

Focal length F = 1.00~1.08~1.16

| Surface | R | D | Nd | vd |
|---|---|---|---|---|
| 1* | −3.065 | 0.209 | 1.4910 | 57.6 |
| 2* | −6.827 | 0.328 | | |
| 3 | −3.639 | 0.065 | 1.4875 | 70.2 |

TABLE 10-continued

| | | | | |
|---|---|---|---|---|
| 4 | 0.979 | (Movement 1) | | |
| 5 | 2.404 | 0.186 | 1.8040 | 46.6 |
| 6 | −4.875 | 0.365 | | |
| 7 (Mask) | ∞ | 1.100 | | |
| 8 | 12.949 | 0.140 | 1.7292 | 54.7 |
| 9 | −1.661 | (Movement 2) | | |
| 10 | −1.125 | 0.104 | 1.8052 | 25.4 |
| 11 | 2.861 | 0.059 | | |
| 12 | −9.353 | 0.365 | 1.7130 | 53.9 |
| 13 | −1.410 | 0.189 | | |
| 14 | 2.220 | 0.303 | 1.7130 | 53.9 |
| 15 | −3.186 | (Movement 3) | | |
| 16 | ∞ | 1.268 | 1.5163 | 64.1 |
| 17 | ∞ | | | |

| Movement spacing | Wide angle end | Middle position | Telephoto end |
|---|---|---|---|
| Movement 1 | 0.885 | 0.717 | 0.578 |
| Movement 2 | 0.142 | 0.236 | 0.338 |
| Movement 3 | 0.651 | 0.684 | 0.707 |

Aspheric coefficient

| Surface number | K | $A_3$ | $A_4$ | $A_5$ | $A_6$ |
|---|---|---|---|---|---|
| 1 | −15.92814 | −9.95702E−02 | 1.31006E+00 | −1.30524E+00 | 2.22254E−01 |

| | $A_7$ | $A_8$ | $A_9$ | $A_{10}$ | $A_{11}$ |
|---|---|---|---|---|---|
| | 0.04535 | 6.20484E−01 | −2.21460E−01 | 2.45061E−01 | −1.41401E+00 |

| | $A_{12}$ | $A_{13}$ | $A_{14}$ | $A_{15}$ | $A_{16}$ |
|---|---|---|---|---|---|
| | 6.44479E−01 | 2.84112E+00 | −6.78317E+00 | 6.94351E+00 | −2.64884E+00 |

| | K | $A_3$ | $A_4$ | $A_5$ | $A_6$ |
|---|---|---|---|---|---|
| 2 | 3.30292 | −6.41762E−02 | 1.07416E+00 | 2.80957E−01 | −3.18233E+00 |

| | $A_7$ | $A_8$ | $A_9$ | $A_{10}$ | $A_{11}$ |
|---|---|---|---|---|---|
| | 2.66761E+00 | 1.41093E+00 | −7.34683E−01 | −1.59740E+00 | 1.96920E+00 |

| | $A_{12}$ | $A_{13}$ | $A_{14}$ | $A_{15}$ | $A_{16}$ |
|---|---|---|---|---|---|
| | −7.33039E+00 | 5.77029E+00 | −5.07790E+00 | 2.03886E+01 | −1.58439E+01 |

*Aspheric surface

In addition, Table 17 shows numerical values corresponding to the conditional expressions according to Example 10.

Figure 26:
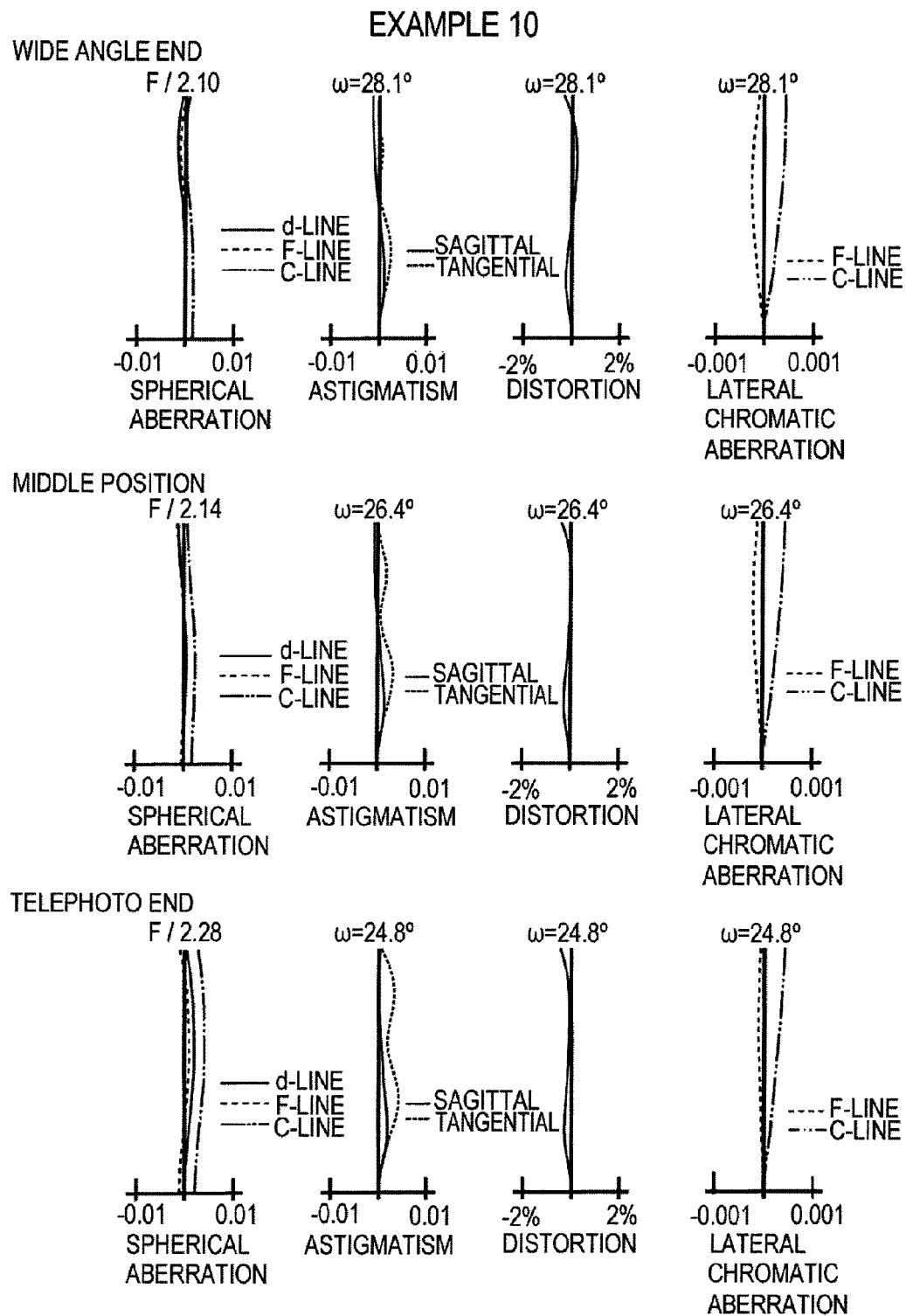
FIG. 26 is a diagram illustrating all aberrations of the projection variable focus lens according to Example 10.

FIG. 26 is an aberration diagram illustrating all aberrations (spherical aberration, astigmatism, distortion, and lateral chromatic aberration) of the projection variable focus lens according to Example 10 at the wide angle end (wide), the middle position (middle), and the telephoto end (tele).

As can be seen from FIG. 26, the projection variable focus lens according to Example 10 has an angle of view $2\omega$ of 56.2 degrees, which is a wide angle, and an F number of 2.10, which is a large value, at the wide angle end. Therefore, all aberrations are effectively corrected.

In addition, as shown in Table 17, the projection variable focus lens according to Example 10 satisfies all of Conditional expressions 1 to 3 and Conditional expressions 1' and 2'.

Fourth Example Group

A fourth example group includes projection variable focus lenses according to the following Examples 11 and 12. Each of the projection variable focus lenses includes a first lens group G1 including a first lens L1 and a second lens L2, a second lens group G2 including a third lens L3, a third lens group G3 including a fourth lens L4, and a fourth lens group G4 including fifth to seventh lenses L5 to L7. When power varies, the second lens group G2 and the third lens group G3 are independently moved.

Example 11

Figure 11:
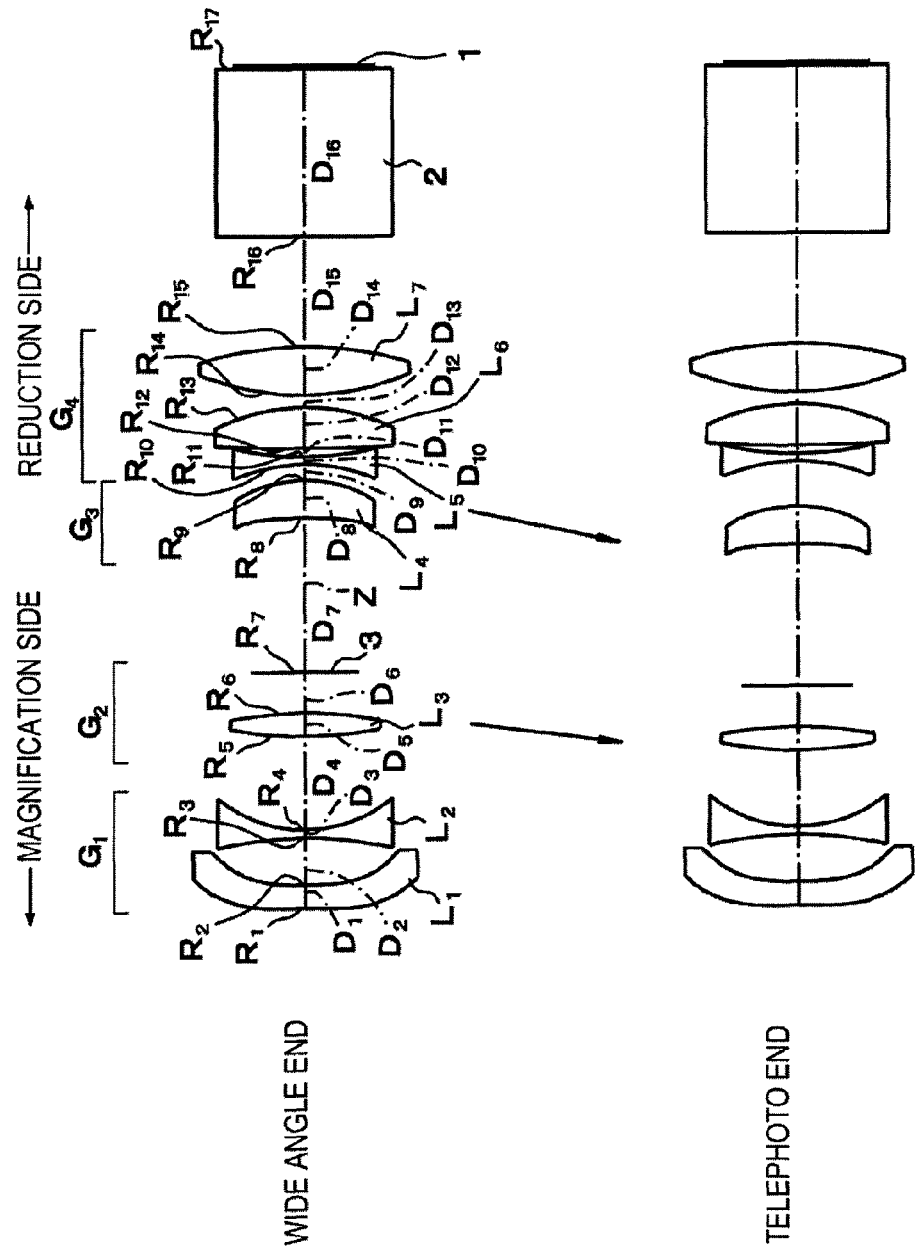
FIG. 11 is a diagram illustrating the structure of a projection variable focus lens according to Example 11 of the invention.

The projection variable focus lens according to Example 11 has the structure shown in FIG. 11.

That is, the projection variable focus lens includes the first to seventh lenses L1 to L7 of the first to fourth lens groups G1 to G4 arranged in this order from the magnification side. The first lens group G1 includes the first lens L1 which has a low refractive power and includes aspheric surfaces at both sides and the second lens L2, which is a biconcave lens. The second lens group G2 includes the third lens L3, which is a biconvex lens, and the mask 3. The third lens group G3 includes the fourth lens L4, which is a positive meniscus lens (on the axis) having aspheric surfaces at both sides, one of which is a convex surface facing the reduction side. The fourth lens group G4 includes the fifth lens L5, which is a biconcave lens, the sixth lens L6, which is a biconvex lens, and the seventh lens L7, which is a biconvex lens.

When power varies from the wide angle end to the telephoto end, the second and third lens groups G2 and G3 are moved to the magnification side along the optical axis Z.

Focusing is performed by moving the third lens group G3 in the direction of the optical axis Z (varifocal lens type).

In Table 11, an upper part shows the curvature radius R of each lens surface according to Example 11, the thickness of the center of each lens and the air space D between the lenses, and the refractive index Nd and the Abbe number νd of each lens with respect to the d-line.

In Table 11, a middle part shows the variable spacing 1, the variable spacing 2, and a variable spacing 3 (the gap between the third lens group G3 and the fourth lens group G4: movement 3 (which is the same with the following Tables 12 to 16)) at the wide angle end (wide), the middle position (middle), and the telephoto end (tele). In Table 11, a lower part shows the values of the constants K and A3 to A16 corresponding to the aspheric surfaces.

TABLE 11

Focal length F = 1.00~1.06~1.10

| Surface | R | D | Nd | νd |
|---|---|---|---|---|
| 1* | −10.598 | 0.178 | 1.4910 | 57.6 |
| 2* | 3.630 | 0.359 | | |
| 3 | −2.725 | 0.062 | 1.4875 | 70.2 |
| 4 | 1.022 | (Movement 1) | | |
| 5 | 2.851 | 0.180 | 1.7725 | 49.6 |
| 6 | −2.882 | 0.314 | | |
| 7 (Mask) | ∞ | (Movement 2) | | |
| 8* | −3.835 | 0.286 | 1.5686 | 58.6 |
| 9* | −1.068 | (Movement 3) | | |
| 10 | −1.333 | 0.059 | 1.7283 | 28.5 |
| 11 | 2.287 | 0.065 | | |
| 12 | 14.964 | 0.314 | 1.5891 | 61.1 |
| 13 | −1.459 | 0.094 | | |
| 14 | 2.022 | 0.370 | 1.5891 | 61.1 |
| 15 | −2.614 | 0.840 | | |
| 16 | ∞ | 1.270 | 1.5163 | 64.1 |
| 17 | ∞ | | | |

| Movement spacing | Wide angle end | Middle position | Telephoto end |
|---|---|---|---|
| Movement 1 | 0.711 | 0.629 | 0.581 |
| Movement 2 | 1.176 | 1.122 | 1.082 |
| Movement 3 | 0.124 | 0.260 | 0.348 |

Aspheric coefficient

| Surface number | K | $A_3$ | $A_4$ | $A_5$ | $A_6$ |
|---|---|---|---|---|---|
| 1 | −89.88598 | −1.18349E−01 | 1.71296E+00 | −2.00829E+00 | 6.98547E−01 |

| | $A_7$ | $A_8$ | $A_9$ | $A_{10}$ | $A_{11}$ |
|---|---|---|---|---|---|
| | −3.73854E−02 | 1.18940E+00 | −9.09984E−01 | 9.69712E−01 | −4.88947E+00 |

| | $A_{12}$ | $A_{13}$ | $A_{14}$ | $A_{15}$ | $A_{16}$ |
|---|---|---|---|---|---|
| | 3.39789E+00 | 1.43220E+01 | −3.98717E+01 | 4.44632E+01 | −1.88329E+01 |

| | K | $A_3$ | $A_4$ | $A_5$ | $A_6$ |
|---|---|---|---|---|---|
| 2 | −89.99999 | −6.88213E−02 | 1.57152E+00 | 5.74892E−01 | −6.25520E+00 |

| | $A_7$ | $A_8$ | $A_9$ | $A_{10}$ | $A_{11}$ |
|---|---|---|---|---|---|
| | 6.22429E+00 | 4.03135E+00 | −2.38490E+00 | −6.79893E+00 | 5.49542E+00 |

| | $A_{12}$ | $A_{13}$ | $A_{14}$ | $A_{15}$ | $A_{16}$ |
|---|---|---|---|---|---|
| | −3.26548E+01 | 3.36707E+01 | −1.77006E+01 | 1.43818E+02 | −1.52125E+02 |

| | K | $A_4$ | $A_6$ | $A_8$ | $A_{10}$ |
|---|---|---|---|---|---|
| 8 | 1.00000 | −1.98764E−01 | −1.12305E+00 | 3.44772E+00 | −1.53139E+01 |

| | K | $A_4$ | $A_6$ | $A_8$ | $A_{10}$ |
|---|---|---|---|---|---|
| 9 | 1.00000 | −8.53616E−02 | −6.36565E−01 | 1.06612E+00 | −5.55690E+00 |

*Aspheric surface

In addition, Table 17 shows numerical values corresponding to the conditional expressions according to Example 11.

Figure 27:
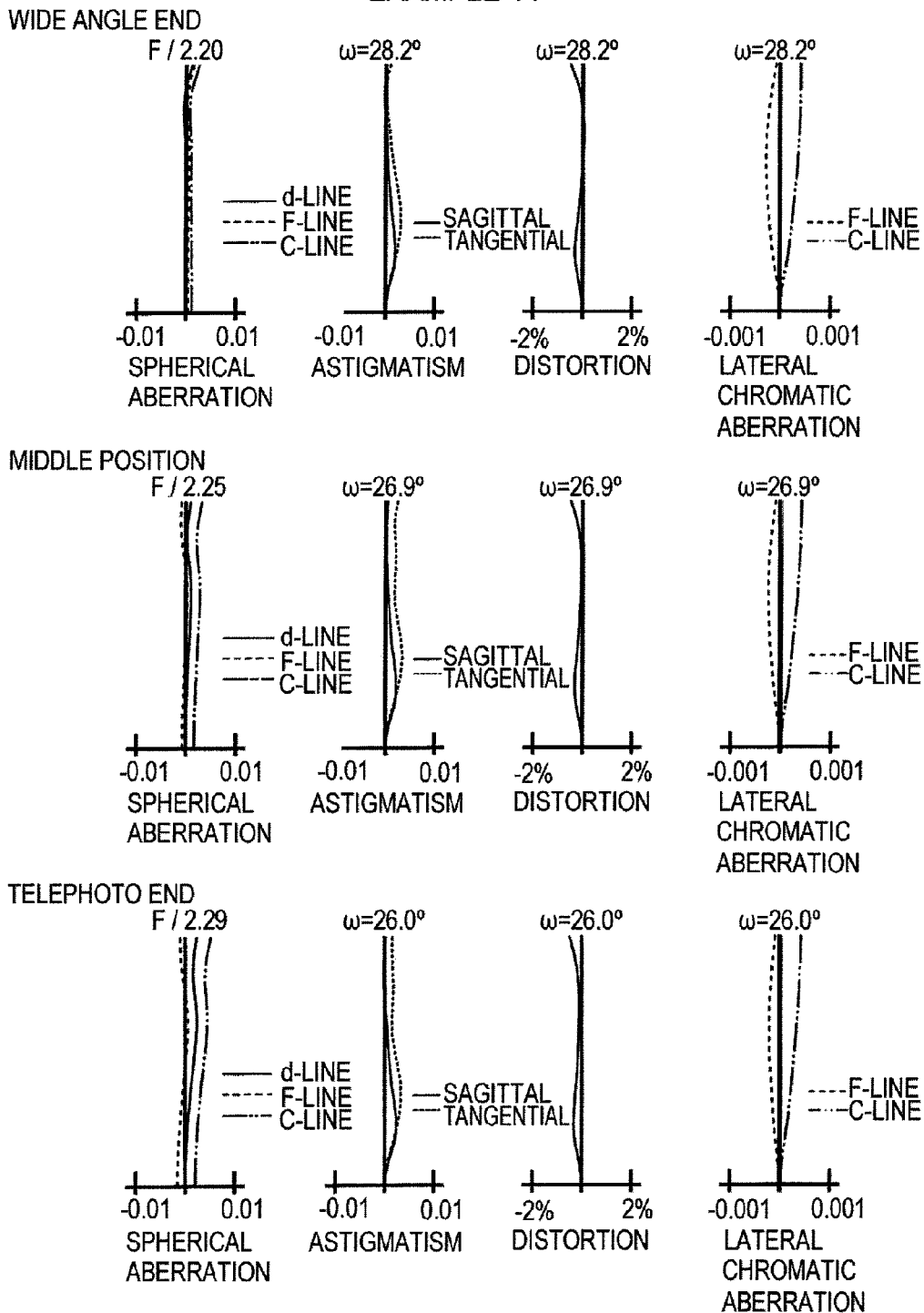
FIG. 27 is a diagram illustrating all aberrations of the projection variable focus lens according to Example 11.

FIG. 27 is an aberration diagram illustrating all aberrations (spherical aberration, astigmatism, distortion, and lateral chromatic aberration) of the projection variable focus lens according to Example 11 at the wide angle end (wide), the middle position (middle), and the telephoto end (tele).

As can be seen from FIG. 27, the projection variable focus lens according to Example 11 has an angle of view 2ω of 56.4 degrees, which is a wide angle, and an F number of 2.20, which is a large value, at the wide angle end. Therefore, all aberrations are effectively corrected.

In addition, as shown in Table 17, the projection variable focus lens according to Example 11 satisfies all of Conditional expressions 1 to 3 and Conditional expressions 1' and 2'.

Example 12

Figure 12:
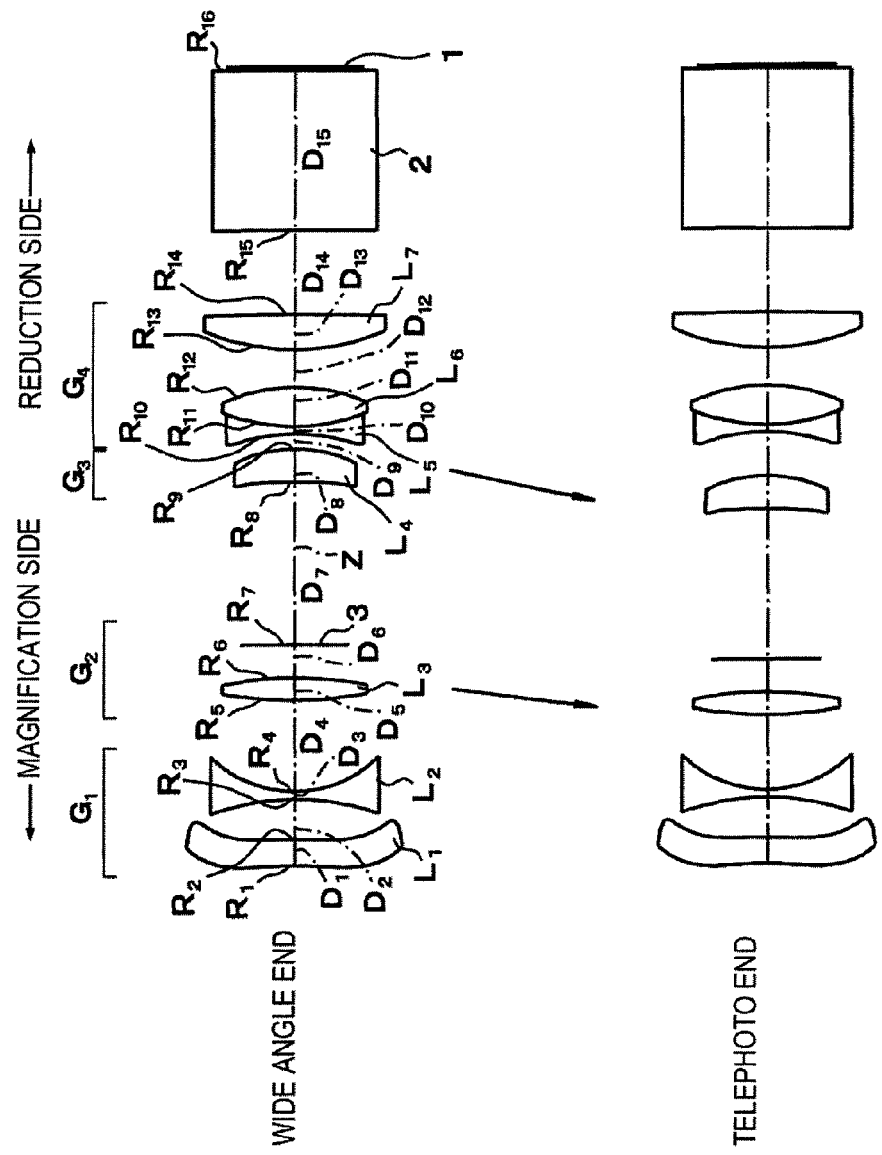
FIG. 12 is a diagram illustrating the structure of a projection variable focus lens according to Example 12 of the invention.

The projection variable focus lens according to Example 12 has the structure shown in FIG. 12.

That is, the projection variable focus lens has substantially the same structure as that according to Example 11 except that the fifth lens L5 and the sixth lens L6 are bonded to each other to form a cemented lens.

Similar to Example 11, when power varies from the wide angle end to the telephoto end, the second lens group G2 and the third lens group G3 are moved to the magnification side along the optical axis Z.

Focusing is performed by moving the third lens group G3 in the direction of the optical axis Z (varifocal lens type).

In Table 12, an upper part shows the curvature radius R of each lens surface according to Example 12, the thickness of the center of each lens and the air space D between the lenses, and the refractive index Nd and the Abbe number νd of each lens with respect to the d-line.

In Table 12, a middle part shows the variable spacing 1, the variable spacing 2, and the variable spacing 3 at the wide angle end (wide), the middle position (middle), and the telephoto end (tele). In Table 12, a lower part shows the values of the constants K and A3 to A16 corresponding to the aspheric surfaces.

TABLE 12

Focal length F = 1.00~1.06~1.10

| Surface | R | D | Nd | νd |
|---|---|---|---|---|
| 1* | −2.128 | 0.208 | 1.4910 | 57.6 |
| 2* | −4.022 | 0.318 | | |
| 3 | −1.922 | 0.063 | 1.4875 | 70.2 |
| 4 | 0.906 | (Movement 1) | | |
| 5 | 2.824 | 0.181 | 1.8040 | 46.6 |
| 6 | −2.858 | 0.262 | | |
| 7 (Mask) | ∞ | (Movement 2) | | |
| 8* | −4.797 | 0.262 | 1.5686 | 58.6 |
| 9* | −1.108 | (Movement 3) | | |
| 10 | −1.477 | 0.059 | 1.7552 | 27.5 |
| 11 | 1.425 | 0.315 | 1.5163 | 64.1 |
| 12 | −1.379 | 0.304 | | |
| 13 | 1.731 | 0.280 | 1.7205 | 34.7 |
| 14 | −32.455 | 0.659 | | |
| 15 | ∞ | 1.271 | 1.5163 | 64.1 |
| 16 | ∞ | | | |

| Movement spacing | Wide angle end | Middle position | Telephoto end |
|---|---|---|---|
| Movement 1 | 0.724 | 0.643 | 0.596 |
| Movement 2 | 1.300 | 1.241 | 1.199 |
| Movement 3 | 0.121 | 0.261 | 0.351 |

Aspheric coefficient

| Surface number | K | $A_3$ | $A_4$ | $A_5$ | $A_6$ |
|---|---|---|---|---|---|
| 1 | −38.21328 | −1.90445E−01 | 1.62889E+00 | −1.88322E+00 | 6.97657E−01 |

| | $A_7$ | $A_8$ | $A_9$ | $A_{10}$ | $A_{11}$ |
|---|---|---|---|---|---|
| | −6.59503E−02 | 1.27940E+00 | −8.48508E−01 | 9.25333E−01 | −4.99688E+00 |

| | $A_{12}$ | $A_{13}$ | $A_{14}$ | $A_{15}$ | $A_{16}$ |
|---|---|---|---|---|---|
| | 3.10456E+00 | 1.42847E+01 | −3.93276E+01 | 4.43108E+01 | −1.86021E+01 |

| | K | $A_3$ | $A_4$ | $A_5$ | $A_6$ |
|---|---|---|---|---|---|
| 2 | −11.07670 | −1.51977E−01 | 1.70461E+00 | 1.58531E−01 | −6.26103E+00 |

| | $A_7$ | $A_8$ | $A_9$ | $A_{10}$ | $A_{11}$ |
|---|---|---|---|---|---|
| | 6.47516E+00 | 4.31983E+00 | −2.18890E+00 | −6.79561E+00 | 5.04435E+00 |

TABLE 12-continued

| | $A_{12}$ | $A_{13}$ | $A_{14}$ | $A_{15}$ | $A_{16}$ |
|---|---|---|---|---|---|
| | −3.34479E+01 | 3.14790E+01 | −1.99656E+01 | 1.42427E+02 | −1.38460E+02 |

| | K | $A_4$ | $A_6$ | $A_8$ | $A_{10}$ |
|---|---|---|---|---|---|
| 8 | 1.00000 | −1.34420E−01 | −7.43531E−01 | 1.67462E+00 | −1.04339E+01 |

| | K | $A_4$ | $A_6$ | $A_8$ | $A_{10}$ |
|---|---|---|---|---|---|
| 9 | 1.00000 | −5.10908E−02 | −3.86320E−01 | 1.13523E−01 | −4.13321E+00 |

*Aspheric surface

In addition, Table 17 shows numerical values corresponding to the conditional expressions according to Example 12.

Figure 28:
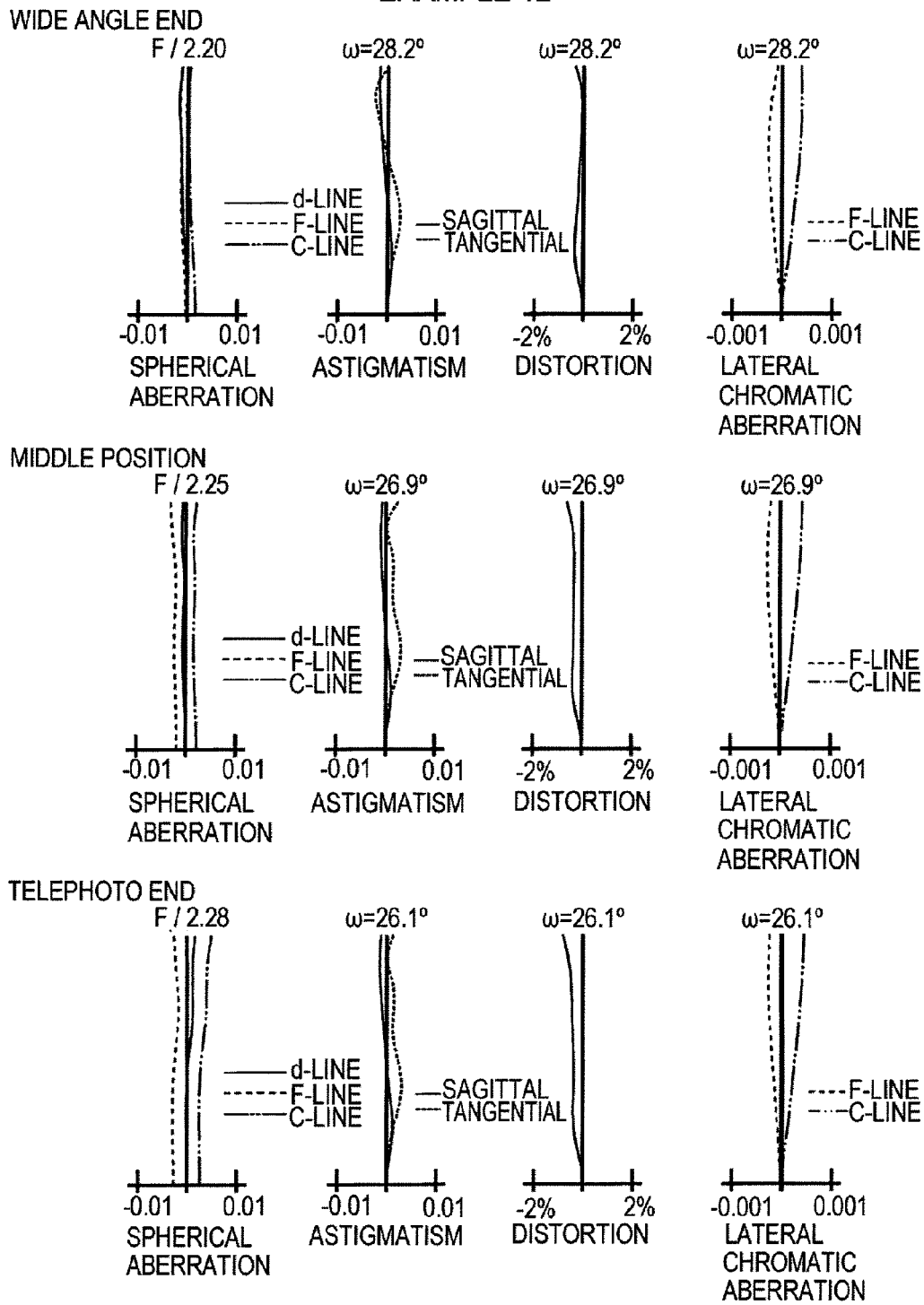
FIG. 28 is a diagram illustrating all aberrations of the projection variable focus lens according to Example 12.

FIG. 28 is an aberration diagram illustrating all aberrations (spherical aberration, astigmatism, distortion, and lateral chromatic aberration) of the projection variable focus lens according to Example 12 at the wide angle end (wide), the middle position (middle), and the telephoto end (tele).

As can be seen from FIG. 28, the projection variable focus lens according to Example 12 has an angle of view 2ω of 56.4 degrees, which is a wide angle, and an F number of 2.20, which is a large value, at the wide angle end. Therefore, all aberrations are effectively corrected.

In addition, as shown in Table 17, the projection variable focus lens according to Example 12 satisfies all of Conditional expressions 1 to 3 and Conditional expressions 1' and 2'.

Fifth Example Group

A fifth example group includes projection variable focus lenses according to the following Examples 13 and 14. Each of the projection variable focus lenses includes a first lens group G1 including a first lens L1 and a second lens L2, a second lens group G2 including a third lens L3 and a fourth lens L4, a third lens group G3 including a fifth lens L5 and a sixth lens L6, and a fourth lens group G4 including a seventh lens L7. When power varies, the second lens group G2 and the third lens group G3 are independently moved.

Example 13

Figure 13:
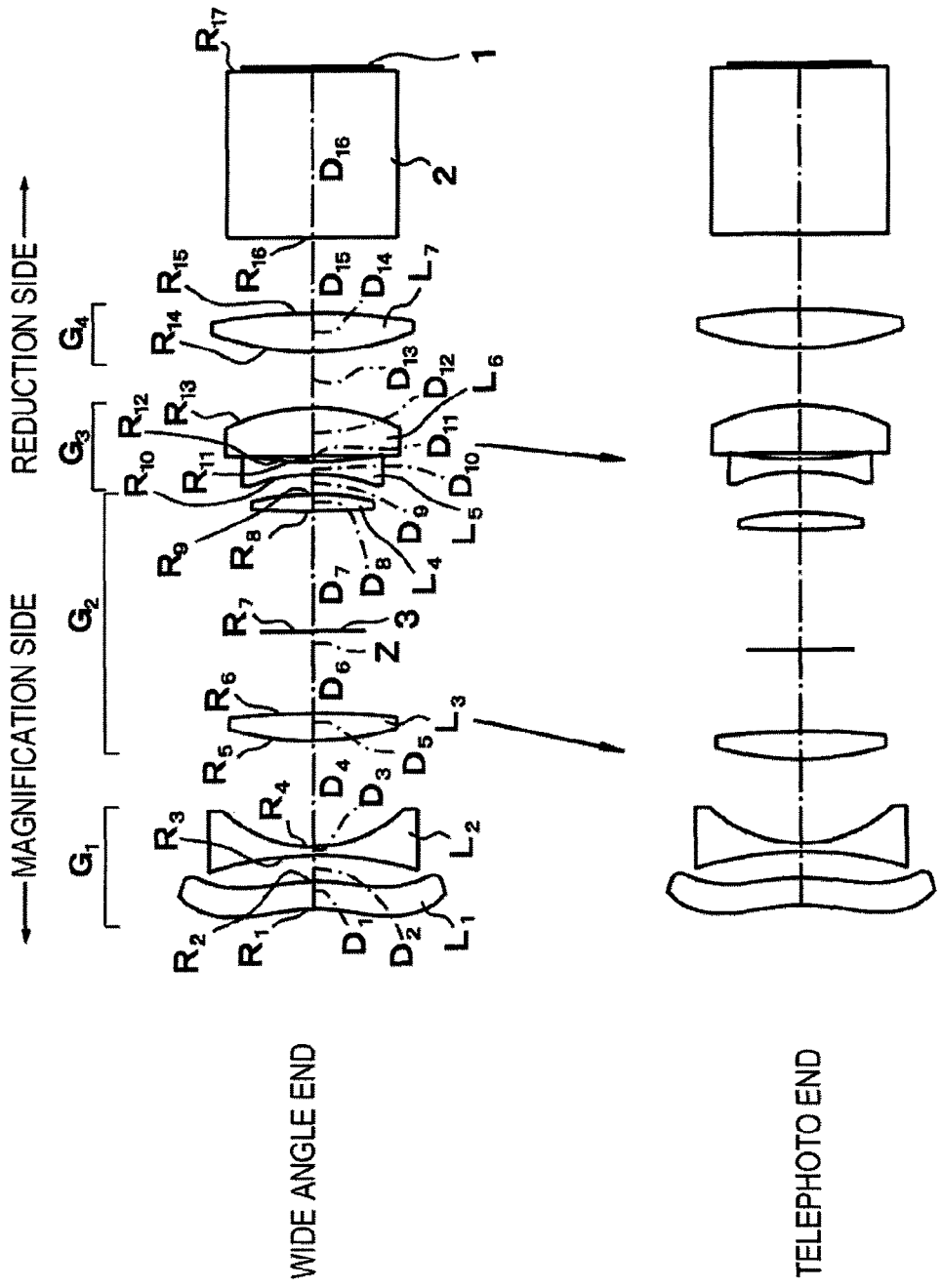
FIG. 13 is a diagram illustrating the structure of a projection variable focus lens according to Example 13 of the invention.

The projection variable focus lens according to Example 13 has the structure shown in FIG. 13.

That is, the projection variable focus lens includes the first to seventh lenses L1 to L7 of the first to fourth lens groups arranged in this order from the magnification side. The first lens group G1 includes the first lens L1 which has a low refractive power and includes aspheric surfaces at both sides and the second lens L2, which is a biconcave lens. The second lens group G2 includes the third lens L3, which is a biconvex lens, the mask 3, and the fourth lens L4, which is a biconvex lens. The third lens group G3 includes the fifth lens L5, which is a biconcave lens, and the sixth lens L6, which is a positive meniscus lens having a convex surface facing the reduction side. The fourth lens group G4 includes the seventh lens L7 which is a biconvex lens.

When power varies from the wide angle end to the telephoto end, the second lens group G2 and the third lens group G3 are moved to the magnification side along the optical axis Z.

Focusing is performed by moving the third lens group G3 in the direction of the optical axis Z (varifocal lens type).

In Table 13, an upper part shows the curvature radius R of each lens surface according to Example 13, the thickness of the center of each lens and the air space D between the lenses, and the refractive index Nd and the Abbe number νd of each lens with respect to the d-line.

In Table 13, a middle part shows the variable spacing 1, the variable spacing 2, and the variable spacing 3 at the wide angle end (wide), the middle position (middle), and the telephoto end (tele). In Table 13, a lower part shows the values of the constants K and A3 to A16 corresponding to the aspheric surfaces.

TABLE 13

| Focal length F = 1.00~1.06~1.10 | | | | |
|---|---|---|---|---|
| Surface | R | D | Nd | νd |
| 1* | −1.196 | 0.209 | 1.4910 | 57.6 |
| 2* | −1.398 | 0.200 | | |
| 3 | −2.629 | 0.065 | 1.4875 | 70.2 |
| 4 | 0.968 | (Movement 1) | | |
| 5 | 2.227 | 0.211 | 1.7995 | 42.2 |
| 6 | −6.123 | 0.627 | | |
| 7 | ∞ | 0.910 | | |
| 8 (Mask) | 5.979 | 0.132 | 1.7130 | 53.9 |
| 9 | −1.960 | (Movement 2) | | |
| 10 | −1.295 | 0.094 | 1.8052 | 25.4 |
| 11 | 2.581 | 0.046 | | |
| 12 | −68.160 | 0.366 | 1.7130 | 53.9 |
| 13 | −1.463 | (Movement 3) | | |
| 14 | 2.071 | 0.294 | 1.7130 | 53.9 |
| 15 | −4.225 | 0.566 | | |
| 16 | ∞ | 1.270 | 1.5163 | 64.1 |
| 17 | ∞ | | | |

TABLE 13-continued

| Movement spacing | Wide angle end | Middle position | Telephoto end |
|---|---|---|---|
| Movement 1 | 0.812 | 0.708 | 0.643 |
| Movement 2 | 0.153 | 0.248 | 0.313 |
| Movement 3 | 0.429 | 0.438 | 0.438 |

| Aspheric coefficient | | | | | |
|---|---|---|---|---|---|
| Surface number | K | $A_3$ | $A_4$ | $A_5$ | $A_6$ |
| 1 | −4.11433 | −1.04885E−01 | 1.35442E+00 | −1.33015E+00 | 1.31848E−01 |
| | | $A_7$ | $A_8$ | $A_9$ | $A_{10}$ | $A_{11}$ |
| | | 4.60420E−02 | 6.82126E−01 | −1.58695E−01 | 2.54533E−01 | −1.43722E+00 |
| | | $A_{12}$ | $A_{13}$ | $A_{14}$ | $A_{15}$ | $A_{16}$ |
| | | 5.67722E−01 | 2.74771E+00 | −6.67328E+00 | 6.88509E+00 | −2.56945E+00 |
| | K | $A_3$ | $A_4$ | $A_5$ | $A_6$ |
| 2 | 0.13550 | −5.64576E−02 | 1.16151E+00 | 2.98240E−01 | −3.14239E+00 |
| | | $A_7$ | $A_8$ | $A_9$ | $A_{10}$ | $A_{11}$ |
| | | 2.36375E+00 | 1.13462E+00 | −5.71139E−01 | −9.97575E−01 | 2.55271E+00 |
| | | $A_{12}$ | $A_{13}$ | $A_{14}$ | $A_{15}$ | $A_{16}$ |
| | | −7.18167E+00 | 4.75453E+00 | −6.72567E+00 | 1.89731E+01 | −1.23568E+01 |

*Aspheric surface

In addition, Table 17 shows numerical values corresponding to the conditional expressions according to Example 13.

Figure 29:
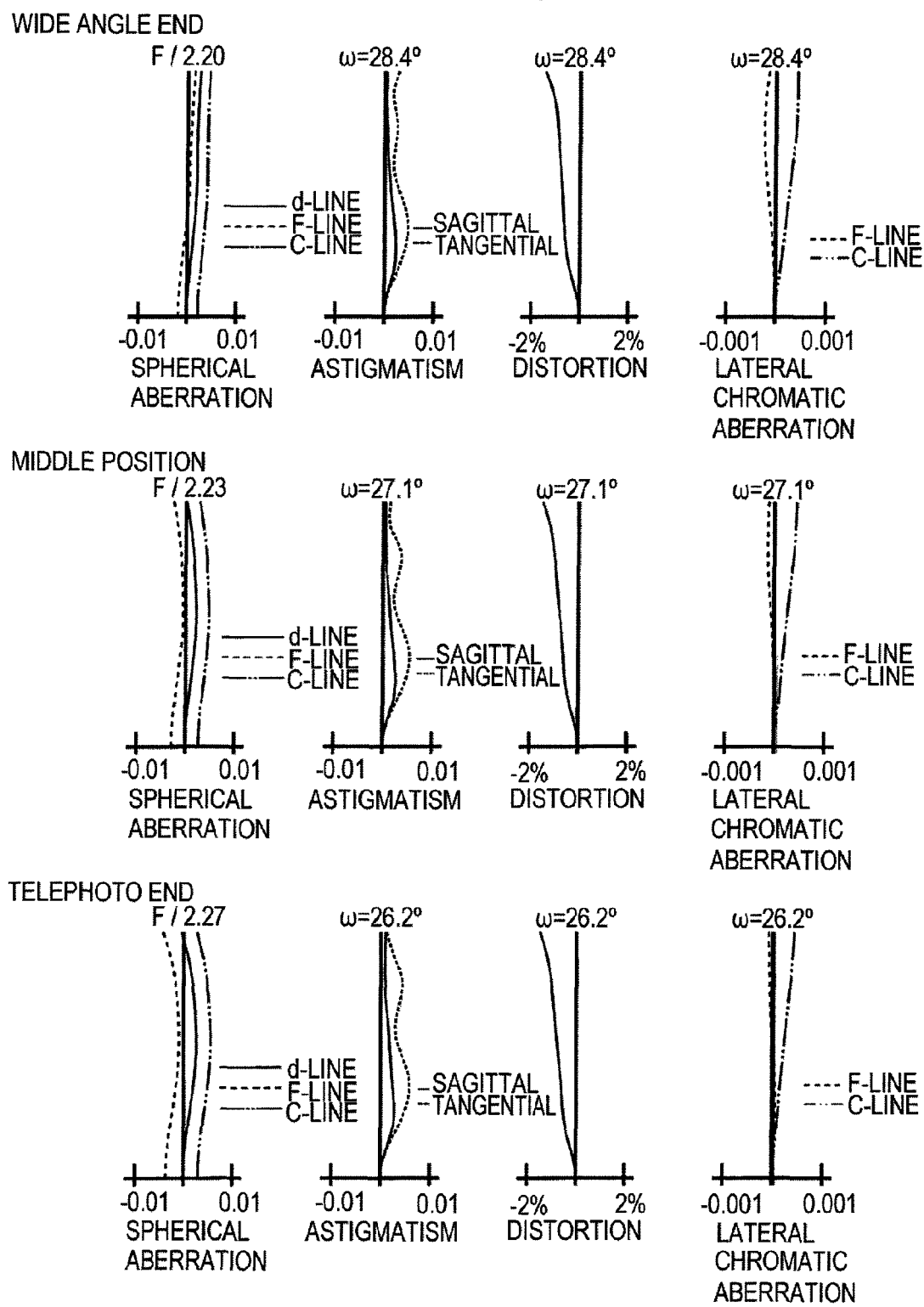
FIG. 29 is a diagram illustrating all aberrations of the projection variable focus lens according to Example 13.

FIG. 29 is an aberration diagram illustrating all aberrations (spherical aberration, astigmatism, distortion, and lateral chromatic aberration) of the projection variable focus lens according to Example 13 at the wide angle end (wide), the middle position (middle), and the telephoto end (tele).

As can be seen from FIG. 29, the projection variable focus lens according to Example 13 has an angle of view 2ω of 56.8 degrees, which is a wide angle, and an F number of 2.20, which is a large value, at the wide angle end. Therefore, all aberrations are effectively corrected.

In addition, as shown in Table 17, the projection variable focus lens according to Example 13 satisfies all of Conditional expressions 1 to 3 and Conditional expressions 1' and 2'.

Example 14

Figure 14:
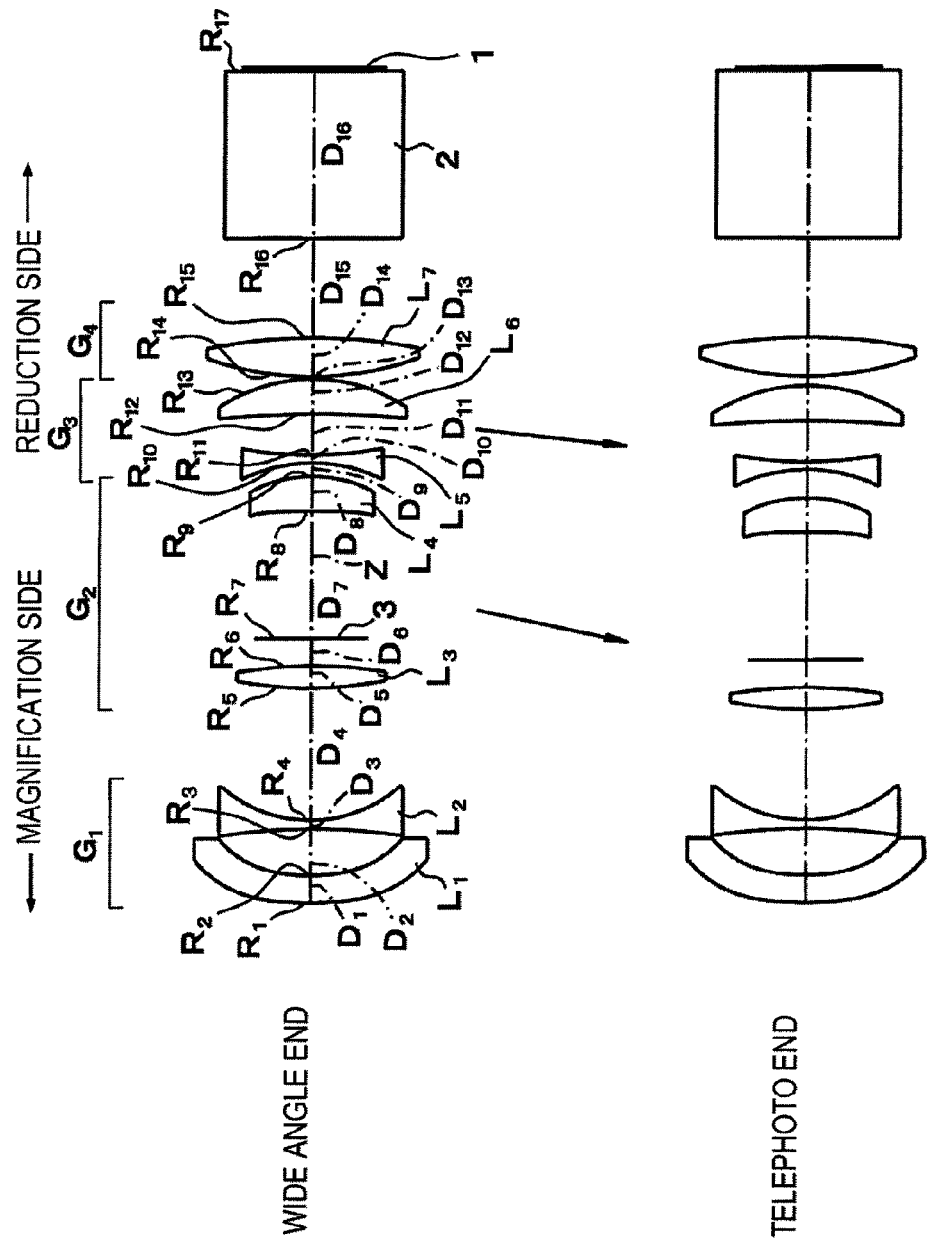
FIG. 14 is a diagram illustrating the structure of a projection variable focus lens according to Example 14 of the invention.

The projection variable focus lens according to Example 14 has the structure shown in FIG. 14.

That is, the projection variable focus lens has substantially the same structure as that according to Example 13 except that the fourth lens L4 is a positive meniscus lens (on the axis) having aspheric surfaces at both sides, one of which is a convex surface facing the reduction side.

When power varies from the wide angle end to the telephoto end, the second lens group G2 and the third lens group G3 are moved to the magnification side along the optical axis Z.

Focusing is performed by moving the third lens group G3 in the direction of the optical axis Z (varifocal lens type).

In Table 14, an upper part shows the curvature radius R of each lens surface according to Example 14, the thickness of the center of each lens and the air space D between the lenses, and the refractive index Nd and the Abbe number νd of each lens with respect to the d-line.

In Table 14, a middle part shows the variable spacing 1, the variable spacing 2, and the variable spacing 3 at the wide angle end (wide), the middle position (middle), and the telephoto end (tele). In Table 14, a lower part shows the values of the constants K and. A3 to A16 corresponding to the aspheric surfaces.

TABLE 14

| Focal length F = 1.00~1.06~1.10 | | | | |
|---|---|---|---|---|
| Surface | R | D | Nd | νd |
| 1* | 2.782 | 0.209 | 1.4910 | 57.6 |
| 2* | 1.478 | 0.351 | | |
| 3 | −4.504 | 0.065 | 1.4875 | 70.2 |
| 4 | 0.964 | (Movement 1) | | |
| 5 | 2.674 | 0.169 | 1.8040 | 46.6 |
| 6 | −3.282 | 0.209 | | |
| 7 (Mask) | ∞ | 0.962 | | |
| 8* | −8.571 | 0.261 | 1.5686 | 58.6 |
| 9* | −1.016 | (Movement 2) | | |
| 10 | −1.142 | 0.060 | 1.8052 | 25.4 |

TABLE 14-continued

| | | | | |
|---|---|---|---|---|
| 11 | 2.845 | 0.312 | | |
| 12 | −7.092 | 0.265 | 1.6031 | 60.6 |
| 13 | −1.233 | (Movement 3) | | |
| 14 | 2.255 | 0.293 | 1.6516 | 58.5 |
| 15 | −3.887 | 0.744 | | |
| 16 | ∞ | 1.268 | 1.5163 | 64.1 |
| 17 | ∞ | | | |

| Movement spacing | Wide angle end | Middle position | Telephoto end |
|---|---|---|---|
| Movement 1 | 1.004 | 0.902 | 0.839 |
| Movement 2 | 0.104 | 0.170 | 0.215 |
| Movement 3 | 0.019 | 0.055 | 0.072 |

Aspheric coefficient

| Surface number | K | $A_3$ | $A_4$ | $A_5$ | $A_6$ |
|---|---|---|---|---|---|
| 1 | −89.99968 | −1.17759E−01 | 1.68776E+00 | −2.34381E+00 | 1.08749E+00 |

| | $A_7$ | $A_8$ | $A_9$ | $A_{10}$ | $A_{11}$ |
|---|---|---|---|---|---|
| | 2.43947E−01 | 1.05228E+00 | −1.24535E+00 | 8.13133E−01 | −4.87257E+00 |

| | $A_{12}$ | $A_{13}$ | $A_{14}$ | $A_{15}$ | $A_{16}$ |
|---|---|---|---|---|---|
| | 3.71974E+00 | 1.47645E+01 | −4.08095E+01 | 4.50490E+01 | −1.88998E+01 |

| | K | $A_3$ | $A_4$ | $A_5$ | $A_6$ |
|---|---|---|---|---|---|
| 2 | −18.20200 | −6.16488E−02 | 1.43517E+00 | 8.74420E−01 | −7.02837E+00 |

| | $A_7$ | $A_8$ | $A_9$ | $A_{10}$ | $A_{11}$ |
|---|---|---|---|---|---|
| | 6.37656E+00 | 5.51182E+00 | −1.30792E+00 | −8.04371E+00 | 1.88898E+00 |

| | $A_{12}$ | $A_{13}$ | $A_{14}$ | $A_{15}$ | $A_{16}$ |
|---|---|---|---|---|---|
| | −3.68999E+01 | 3.54598E+01 | −7.97185E+00 | 1.60141E+02 | −1.74774E+02 |

| | K | $A_4$ | $A_6$ | $A_8$ | $A_{10}$ |
|---|---|---|---|---|---|
| 8 | 1.00000 | −2.48070E−01 | −1.13455E+00 | 2.46754E+00 | −2.20906E+01 |

| | K | $A_4$ | $A_6$ | $A_8$ | $A_{10}$ |
|---|---|---|---|---|---|
| 9 | 1.00000 | −8.29337E−02 | −6.22022E−01 | −5.23476E−01 | −6.77872E+00 |

*Aspheric surface

In addition, Table 17 shows numerical values corresponding to the conditional expressions according to Example 14.

Figure 30:
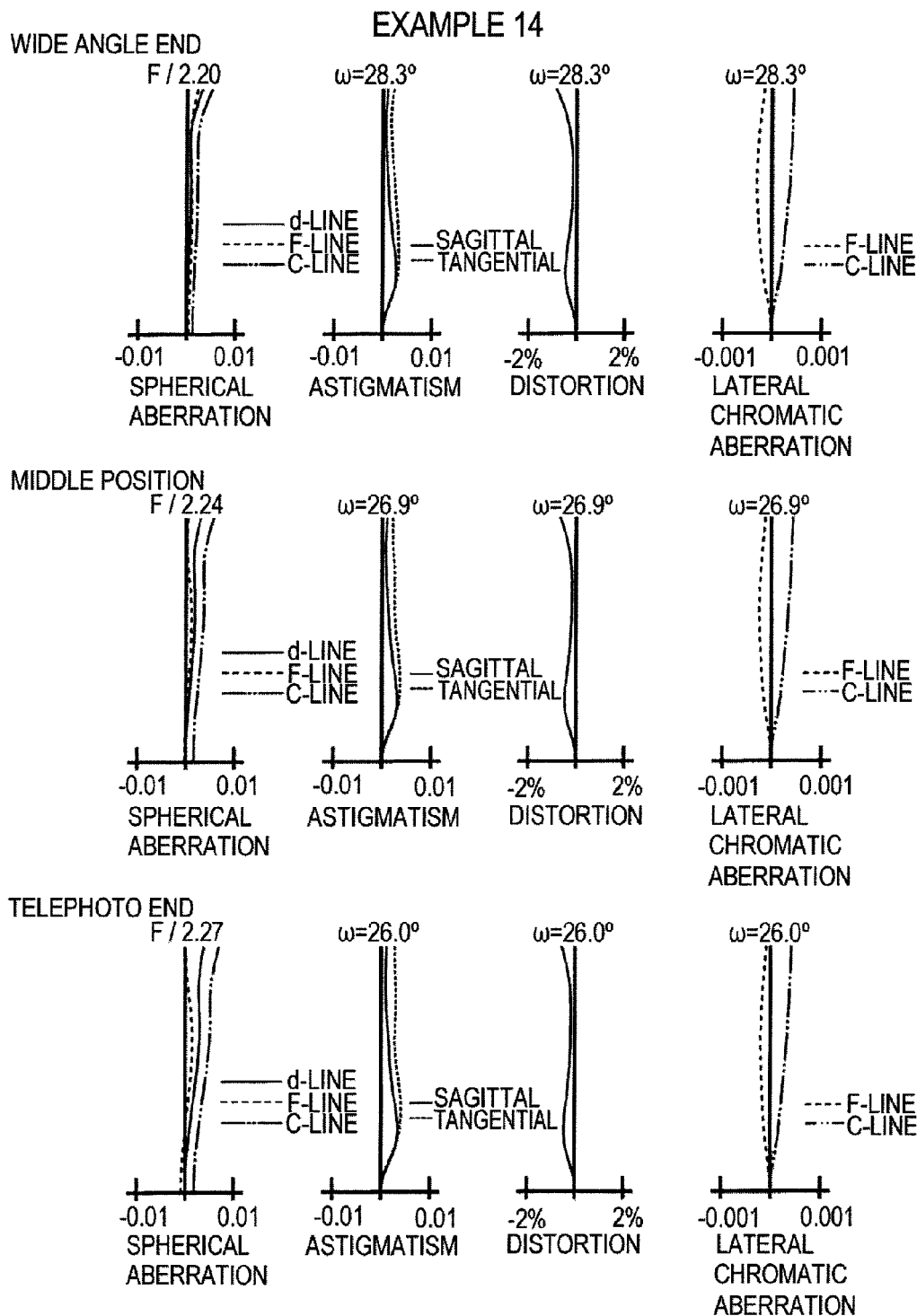
FIG. 30 is a diagram illustrating all aberrations of the projection variable focus lens according to Example 14.

FIG. 30 is an aberration diagram illustrating all aberrations (spherical aberration, astigmatism, distortion, and lateral chromatic aberration) of the projection variable focus lens according to Example 14 at the wide angle end (wide), the middle position (middle), and the telephoto end (tele).

As can be seen from FIG. 30, the projection variable focus lens according to Example 14 has an angle of view 2ω of 56.6 degrees, which is a wide angle, and an F number of 2.20, which is a large value, at the wide angle end. Therefore, all aberrations are effectively corrected.

In addition, as shown in Table 17, the projection variable focus lens according to Example 14 satisfies all of Conditional expressions 1 to 3 and Conditional expressions 1' and 2'.

Sixth Example Group

A sixth example group includes projection variable focus lenses according to the following Examples 15 and 16. Each of the projection variable focus lenses includes a first lens group G1 including a first lens L1 and a second lens L2, a second lens group G2 including a third lens L3, a third lens group G3 including a fourth lens L4, a fourth lens group G4 including a fifth lens L5 and a sixth lens L6, and a fifth lens group G5 including a seventh lens L7. When power varies, the second lens group G2, the third lens group G3, and the fourth lens group G4 are independently moved.

Example 15

Figure 15:
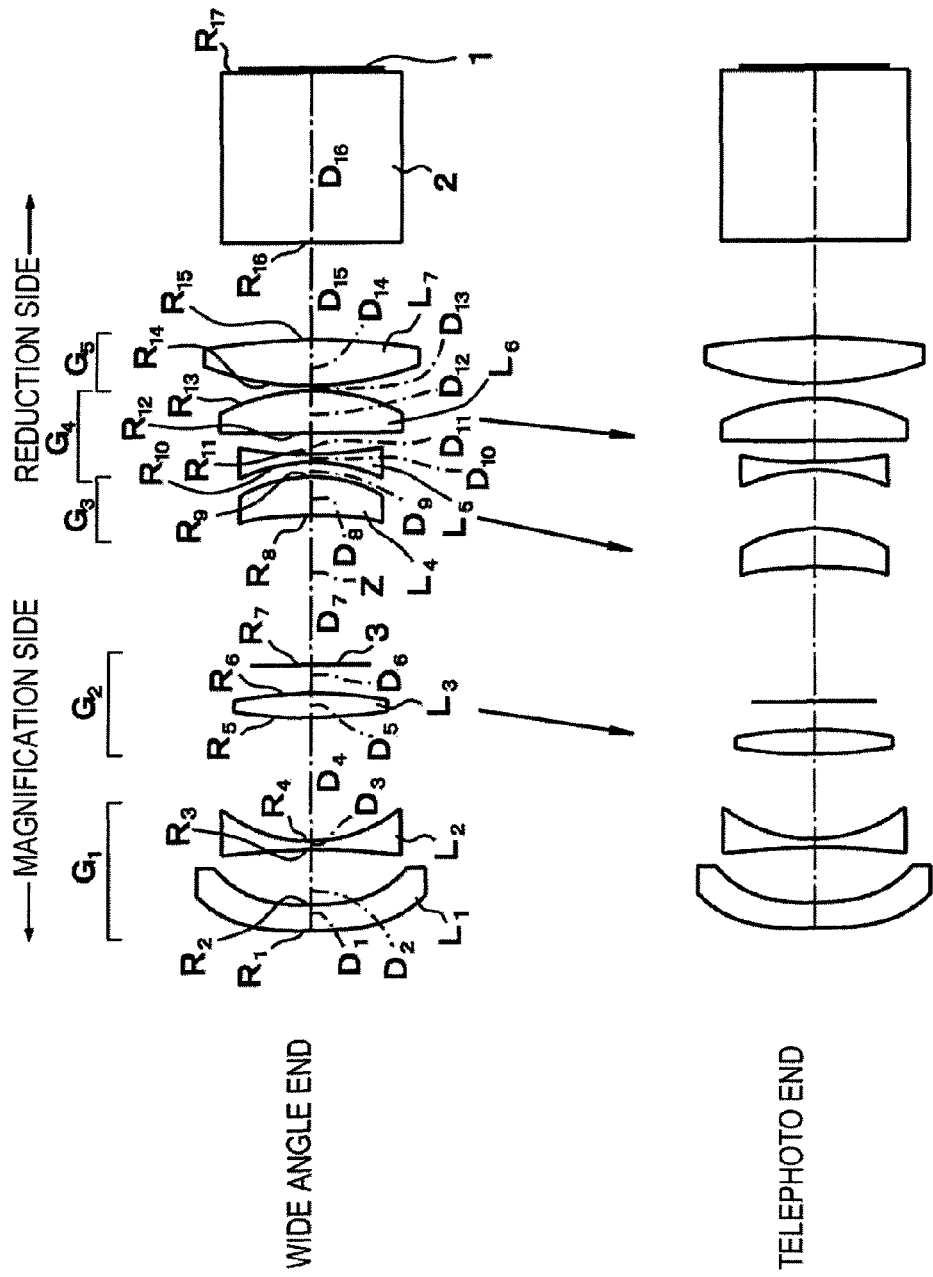
FIG. 15 is a diagram illustrating the structure of a projection variable focus lens according to Example 15 of the invention.

The projection variable focus lens according to Example 15 has the structure shown in FIG. 15.

That is, the projection variable focus lens includes the first to seventh lenses L1 to L7 of the first to fifth lens groups G1 to G5 arranged in this order from the magnification side. The first lens group G1 includes the first lens L1 which has a low refractive power and includes aspheric surfaces at both sides and the second lens L2, which is a biconcave lens. The second lens group G2 includes the third lens L3, which is a biconvex lens, and the mask 3. The third lens group G3 includes the fourth lens L4 which is a positive meniscus lens (on the axis) having aspheric surfaces at both sides, one of which is a convex surface facing the reduction side. The fourth lens group G4 includes the fifth lens L5, which is a biconcave lens, and the sixth lens L6, which is a biconvex lens. The fifth lens group G5 includes the seventh lens L7 which is a biconvex lens.

When power varies from the wide angle end to the telephoto end, the second lens group G2, the third lens group G3, and the fourth lens group G4 are moved to the magnification side along the optical axis Z.

Focusing is performed by moving the first lens group G1 in the direction of the optical axis Z (zoom lens type).

In Table 15, an upper part shows the curvature radius R of each lens surface according to Example 15, the thickness of the center of each lens and the air space D between the lenses, and the refractive index Nd and the Abbe number vd of each lens with respect to the d-line.

In Table 15, a middle part shows the variable spacing 1, the variable spacing 2, the variable spacing 3, and a variable spacing 4 (the gap between the fourth lens group G4 and the fifth lens group G5: movement 4 (which is the same with the following Table 16)) at the wide angle end (wide), the middle position (middle), and the telephoto end (tele). In Table 15, a lower part shows the values of the constants K and A3 to A16 corresponding to the aspheric surfaces.

TABLE 15

| Focal length F = 1.00~1.12~1.20 | | | | |
|---|---|---|---|---|
| Surface | R | D | Nd | vd |
| 1* | 5.088 | 0.190 | 1.4910 | 57.6 |
| 2* | 2.048 | 0.409 | | |
| 3 | −5.144 | 0.064 | 1.4875 | 70.2 |
| 4 | 1.016 | (Movement 1) | | |
| 5 | 3.378 | 0.182 | 1.8040 | 46.6 |
| 6 | −2.886 | 0.209 | | |
| 7 (Mask) | ∞ | | | |
| 8* | −4.160 | 0.287 | 1.5686 | 58.6 |
| 9* | −1.097 | (Movement 2) | | |
| 10 | −1.204 | 0.060 | 1.8052 | 25.4 |
| 11 | 2.871 | 0.159 | | |
| 12 | 38.705 | 0.313 | 1.7130 | 53.9 |
| 13 | −1.419 | (Movement 3) | | |
| 14 | 2.126 | 0.341 | 1.6779 | 55.3 |
| 15 | −4.771 | 0.707 | | |
| 16 | ∞ | 1.268 | 1.5163 | 64.1 |
| 17 | ∞ | | | |

| Movement spacing | Wide angle end | Middle position | Telephoto end |
|---|---|---|---|
| Movement 1 | 0.918 | 0.734 | 0.632 |
| Movement 2 | 1.108 | 1.031 | 0.990 |
| Movement 3 | 0.109 | 0.305 | 0.436 |
| | 0.038 | 0.102 | 0.114 |

| Aspheric coefficient | | | | | |
|---|---|---|---|---|---|
| Surface number | K | $A_3$ | $A_4$ | $A_5$ | $A_6$ |
| 1 | 10.08199 | −2.37930E−01 | 1.64356E+00 | −1.91712E+00 | 6.45029E−01 |
| | | $A_7$ | $A_8$ | $A_9$ | $A_{10}$ | $A_{11}$ |
| | | −4.35991E−02 | 1.26667E+00 | −8.20950E−01 | 1.08856E+00 | −4.95585E+00 |
| | | $A_{12}$ | $A_{13}$ | $A_{14}$ | $A_{15}$ | $A_{16}$ |
| | | 3.32481E+00 | 1.42369E+01 | −4.13979E+01 | 4.54717E+01 | −1.81254E+01 |
| | K | $A_3$ | $A_4$ | $A_5$ | $A_6$ |
| 2 | −35.22532 | −1.92253E−01 | 1.85820E+00 | 3.54720E−01 | −6.63218E+00 |
| | | $A_7$ | $A_8$ | $A_9$ | $A_{10}$ | $A_{11}$ |
| | | 5.86649E+00 | 4.43760E+00 | −7.33360E−01 | −4.70260E+00 | 6.19977E+00 |
| | | $A_{12}$ | $A_{13}$ | $A_{14}$ | $A_{15}$ | $A_{16}$ |
| | | −3.67678E+01 | 2.60732E+01 | −2.82464E+01 | 1.46702E+02 | −1.24537E+02 |
| | K | $A_4$ | $A_6$ | $A_8$ | $A_{10}$ |
| 8 | 1.00000 | −1.11805E−01 | −6.17890E−01 | 1.40068E+00 | −8.20641E+00 |
| | K | $A_4$ | $A_6$ | $A_8$ | $A_{10}$ |
| 9 | 1.00000 | −3.49844E−02 | −3.22689E−01 | 2.59781E−02 | −2.77559E+00 |

*Aspheric surface

In addition, Table 17 shows numerical values corresponding to the conditional expressions according to Example 15.

Figure 31:
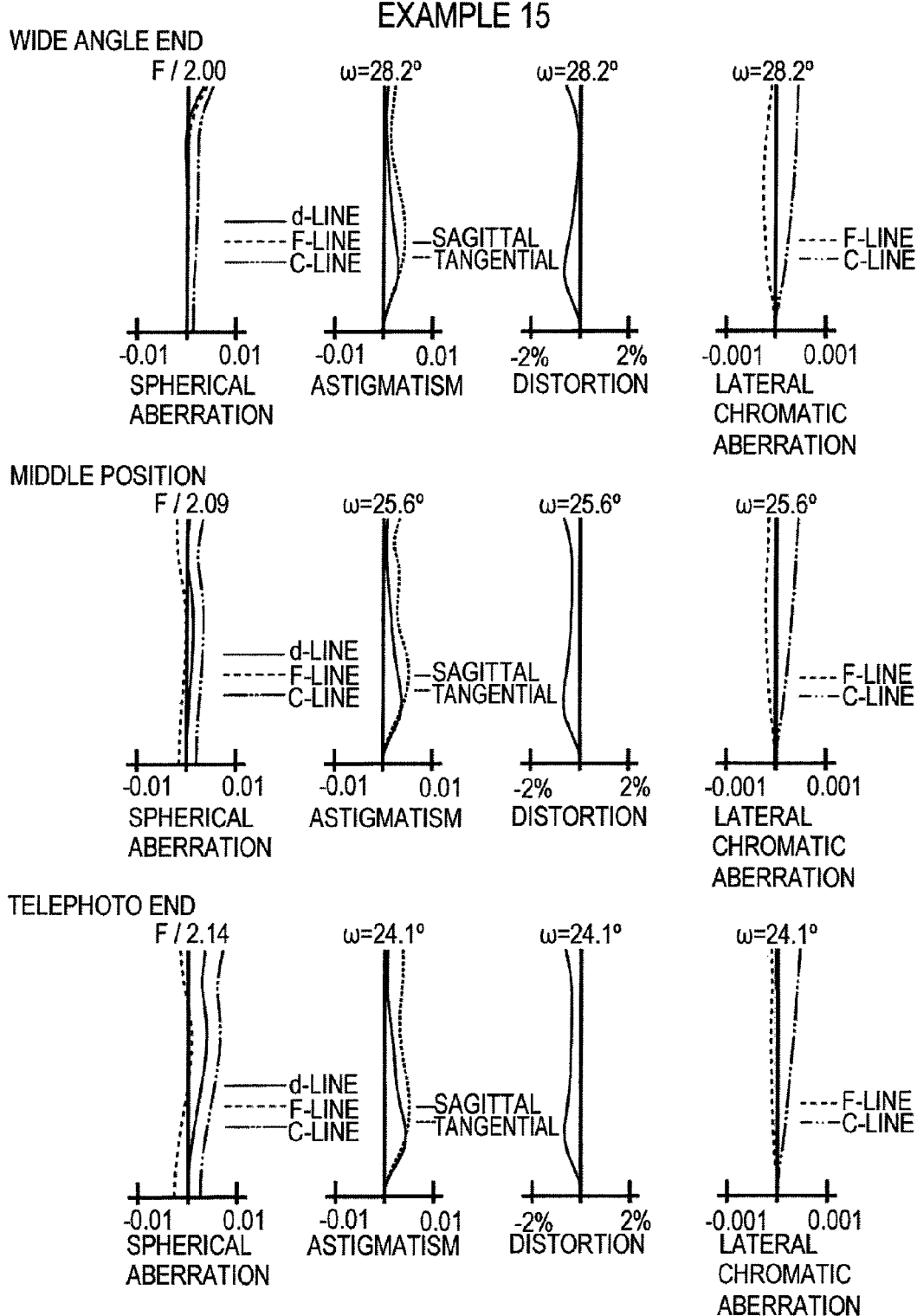
FIG. 31 is a diagram illustrating all aberrations of the projection variable focus lens according to Example 15.

FIG. 31 is an aberration diagram illustrating all aberrations (spherical aberration, astigmatism, distortion, and lateral chromatic aberration) of the projection variable focus lens according to Example 15 at the wide angle end (wide), the middle position (middle), and the telephoto end (tele).

As can be seen from FIG. 31, the projection variable focus lens according to Example 15 has an angle of view 2ω of 56.4 degrees, which is a wide angle, and an F number of 2.00, which is a large value, at the wide angle end. Therefore, all aberrations are effectively corrected.

In addition, as shown in Table 17, the projection variable focus lens according to Example 15 satisfies all of Conditional expressions 1 to 3 and Conditional expressions 1' and 2'.

Example 16

Figure 16:
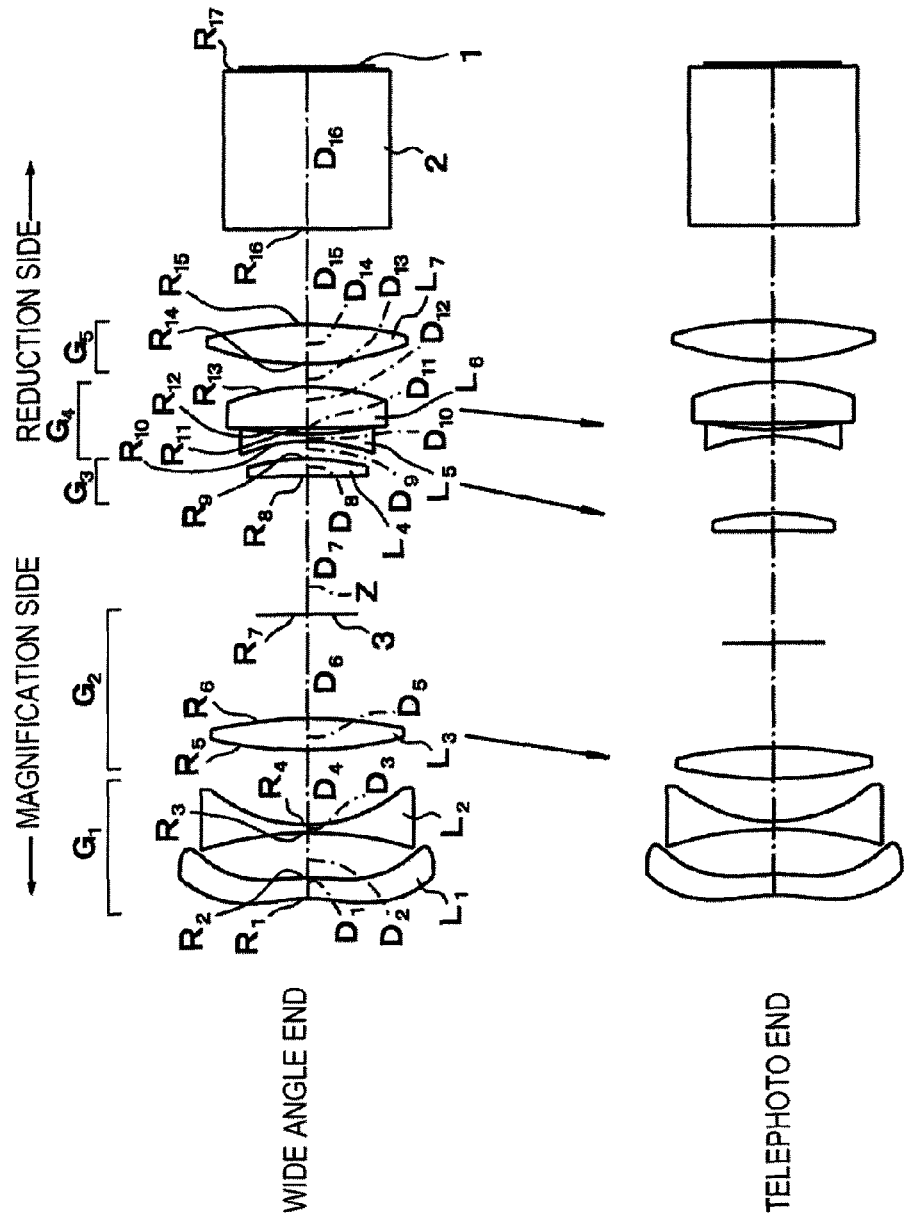
FIG. 16 is a diagram illustrating the structure of a projection variable focus lens according to Example 16 of the invention.

The projection variable focus lens according to Example 16 has the structure shown in FIG. 16.

That is, the projection variable focus lens has substantially the same structure as that according to Example 15 except that the fourth lens L4 is a spherical biconvex lens.

When power varies from the wide angle end to the telephoto end, the second lens group G2, the third lens group G3, and the fourth lens group G4 are moved to the magnification side along the optical axis Z.

Focusing is performed by moving the first lens group G1 in the direction of the optical axis Z (zoom lens type).

In Table 16, an upper part shows the curvature radius R of each lens surface according to Example 16, the thickness of the center of each lens and the air space D between the lenses, and the refractive index Nd and the Abbe number νd of each lens with respect to the d-line.

In Table 16, a middle part shows the variable spacing 1, the variable spacing 2, the variable spacing 3, and the variable spacing 4 at the wide angle end (wide), the middle position (middle), and the telephoto end (tele). In Table 16, a lower part shows the values of the constants K and A3 to A16 corresponding to the aspheric surfaces.

TABLE 16

Focal length F = 1.00~1.12~1.20

| Surface | R | D | Nd | νd |
|---|---|---|---|---|
| 1* | −1.310 | 0.166 | 1.4910 | 57.6 |
| 2* | −2.188 | 0.362 | | |
| 3 | −2.704 | 0.065 | 1.4875 | 70.2 |
| 4 | 1.145 | (Movement 1) | | |
| 5 | 3.035 | 0.252 | 1.8040 | 46.6 |
| 6 | −3.395 | 0.835 | | |
| 7 (Mask) | ∞ | (Movement 2) | | |
| 8 | −96.490 | 0.140 | 1.7130 | 53.9 |
| 9 | −1.753 | (Movement 3) | | |
| 10 | −1.385 | 0.058 | 1.7847 | 26.3 |
| 11 | 2.452 | 0.048 | | |
| 12 | 20.305 | 0.334 | 1.7130 | 53.9 |
| 13 | −1.661 | (Movement 4) | | |
| 14 | 2.156 | 0.314 | 1.7130 | 53.9 |
| 15 | −3.146 | 0.753 | | |
| 16 | ∞ | 1.268 | 1.5163 | 64.1 |
| 17 | ∞ | | | |

| Movement spacing | Wide angle end | Middle position | Telephoto end |
|---|---|---|---|
| Movement 1 | 0.596 | 0.426 | 0.339 |
| Movement 2 | 1.101 | 0.971 | 0.893 |
| Movement 3 | 0.142 | 0.435 | 0.618 |
| Movement 4 | 0.183 | 0.189 | 0.172 |

Aspheric coefficient

| Surface number | K | $A_3$ | $A_4$ | $A_5$ | $A_6$ |
|---|---|---|---|---|---|
| 1 | −10.69145 | −6.71645E−02 | 1.35165E+00 | −1.27867E+00 | 1.05577E−01 |

| | $A_7$ | $A_8$ | $A_9$ | $A_{10}$ | $A_{11}$ |
|---|---|---|---|---|---|
| | −1.85155E−02 | 6.35804E−01 | −1.56238E−01 | 3.28155E−01 | −1.36382E+00 |

| | $A_{12}$ | $A_{13}$ | $A_{14}$ | $A_{15}$ | $A_{16}$ |
|---|---|---|---|---|---|
| | 6.23476E−01 | 2.73734E+00 | −6.95360E+00 | 6.89594E+00 | −2.44708E+00 |

| | K | $A_3$ | $A_4$ | $A_5$ | $A_6$ |
|---|---|---|---|---|---|
| 2 | −13.16051 | −2.99078E−02 | 1.35724E+00 | 7.94719E−02 | −3.21556E+00 |

| | $A_7$ | $A_8$ | $A_9$ | $A_{10}$ | $A_{11}$ |
|---|---|---|---|---|---|
| | 2.41653E+00 | 1.23564E+00 | −4.56259E−01 | −9.37813E−01 | 2.53372E+00 |

TABLE 16-continued

| $A_{12}$ | $A_{13}$ | $A_{14}$ | $A_{15}$ | $A_{16}$ |
|---|---|---|---|---|
| −7.48528E+00 | 4.61811E+00 | −6.93237E+00 | 1.95132E+01 | −1.24593E+01 |

*Aspheric surface

In addition, Table 17 shows numerical values corresponding to the conditional expressions according to Example 16.

Figure 32:
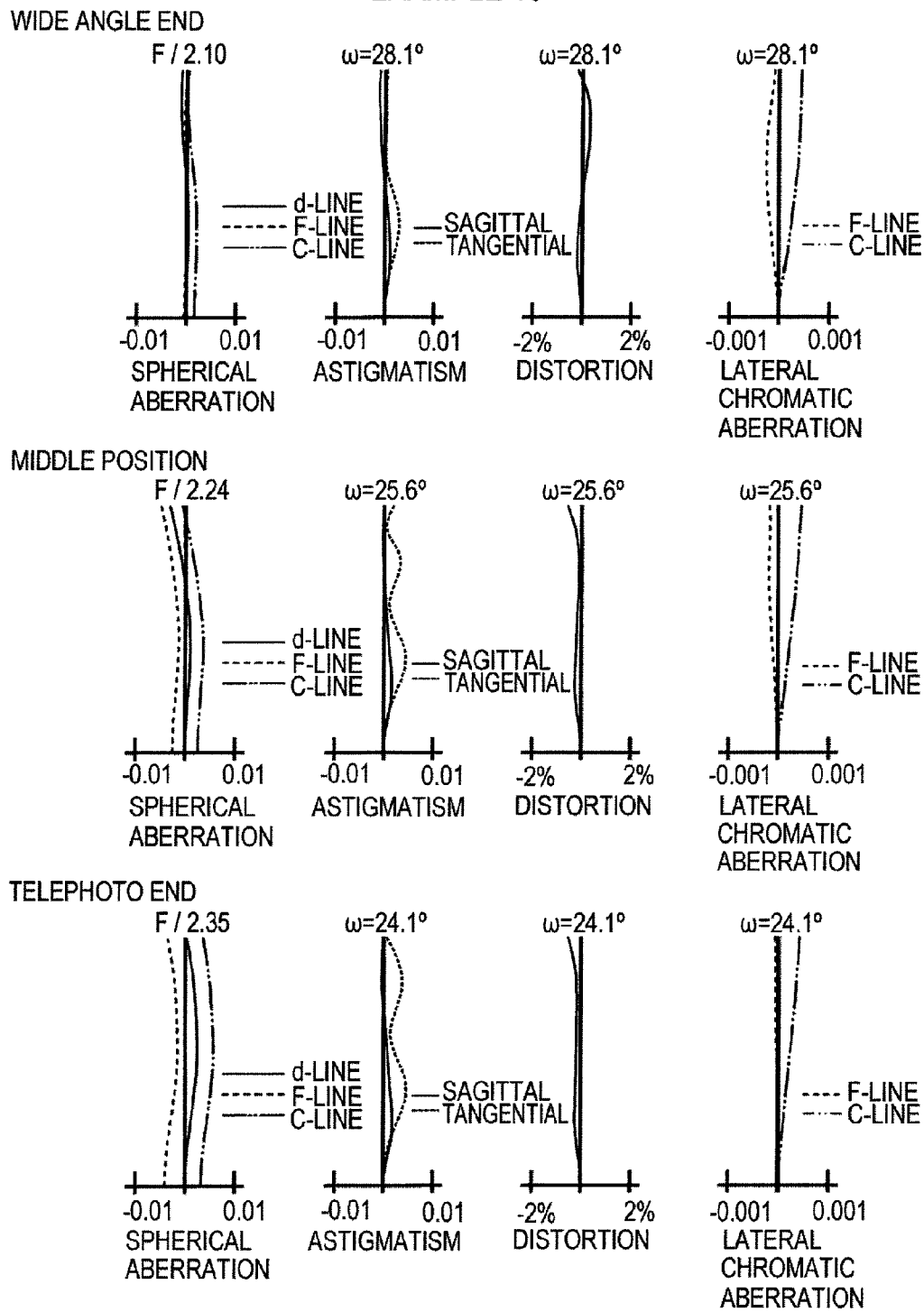
FIG. 32 is a diagram illustrating all aberrations of the projection variable focus lens according to Example 16.

FIG. 32 is an aberration diagram illustrating all aberrations (spherical aberration, astigmatism, distortion, and lateral chromatic aberration) of the projection variable focus lens according to Example 16 at the wide angle end (wide), the middle position (middle), and the telephoto end (tele).

As can be seen from FIG. 32, the projection variable focus lens according to Example 16 has an angle of view 2ω of 56.2 degrees, which is a wide angle, and an F number of 2.10, which is a large value, at the wide angle end. Therefore, all aberrations are effectively corrected.

In addition, as shown in Table 17, the projection variable focus lens according to Example 16 satisfies all of Conditional expressions 1 to 3 and Conditional expressions 1' and 2'.

TABLE 17

| Conditional expression | (1) $f_{12}/f_w$ | (2) $f_3/f_w$ | (3) $|f_1/f_2|$ |
|---|---|---|---|
| Upper limit | −2.2 | 1.0 | 3.0 |
| Lower limit | −0.5 | 3.5 | — |
| Example 1 | −1.140 | 1.910 | 10.117 |
| Example 2 | −1.258 | 2.367 | 505.469 |
| Example 3 | −1.306 | 2.537 | 121.417 |
| Example 4 | −1.331 | 2.067 | 3.222 |
| Example 5 | −1.419 | 2.219 | 6.985 |
| Example 6 | −1.589 | 2.290 | — |
| Example 7 | −1.331 | 1.994 | 13.664 |
| Example 8 | −1.251 | 1.986 | 4.479 |
| Example 9 | −1.291 | 1.840 | 6.875 |
| Example 10 | −1.324 | 2.026 | 7.324 |
| Example 11 | −1.121 | 1.881 | 3.617 |
| Example 12 | −1.045 | 1.792 | 7.616 |
| Example 13 | −1.285 | 2.066 | 17.818 |
| Example 14 | −1.276 | 1.856 | 4.180 |
| Example 15 | −1.341 | 1.961 | 4.110 |
| Example 16 | −1.235 | 2.028 | 4.323 |

What is claimed is:

1. A projection variable focus lens comprising of:
   seven lenses including
       first and second lenses that are provided closest to a magnification side and have a negative composite refractive power,
       a third lens having a positive refractive power,
       a fifth lens having a negative refractive power,
       a sixth lens having a positive refractive power, and
       a seventh lens having a positive refractive power, wherein
   the first to seventh lenses are provided in this order from the magnification side,
   a reduction side of a lens system is telecentric,
   the seven lenses are classified into three or more lens groups,
   three or less of the three or more lens groups are movable to change a focal length,
   when the focal length varies from a wide angle end to a telephoto end, the third lens is moved from the reduction side to the magnification side along an optical axis,
   the seven lenses include a fourth lens from the magnification side that has a positive refractive power and includes a convex surface facing the reduction side, and
   the projection variable focus lens satisfies the following conditional expression:

$$-2.2 < f12/fw < -0.5$$

where fw indicates the focal length of the entire system at the wide angle end, and f12 indicates a composite focal length of the first lens and the second lens.

2. The projection variable focus lens according to claim 1, wherein the projection variable focus lens satisfies the following conditional expression:

$$1.0 < f3/fw < 3.5$$

where fw indicates the focal length of the entire system at the wide angle end, and f3 indicates a focal length of the third lens.

3. The projection variable focus lens according to claim 1, wherein at least one surface of each of the first lens and the second lens is an aspheric surface.

4. The projection variable focus lens according to claim 1, wherein the first lens or the second lens is made of a plastic material.

5. The projection variable focus lens according to claim 1, wherein the first lens is a composite aspheric lens in which a resin layer is provided on one surface of a glass lens, and
   one surface of the resin layer opposite to the glass lens is an aspheric surface.

6. A projection display device comprising:
   a light source;
   a light valve;
   an illumination optical unit that guides light emitted from the light source to the light valve; and
   the projection variable focus lens according to claim 1,
   wherein the light valve modulates the light emitted from the light source, and
   the modulated light is projected onto a screen by the projection variable focus lens.

7. The projection variable focus lens consisting of:
   seven lenses including
       first and second lenses that are provided closest to a magnification side and have a negative composite refractive power,
       a third lens having a positive refractive power,
       a fifth lens having a negative refractive power,
       a sixth lens having a positive refractive power, and
       a seventh lens having a positive refractive power, wherein
   the first to seventh lenses are provided in this order from the magnification side,
   a reduction side of a lens system is telecentric,
   the seven lenses are classified into three or more lens groups,
   three or less of the three or more lens groups are movable to change a focal length, when the focal length varies from a wide angle end to a telephoto end, the third lens is moved from the reduction side to the magnification side along an optical axis, the seven lenses include a fourth lens from the magnification side that has a positive refractive power and includes a convex surface facing the reduction side, the first lens or the second lens is made of a plastic material, and the projection variable focus lens satisfies the following conditional expression:

$|fP/fNP| \geq 3.0$ where fP indicates a focal length of one of the first and second lenses, which is made of the plastic material, and fNP indicates a focal length of the other lens which is made of a non-plastic material.

* * * * *